United States Patent
Malas et al.

(10) Patent No.: US 12,242,929 B2
(45) Date of Patent: Mar. 4, 2025

(54) FANO-BASED INFORMATION THEORETIC METHOD (FBIT) FOR DESIGN AND OPTIMIZATION OF NONLINEAR SYSTEMS

(71) Applicant: Government of the United States as represented by the Secretary of the Air Force, Wright-Patterson AFB, OH (US)

(72) Inventors: John A. Malas, Kettering, OH (US); Patricia A. Ryan, Centerville, OH (US); John A. Cortese, Reading, MA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 1147 days.

(21) Appl. No.: 17/019,531

(22) Filed: Sep. 14, 2020

(65) Prior Publication Data
US 2021/0072348 A1     Mar. 11, 2021

Related U.S. Application Data

(63) Continuation-in-part of application No. 16/666,516, filed on Oct. 29, 2019, which is a continuation-in-part
(Continued)

(51) Int. Cl.
| | | |
|---|---|---|
| G01S 7/02 | (2006.01) | |
| G01S 7/38 | (2006.01) | |
| (Continued) | | |

(52) U.S. Cl.
CPC .............. *G06N 20/00* (2019.01); *G01S 7/021* (2013.01); *G01S 7/38* (2013.01); *G06F 18/295* (2023.01); *G06V 20/41* (2022.01)

(58) Field of Classification Search
CPC ...... G06T 15/10; G06T 19/003; H04N 13/128; H04N 13/268; H04N 13/383
See application file for complete search history.

(56) References Cited

U.S. PATENT DOCUMENTS

| | | |
|---|---|---|
| 2,790,165 A | 4/1957 | Lien |
| 6,337,654 B1 | 1/2002 | Richardson et al. |
| (Continued) | | |

OTHER PUBLICATIONS

J. A. Malas and J. A. Cortese, "The radar information channel and system uncertainty," 2010 IEEE Radar Conference, Arlington, VA, USA, 2010, pp. 144-149, doi: 10.1109/RADAR.2010.5494635. (Year: 2010).*

(Continued)

*Primary Examiner* — Timothy A Brainard
(74) *Attorney, Agent, or Firm* — AFMCLO/JAZ; James F. McBride

(57) ABSTRACT

Methods are provided for identifying and quantifying information loss in a system due to uncertainty and analyzing the impact on the reliability of system performance. Models and methods join Fano's equality with the Data Processing Inequality in a Markovian channel construct in order to characterize information flow within a multi-component nonlinear system and allow the determination of risk and characterization of system performance upper bounds based on the information loss attributed to each component. The present disclosure additionally includes methods for estimating the sampling requirements and for relating sampling uncertainty to sensing uncertainty. The present disclosure further includes methods for determining the optimal design of components of a nonlinear system in order to minimize information loss, while maximizing information flow and mutual information.

11 Claims, 22 Drawing Sheets

Related U.S. Application Data of application No. 14/315,365, filed on Jun. 26, 2014, now abandoned.

(60) Provisional application No. 61/914,429, filed on Dec. 11, 2013.

(51) Int. Cl.
*G06F 18/20* (2023.01)
*G06N 20/00* (2019.01)
*G06V 20/40* (2022.01)

(56) References Cited

U.S. PATENT DOCUMENTS

| | | |
|---|---|---|
| 7,002,509 B2 | 2/2006 | Karisson |
| 7,692,573 B1 | 4/2010 | Funk |
| 8,026,844 B2 | 9/2011 | Fox et al. |
| 8,085,186 B1 | 12/2011 | Malakian et al. |
| 8,242,952 B1 | 8/2012 | Barr |
| 8,243,989 B2 | 8/2012 | Vendrig |
| 8,244,469 B2 | 8/2012 | Cheung et al. |
| 8,259,006 B2 | 9/2012 | Culkin |
| 8,350,749 B1 | 1/2013 | Malas et al. |
| 8,872,693 B1 | 10/2014 | Malas et al. |
| 2003/0101451 A1 | 5/2003 | Bentolila |
| 2003/0164792 A1 | 9/2003 | Jahangir et al. |
| 2006/0284761 A1 | 12/2006 | Picard |
| 2007/0139251 A1 | 6/2007 | Shu |
| 2007/0146195 A1 | 6/2007 | Wallenberg et al. |
| 2008/0184367 A1 | 7/2008 | McMillan |
| 2009/0002224 A1 | 1/2009 | Khatib et al. |
| 2009/0299497 A1 | 12/2009 | Luko |
| 2010/0109938 A1 | 5/2010 | Oswald et al. |
| 2011/0241928 A1 | 10/2011 | Oswald et al. |

OTHER PUBLICATIONS

United States Patent and Trademark Office, Final Office Action in U.S. Appl. No. 16/666,516 mailed Aug. 24, 2023, 76 pages total.
Principe et al., "Learning from examples with information theoretic criteria," J VLSI Sign. Proc., vol. 26 (2000) 61-77.
Bell, "Information theory and radar: mutual information and the design and analysis of radar waveforms and systems," Thesis for California Institute of Technology (1988).
Briles, "Information theoretic performance bounding of Bayesian identifiers," Proc. SPIE, vol. 1960, vol. 1960 (1993) 255.
Wyner, "The common information of two dependent random variables," IEEE Trans. Info. Theory, vol. IT-21 (1975) 163-179.
Fuhrmann et al., "Transmit beamforming for MIMO radar systems using partial signal correlations," 38th Asilomar Conference on Signals, Systems, and Computers (2004) 295-299.
Malas et al., "Information theory based radar signature analysis," IEEE Aerospace Conf. (2007) 13 pages total.
Malas et al., "The radar information channel and system uncertity," IEEE Radar Conf. (2010) 144-149.
Malas et al., "The radar system and information flow," 2nd Int'l Workshop on Cognitive Information Processing (2010) 17-22.
Tishby et al., "Chapter 19: The information theory of decision and action," Perception-Action Cycle: Models, Architectures, and Hardware. (2011) Ed: Cutsuridis, Springer, 601-636.
Pasala et al., "HRR radar signature database validation for ATR: An information theoretic approach," IEEE Trans. Aerospace and Electronic Systems, vol. 27 (2011) 1045-1059.
Ahlswede et al., "Network information flow," IEEE Trans. Infor. Theory, vol. 46 (2000) 1204-1216.
Malas et al., "Radar signature analysis using information theory," IEEE Radar Conference (2008) 6 pages total.
Bell, "Information theory and radar waveform design," IEEE Trans. Information Theory, vol. 39 (1993) 1578-1597.
Leshem et al., "Information theoretic adaptive radar waveform design for multiple extended targets," IEEE Trans. Selected Topics Signal Processing, vol. 1 (2007) 42-55.
Cooper et al., "Information gain in object recognition via sensor fusion," Int'l Conference Multisource-Multisensor Data Fusion, (1998) 143-148.
Han et al., "Generalizating the Fano inequality," IEEE Trans. Info. Theory, vol. 40 (1994) 1247-1251.
Tishby et al., "The information bottleneck method," Prc. 37th Allerton Conf. on Comm. and Comp. (1999) Ed: Hajek et al., Univ. Illinois. 368-377.
O'Sullivan et al., "SAR ATR performance using a conditionally Gaussian model," IEEE Trans. Aerospace Electronic Systems, vol. 37 (2001) 91-108.
Geiger et al., "Information loss in static nonlinearities," 8th International Symposium (2011) 799-803.
Merhav, "Data processing inequalities based on a certain structured class of information measures with application to estimation theory," IEEE Trans. Inform. Theory, vol. 58 (2012) 5287-5301.
Horne et al., "An information theory for the prediction of SAR target classification performance," Proc. SPIE (2001) 404-415.
United States Patent and Trademark Office, Non-Final Office Action in U.S. Appl. No. 16/666,516 mailed Oct. 31, 2022, 96 pages total.
Hassan, Rania et al. "Spacecraft Reliability-Based Design Optimization under Uncertainty Including Discrete Variables." AIAA Journal of Spacecraft and Rockets vol. 45 No. 2 [Published 2008][Retrieved Jan. 2022] <DOI: : 10.2514/1.28827> URL: https://arc.aiaa.org/doi/pdf/10.2514/1.28827> (Year: 2008).
Heard, Nicholas, and Melissa Turcotte. "Monte Carlo convergence of rival samplers." arXiv preprint arXiv:1310.2534 (2013). (Year: 2013).
U.S. Appl. No. 16/666,516, filed Oct. 29, 2019, Non-Final Office Action dated Jan. 20, 2022, 49 pages.
U.S. Appl. No. 16/666,516, filed Oct. 29, 2019, Non-Final Office Action dated Aug. 2, 2024, 34 pages.

* cited by examiner

| $p(x_0,y_5)$ | $p(x_1,y_5)$ | $p(x_2,y_5)$ | $p(x_3,y_5)$ | $p(x_4,y_5)$ | $p(x_5,y_5)$ | | $p_y(y_5)$ |
|---|---|---|---|---|---|---|---|
| $p(x_0,y_4)$ | $p(x_1,y_4)$ | $p(x_2,y_4)$ | $p(x_3,y_4)$ | $p(x_4,y_4)$ | $p(x_5,y_4)$ | | $p_y(y_4)$ |
| $p(x_0,y_3)$ | $p(x_1,y_3)$ | $p(x_2,y_3)$ | $p(x_3,y_3)$ | $p(x_4,y_3)$ | $p(x_5,y_3)$ | | $p_y(y_3)$ |
| $p(x_0,y_2)$ | $p(x_1,y_2)$ | $p(x_2,y_2)$ | $p(x_3,y_2)$ | $p(x_4,y_2)$ | $p(x_5,y_2)$ | | $p_y(y_2)$ |
| $p(x_0,y_1)$ | $p(x_1,y_1)$ | $p(x_2,y_1)$ | $p(x_3,y_1)$ | $p(x_4,y_1)$ | $p(x_5,y_1)$ | | $p_y(y_1)$ |
| $p(x_0,y_0)$ | $p(x_1,y_0)$ | $p(x_2,y_0)$ | $p(x_3,y_0)$ | $p(x_4,y_0)$ | $p(x_5,y_0)$ | | $p_y(y_0)$ |

| $p_x(x_0)$ | $p_x(x_1)$ | $p_x(x_2)$ | $p_x(x_3)$ | $p_x(x_4)$ | $p_x(x_5)$ |
|---|---|---|---|---|---|

*FIG. 28*

FANO-BASED INFORMATION THEORETIC METHOD (FBIT) FOR DESIGN AND OPTIMIZATION OF NONLINEAR SYSTEMS

CROSS-REFERENCE TO RELATED APPLICATIONS

The present application is a continuation-in-part of U.S. patent application Ser. No. 16/666,516, entitled "Fano-Based Information Theoretic Method (FBIT) for Design and Optimization of Nonlinear Systems", filed 29 Oct. 2019, which in turn is a continuation-in-part of U.S. patent application Ser. No. 14/315,365, entitled "Fano-Based Information Theoretic Method (FBIT) for Design and Optimization of Nonlinear Systems", filed 26 Jun. 2014, which in turn claims the benefit of priority under 35 U.S.C. § 119(e) to U.S. Provisional Application Ser. No. 61/914,429 entitled "Fano-Based Information Theoretic Method (FBIT) for Design and Optimization of Nonlinear Systems," filed 11 Dec. 2013, the contents of all of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

This invention relates generally to the field of information theory. More particularly, it relates to an information theory method that uses the Fano equality with the Data Processing Inequality in a Markovian channel construct for the study of component-level uncertainty and information loss within a system.

2. Description of the Related Art

Recent innovations in radio frequency (RF) sensing component technology, particularly in the area of remote target signature measurement and exploitation, include multi-channel spatially diverse antennas, sensitive receivers, fast analog-to-digital converters, adaptive transmit waveforms, and sparse sampling approaches. These innovations support new signature information sensing functions such as calibrated target measurements, feature processing, and inference-based decision algorithms. The ability to characterize target information extraction while under the effects of system uncertainties is critical to the full application of the scientific method in the expanding trade space of the new functional capabilities, particularly regarding waveform design and the analysis of radar signatures and radar systems. Regardless of the application, the success of any information systems theory model will largely depend on its ability to address several challenges: the ability to (1) characterize the performance of modular systems within critical regions in the space of inputs while under the effects of various sources of uncertainty; (2) propagate the effects of these uncertainly sources acting on individual components within the system to the predicted system performance measures; (3) effectively minimize the overall loss in the information flow while trading costs associated with component design, and (4) operate effectively within the nonlinear high dimensional spaces inherent in many systems such as signature sensor systems.

A variety of information theoretic approaches have been formulated and applied to the area of RF sensing, particularly to the analysis and design of waveforms and radar systems such as new radar architecture referred to as the MIMO (Multiple Input Multiple Output) radar. For example, information theory-based frameworks employing a variety of techniques have been presented in the field of radar analysis, including application of the Fano bound to train and develop target classifiers in automatic target recognition (ATR) systems and use of mutual information (MI) as a similarity measure for the evaluation of suitability of radar signature training surrogates. Other approaches, such as the information bottleneck approach, have presented the radar system in terms of a Markov Chain within a channel configuration and characterized the information flow from source to sink in order to, for example, study information loss. However, existing systems theory prototypes frequently fall short in their ability to fully characterize the flow of information through the components of a sensing system while that system is subjected to the effects of system uncertainty. The ability to isolate the effects of uncertainty within the components of the system allows for component design trade methods that lead to optimal information flow.

In engineering scenarios, the error associated with system parameters is of interest. For example, the tolerance of machined components in a mechanical system are a key consideration in the manufacturing process, impacting the amount of testing and measurement needed to ensure compliance, as well as a contributing factor to overall system assembly expense (generally, the more stringent the fabrication requirements, the more expensive the end product.) Similarly, the confidence a user has in a meter reading value output by a system is also of critical importance. For example, a pilot needs to know whether the fuel gauge in an airplane cockpit indicates that the aircraft can reach its destination with 50%, 90% or 100% confidence.

The uncertainty associated with a system parameter is typically due to many sources. In traditional linear signal processing models with additive Gaussian noise, sources of uncertainty (noise) are assumed to be statistically independent. Because the sum of Gaussians is a Gaussian, the final overall uncertainty for a system output value is easily tabulated from the individual component uncertainties. Real life systems however often have nonlinear behavior. In addition, the noise may not be Gaussian, additive, or statistically independent. These deviations from the linear, additive independent Gaussian noise model quickly make uncertainty and error estimation analytically intractable. As a recourse, engineers frequently resort to numerical simulation methods such as Monte Carlo-based techniques. However, real life systems have a large number of degrees of freedom and numerical simulation in such situations must be carefully addressed. Hence, the need arises for accurate, analytically-based, methods for uncertainty estimation and propagation analysis.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which:

FIG. 28 illustrates a table of point probability distribution function and marginal probability distribution functions.

DETAILED DESCRIPTION

Figure 1:
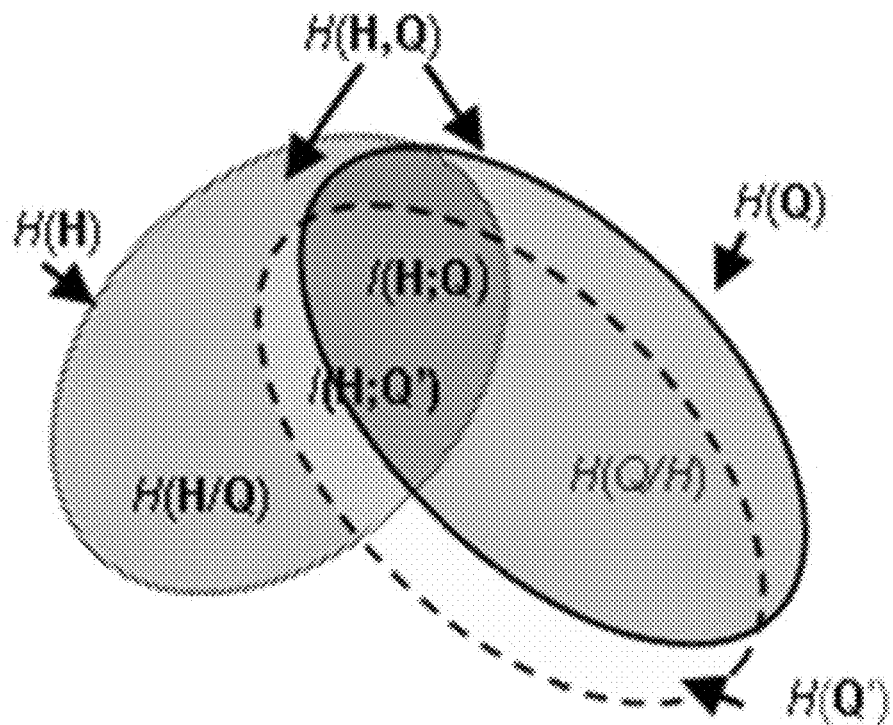
FIG. 1 is an exemplary depiction of an exemplary decision rule subspace.

The present disclosure includes theoretical models and methods for identifying and quantifying information loss in a system due to uncertainty and analyzing the impact on the reliability of system performance. These models and methods join Fano's equality with the Data Processing Inequality in a Markovian channel construct in order to characterize information flow within a multi-component nonlinear system and allow the determination of risk and characterization of system performance upper bounds based on the information loss attributed to each component. The present disclosure additionally includes methods for estimating the sampling requirements and for relating sampling uncertainty to sensing uncertainty. The present disclosure further includes methods for determining the optimal design of components of a nonlinear system in order to minimize information loss, while maximizing information flow and mutual information.

The present disclosure includes a method for identifying and characterizing component-level information loss in a nonlinear system comprising a plurality of components, one or more of which are subject to at least one source of uncertainty that each comprises a plurality of system uncertainty parameters. The method comprises the steps of: a) determining discrete decision states for the nonlinear system that comprise a true object state H and a decision state Q, with the discrete decision states being characterized in a Markovian channel model comprising a plurality of links that each correspond to one component of the nonlinear system; b) modeling the system uncertainty parameters to create a plurality of distributions that each comprise a plurality of values ranging from a theoretical maximum entropy to a theoretical minimum entropy for one system uncertainty parameter, in which at least one of the system uncertainty parameters is unknown; c) calculating an entropy at each component, H(H), H(X), H(Y), . . . H(Q), that is directly related to an amount of uncertainty at each component; d) computing an amount of mutual information between H and Q, I(H;Q), in which I(H;Q) is used to characterize a total system performance and the one or more sources of uncertainty increases a total amount of entropy in the nonlinear system, thereby decreasing I(H;Q) and degrading the total system performance; e) calculating an amount of cumulative component information loss from H to Q, $IL_X$, $IL_Y$, . . . $IL_Q$, in which $IL_Q$ is equal to a sum of the component-level information loss that occurs at each component, $IL_{X\Delta}$, $IL_{Y\Delta}$, . . . $IL_{Q\Delta}$, and component-level information loss occurs only within the Markovian channel model; f) correlating, using Fano's equality, at least one of $I(H;Q)$ and $IL_Q$ to the total amount of entropy to generate at least one overall probability of error, $P_e$, for the nonlinear system; g) estimating, using the Data Processing Inequality together with Fano's equality, a component-level probability of error, $P_e^X, P_e^Y, \ldots P_e^Q$; and h) correlating the component-level probability of error to the component-level information loss.

The present disclosure further includes a method for computing a component-level performance reliability and attributing a contribution of each system uncertainty parameter to the component-level performance reliability by: a) determining a real world statistical variation of the system uncertainty parameters; b) performing a Monte-Carlo simulation of a plurality of the statistical uncertainty parameters for a plurality of settings by iteratively performing, according to the present disclosure, the step of modeling the system uncertainty parameters through the step of correlating the component-level probability of error to the component-level information loss; c) calculating a component-level probability of error statistical distribution at each component; d) determining the component-level performance reliability based on a standard deviation of each component-level probability of error statistical distribution; and e) correlating the contribution of each system uncertainty parameter to the component-level performance reliability. In some embodiments, the step of performing the Monte-Carlo simulation further comprises determining a proper ensemble sample size.

The present disclosure further includes a method for determining at least one component-level ensemble sampling requirement comprising the steps of: a) determining a set of test criteria for a maximum allowable sampling uncertainty of the component-level information loss relative to the component-level probability of error statistical distributions; b) determining a sample ensemble size $N_M$ for the component-level information loss using a phase transition method; and c) computing the component-level performance reliability using a numerical simulation method on the sample ensemble size $N_M$. In some embodiments, the numerical simulation method comprises Monte Carlo modeling.

The present disclosure further includes a method for determining an optimal component design for a nonlinear system comprising a plurality of components, one or more of which are subject to at least one source of uncertainty that each comprises a plurality of system uncertainty parameters. The method comprises the steps of: a) establishing an information loss budget comprising a desired $P_e^Q$; b) calculating, according to the present disclosure, the component-level information loss, $IL_{X\Delta}, IL_{Y\Delta}, \ldots IL_{Q\Delta}$; c) calculating, according to the present disclosure, component probability of error, $P_e^X, P_e^Y, \ldots P_e^Q$, to generate a calculated $P_e^Q$; d) comparing the calculated $P_e^Q$ with the desired $P_e^Q$; e) identifying at least one source of information reduction that comprises component-level information loss and/or information flow reduction; f) determining the optimal component design to minimize the calculated $P_e^Q$ that includes at least one tradeoff between information flow and component design, in which the tradeoff decreases the at least one source of information reduction; and g) repeating the step of calculating component-level information loss through the step of determining the optimal component design until the calculated $P_e^Q$ is equal to or less than the desired $P_e^Q$. In some embodiments, the method further comprises identifying at least two sources of information reduction that comprise component-level information loss and/or information flow reduction, ranking the two or more sources of information reduction according to impact on the calculated $P_e^Q$ to identify at least one dominant source of information reduction, and determining the optimal component design to minimize the calculated $P_e^Q$, in which the optimal component design includes at least one tradeoff between information flow and component design that reduces the at least one dominant information loss source.

The present disclosure includes theoretical models and methods for identifying and quantifying information loss in a system due to uncertainty and analyzing the impact on the reliability of (or confidence in) system performance. These models and methods join Fano's equality, which is derived from Fano's inequality, with the Data Processing Inequality in a Markovian channel construct. In particular, the presently disclosed invention allows for the study of information flow and the effects of uncertainty on the information flow within the various components of a system. The present disclosure allows the determination of risk and characterization of system performance upper bounds based on the information loss attributed to each component. Taking an information theoretic view, degrading effects are considered as sources of entropy, which may be used to represent propagating uncertainty within an information channel. Treating the system as an information flow pipeline from input to output, the propagating effects of various sources of uncertainty (i.e. entropy) degrade the mutual information (MI) between the input and output. Development and application of a systems theory model allows for performing component-level design trades within the information sensing application based on a component-level information loss budget (Bits). Demonstration of the max flow in conjunction with the Data Processing Inequality further identifies information flow bottlenecks and provides analysis of these bottlenecks in the information flow pipeline.

The presently disclosed models and methods may be particularly useful within radar signature exploitation systems, and as such, key attributes of the presently disclosed theoretical models and methods are demonstrated under the constraints of a radar high range resolution (HRR) sensor system example. Simplified target scattering models are used to illustrate the value of component-level analysis under the effects of various sources of uncertainty in sensing systems. While the present disclosure is often referenced throughout with relation to radar and radar systems, one of ordinary skill in the art will appreciate that these models and methods may be employed in the design and analysis of a wide variety of systems and structures, including production/assembly lines, communications systems, and virtually any other multi-component system containing sources of uncertainty.

The use of information theoretic principles in the presently disclosed models and methods affords several advantages in dealing with the challenges associated with a variety of systems, particularly those in the areas of information sensing and exploitation. First, information theory prototypes enable the study of the propagating effects of various sources of uncertainty on system performance at the point of noise infiltration. For example, using Fano's inequality, the max flow criteria bounds the optimal Bayes error. Entropy and MI are analytically connected to the probability of error $(P_e)$, and more generally the Neyman Pearson criteria, allowing for the rate of noise infiltration to be related to the rate of entropy growth and ultimately to the rate of degradation of system performance. The information loss associated with uncertainty sources can then be characterized in terms of a confidence interval about the predicted system performance at each component of the system. The Data Processing Inequality affords a method to determine information loss points and maximize information flow via component trades within a system information loss budget.

Second, the convexity of MI yields a unique solution and enables rapid numerical convergence (low computational complexity) to maximum MI configurations. MI affords the optimization of a scalar quantity, while classical Bayes likelihood ratio techniques involve optimizing on non-convex surfaces over high dimensional signature spaces. On a convex surface, the use of highly efficient search algorithms such as the Conjugate Gradient method will converge on the order of $N$ operations ($N$ dimensional problem). While entropy-based methods operate non-parametrically such that the probability does not have to be estimated, complicating factors can include numerical computation issues that occur within high dimensional processes (Bellman's Curse of Dimensionality). It can be shown, however, that computing the entropy of the multi-variate sensor signature processes is also $O(N)$. As a consequence of the law of large numbers, the asymptotic equipartition property asserts that there are large regions within the entropic signature subspace that will never occur under the decision hypotheses. Thus, the information theoretic approach holds the potential to exploit entropy-based methods operating within this "typical" signature subspace.

Third, classical statistical pattern recognition approaches use the maximum likelihood (ML) decision criteria, which include only the second order statistics present in the training process. The use of MI in nonlinear processing affords advantages over linear processing in that it accounts for higher-order statistics within the design of nonlinear optimal decision rules and in the optimization of features. In the context of radar systems, nonlinear scattering phenomenon resulting from the interaction of individual target mechanisms can also reduce the effectiveness of second order techniques in the optimization of diverse transmit waveforms. The use of MI as a nonlinear signal processing method for optimizing waveform design will address this phenomenon. It is these inherent benefits that distinguish the presently disclosed information theoretic models and methods over traditional statistical pattern recognition methods.

The present disclosure additionally includes methods for estimating the sampling requirements for entropic quantities based, for example, on a characterization of the typical set underlying the sufficient statistics of a random signature process. Interdependencies among multivariate target signatures can significantly impede information extraction, and the expansion of the signature statistical support is related to incremental increases in uncertainty. Baseline statistical support (in the native coordinate system) associated with the resolved radio frequency target scattering is characterized for specified states of certainty. The performance estimate variance associated with lower sample counts within a Monte Carlo experiment may be scaled (via central limit theorem) to the estimate variance associated with higher sample counts.

The present disclosure further includes methods for relating sampling uncertainty to sensing uncertainty to better understand the entropic effects within the information sensing system and to ensure confidence estimates are of sufficiently low variance. Referring to radar signature analysis, both sensor uncertainty and model training uncertainty are propagated into a classifier algorithm where uncertain decisions are inferred from uncertain observations. The uncertainty (i.e. the increase in entropy) is ultimately realized in the form of confidence or reliability intervals about the estimated system performance. A sensitivity analysis is performed to study the relative significance of various "unknown" operating conditions to the reliability of the performance estimate at each component of the system. The effects of sampling uncertainty are contrasted to reliability of performance estimates in order to study the variance effects in performance estimation within high dimensional signature processes subject to unknown operating conditions.

Uncertainty Analysis: In the sensor measurement community, "accuracy" generally refers to the agreement between a measured value and the true or correct value, while "precision" generally refers to the repeatability of a measurement. "Error" refers to the disagreement between the measured value and the true or accepted value. The "uncertainty" in a stated measurement is the interval of confidence around the measured value such that the measured value is expected not to lie outside this stated interval. This use of the term "uncertainty" implies that the true or correct value may not be known and can be stated along with a probability, which recognizes the deterministic nature of error and the stochastic nature of uncertainty. However, this definition is often insufficient to address the full range of issues within an information sensing system containing multiple sources of uncertainty.

For example, radar systems produce signature measurements that when combined with the effects of various system uncertainties, are realized as a random signature process. Conclusions are inferred by applying instances taken from this random measured signature process to a decision rule. The "unknowable" nature of parameters affecting the measured signature process leads to challenges in developing a signature process model that will generate the optimal decision rule for inferring information. The combined effects of these uncertainties limit the exploitation of physics-based features and result in a loss in information that can be extracted from target signature measurements. The resulting decision uncertainty is driven by both the distorted measurements and the degree of agreement between the signature process under measurement and the process used to train the optimal decision rule.

As a specific example, measurement of airborne moving objects using high range resolution (HRR) waveforms is complicated by several sources of uncertainty. As shown in Table 1, two classes of system uncertainty are introduced into the system: sensing uncertainty and uncertainty resulting from decision rule training limitations. Sensing uncertainty is further divided into three subcategories: (a) signature measurement uncertainty due to sensor design/limitations; (b) object tracking position and motion uncertainty; and (c) uncertainty due to interference.

The object under measurement by the sensing radar system can be viewed as a collection of scattered field sources filling an electrically large volume in space. The system measurement of this object is subject to uncertainty identified in source 1(a) generating the statistical support underlying a random signature process at a fixed position in time. Target fixed body motion within the measurement interval induces scintillation within the scattering sources, resulting in an additional increase in entropy. Imperfect knowledge of target position, velocity, and aspect also alters the statistical characterization of the random signature process (source 1(c)), and the random signature process interacts with an external environment (source 1(b)) to further impact the statistical nature of the measured signature process.

TABLE 1

RADAR SYSTEM UNCERTAINTY SOURCES

| Uncertainty Core Area | Parameter Uncertainty Subcategory | | |
|---|---|---|---|
| 1. Sensing | | | |
| (a) Signature Measurement | Nonlinear Effects | I&Q Quantization/Clipping | Amplitude & Phase Calibration |
| (b) Environmental | Clutter/Thermal Noise | RF Interference | Jamming |
| (c) Object Tracking & Motion | Object Range, Velocity, & Aspect Estimates | Object Articulation | Intra-measurement Motion |
| 2. Decision Rule Training Limitations | Process Under Sampling | Target Configuration Variation | Target Modeling Parameters |

These sources of uncertainty, along with limitations within the training process, result in a decision rule design that is less than optimal with respect to system performance. The exploitation of this signature process using a decision algorithm requires the training (generally via supervised learning) of an optimal decision rule that operates within the entropy produced by sources 1(a)-(c), but only a subset of the phenomenon (parameters) underlying source 1 can be modeled and/or characterized within the statistical decision rule training process. While uncertainty source 1(a) is generally epistemic and may be modeled and characterized, uncertainty sources 1(b), 1(c), and 2 are aleatoric in nature and are generally considered "unknowable." As such, uncertainty sources 1(b), 1(c), and 2 may generally only be characterized statistically and may result in a reduction in certainty from the highest certainty state.

The sources of uncertainty associated with source 2 in Table 1 are traceable to the corresponding effect within the decision rule subspace in the classical statistical pattern recognition approach to the binary hypothesis testing. The decision rule design (threshold d) is based on statistical training support resulting from the uncertainties in Table 1. If the sensing uncertainties within source 1 are adequately represented in the statistics of the training process, the decision rule design should provide optimal performance; however, the effects due to many of the uncertainties in Table 1 are unavoidable. For example, realizations are often formed through the integration of many sequential measurements. Intra-measurement object motion can cause distortion and induce uncertainty in the decision rule subspace that is not accounted for in the decision rule training process. In another example, the object under measurement may be configured differently than that represented in the training data (extra fuel tanks, wing flaps up, or damaged surface for example).

Information Theoretic Decision Rule Subspace: Referring now to the drawings, like reference numerals may designate like or corresponding parts throughout the several views. One approach to viewing the decision rule subspace is shown in FIG. 1, where the decision rule subspace is cast in terms of information theoretic quantities based on entropy, which is a measure of the size of a typical set. In FIG. 1, information is defined in terms of the MI, I(H;Q), I(H;Q'), between the "typical subspaces" associated with the true object state H and the decision state Q, where H and Q are discrete random variables and Q is of the same alphabet as H. FIG. 1 also includes an additional subspace H(Q'), which represents an altered Q based on a non-optimal decision rule (discussed in more detail herein). Systems (and associated sub-component) designs that increase the MI between these "typical signature subspaces" increase the flow of information, while the introduction of sources of uncertainty acts to alter to the typical signature subspaces (growth or movement) associated with the highest certainty state. A change to the typical subspaces can result in a loss in the flow of information and a decrease in decision performance, creating overlapping subspaces that reflect a decreased amount of MI.

Figure 2:
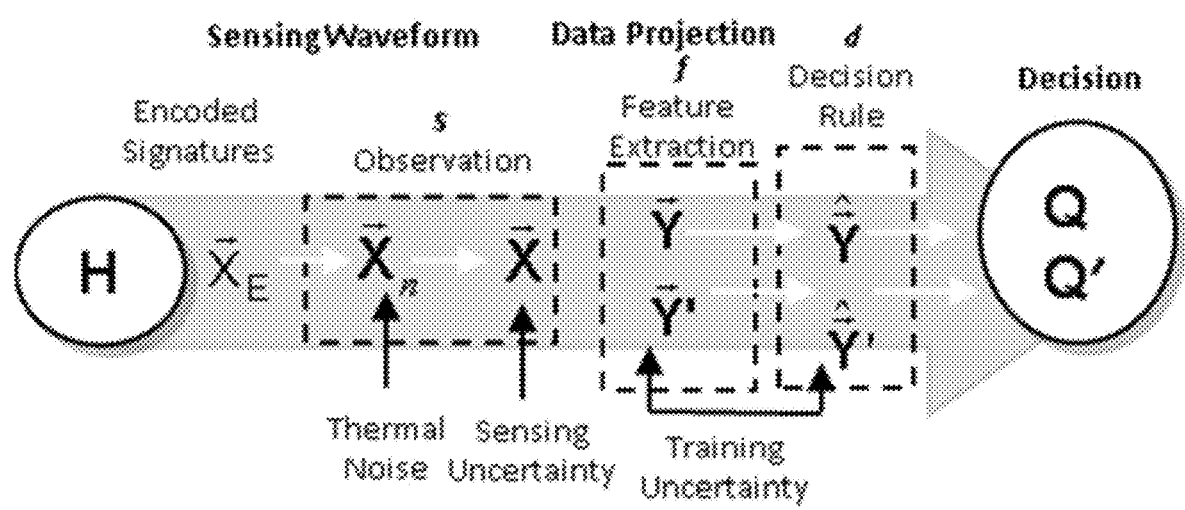
FIG. 2 is an exemplary depiction of an exemplary Markovian channel model.

Information Theoretic Radar Channel Model: The concept of uncertainty introduced in FIG. 1 may be realized in terms of an increase in entropy within a Markov chain, which is a discreet memoryless information channel referred to herein as a Markovian channel. Information sensing systems such as a radar information sensing system may be viewed within this Markovian channel model, which is depicted in FIG. 2 as the information flow through the signature sensing and processing components of a radar system. In FIG. 2, the relationship between H and Q is the basis chosen for performance characterization. The discrete random variable H represents which of the $N_c$ possible hypotheses has occurred. Successful flow of information results in agreement between H and Q.

Figure 3A:
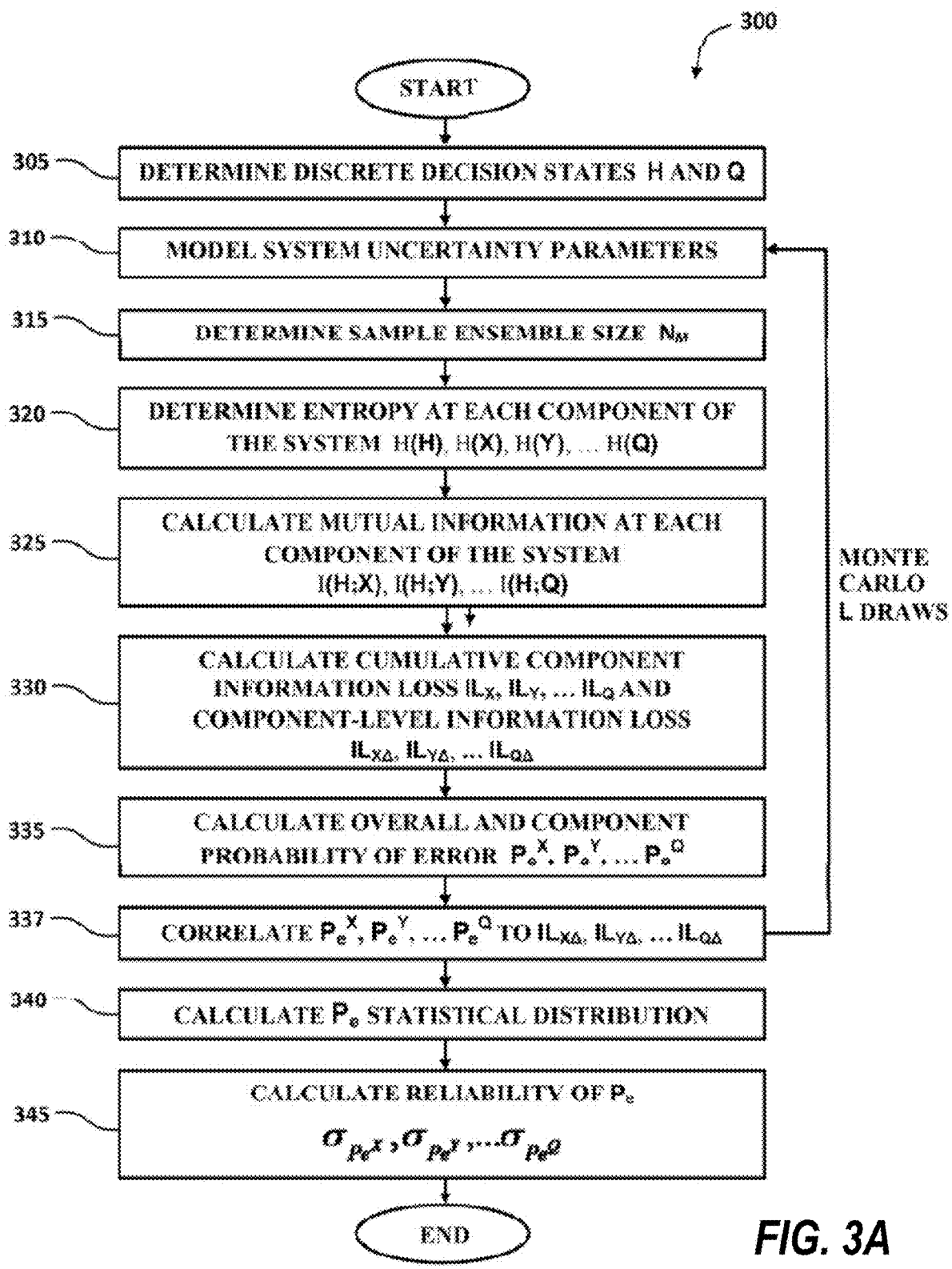
FIG. 3A is a flowchart illustrating an exemplary method according to the present disclosure for characterizing information flow and loss in a nonlinear system comprising two or more components that are subject to one or more sources of uncertainty.

Referring to FIGS. 2 and 3, exemplary models and methods according to the present disclosure will be described. FIG. 3A is a flowchart illustrating an exemplary method 300 for identifying, characterizing, and quantifying information loss in a nonlinear system that comprises two or more components or links that experience information loss due to one or more sources of uncertainty. The method 300 begins with determining discrete decision states i.e. input and output states for the nonlinear system (Step 305). These discrete decision states may comprise a true object state (input) H and a decision state (output) Q, where H and Q are of the same alphabet and are characterized in a Markovian channel model, where the model comprises a plurality of links that each correspond to one component of the nonlinear system.

One or more of the components of the system comprising links or stages within the Markovian channel model, referred to here as X, Y, . . . , is subject to at least one source of uncertainty. In Step 310, these sources of uncertainty, each of which may comprise a variety of governing system uncertainty parameters or variables, are modeled. Modeling the parameters creates a series of distributions, each of which represents a set of values ranging from the theoretical maximum value of entropy to the theoretical minimum value for each parameter. For example, in a radar system, these variables may include values that are constantly changing and/or that are unknowable or aleatoric such as the target aspect angle, the leading edge location, thermal noise, the presence of jamming frequencies, etc. These aleatoric variables must generally be characterized statistically, and these characterizations may be in the form of statistical distributions or in the case of radar systems, range bins.

Continuing with the radar system example, X in FIG. 2 is generally a multidimensional probability distribution of radar returns, which become multidimensional probability distribution Y following signal processing, and Q denotes the classifier algorithm decision of which hypothesis H (instance of H) occurred based on Y. Conditioned on the generating hypothesis H (instance of H), there is typically a multidimensional encoded source $\vec{X}_E$, which is realized as the image projection of the scattered field of the object under measurement i.e. a target. In this context, $\vec{X}_E$ is deterministic, resulting from the convolution of the target's physical scattering mechanisms with the transmitted waveform s, and given the "unknowable" nature of this code through measurement or modeling, the code itself is only observable in the random form of $\vec{X}$. In the case of HRR radar measurements, $\vec{X}_E$ is the band-limited frequency response associated with the scattered field of the observed object in thermal noise. As shown for example in FIG. 2, after mixing, filtering, and signal processing, these returns become the measured random signature vector $\vec{X}_n$. The sensing of $\vec{X}_n$ is subjected to the uncertainties listed in source 1 of Table 1, leading to the random signature process $\vec{X}$. The various cases of the sensed signature are summarized in Table 2.

TABLE 2

SENSOR MEASUREMENT SIGNAL CASES

| | |
|---|---|
| Encoded Deterministic Multivariate Signal | $\vec{X}_E$ |
| Deterministic Signal in Additive Noise | $\vec{X}_n = \vec{X}_E + \vec{n}$ |
| Random Multivariate Signal in Additive Noise | $\vec{X} = \vec{X}_E + \vec{n}$ |

The multivariate sample feature $\vec{Y}^i$ is extracted from the $i^{th}$ instance test sample $\vec{X}^i$ to support the desired function of the exploitation system. Given the random nature of $\vec{X}$, the extracted signature feature $\vec{Y}$ is also random. The training feature process $\vec{Y}$' is developed from the set of typical signatures within a decision rule training process $\vec{X}$' (not separately shown). $\vec{X}$' (and thus $\vec{Y}$') is developed offline using a surrogate process and is used to determine the 'optimal' decision rule d. The decision algorithm applies $\vec{Y}^i$ to the decision rule d, yielding the decision Q (instance of Q) declaring which of the hypotheses has occurred.

Referring still to FIG. 3A, the method 300 continues with determining a sample ensemble size $N_M$ (Step 315) as described in more detail herein. For example, $N_M$ may be determined using a phase transition method (also described in more detail herein). In the radar system example, the evaluation of an ensemble $N_M$ of test samples $\vec{X}^i\{i=1 \rightarrow N_M\}$ produces the sample ensemble of the $N_M$ matching tests (H,Q) to statistically characterize the decision performance.

Following determination of the sample ensemble size $N_M$ (Step 315), the next step is calculating an amount of entropy at each component of the system (Step 320). An instance of each parameter is drawn from the distributions created in Step 310, and based on the $N_M$ ensemble of samples calculated in Step 315, the entropy is determined for each component of the system H(H), H(X), H(Y), . . . H(Q). The amount of entropy at each component of the system is equal to H(H), H(X), H(Y), . . . H(Q), respectively, and a total amount of entropy for the system is equal to the sum of the entropies at each component. The next step is computing the amount of MI between H and all other components, including the output of the system at Q, I(H;X), I(H;Y), . . . I(H;Q)(Step 325). The one or more sources of uncertainty may cause a degradation of performance by increasing the amount of entropy in the nonlinear system and thus decreasing I(H;Q). I(H;Q) may be mathematically related to the total system performance as described herein, thereby allowing a correlation between increases in entropy, decreases in MI, and changes in system performance.

Following calculation of MI in Step 325, the next step is determining an amount of cumulative component information loss from H to each component, including the output component at Q, $IL_X$, $IL_Y$, . . . $IL_Q$, as well as component-level information loss $IL_{X\Delta}$, $IL_{Y\Delta}$, . . . $IL_{Q\Delta}$ (Step 330). $IL_Q$ is equal to an end-to-end sum of the component-level information loss that is occurring at each component. Information cannot be gained and can only be lost within the Markovian channel. In the context of the radar system example, these sources of component information loss may include, for example, loss due to uncertainty in the sensing and/or feature extraction processes, as well as loss occurring from the decision process due to imperfect training. $IL_{X\Delta}$, $IL_{Y\Delta}$, . . . $IL_{Q\Delta}$ may be determined by apportioning the $IL_Q$ determined in Step 330 among each component. Because $IL_Q$ is equal to a sum of the component-level information loss i.e. the information loss that occurs at each link or component within the system, $IL_X$, $IL_Y$, . . . $IL_Q$ may be used to determine $IL_{X\Delta}$, $IL_{Y\Delta}$, . . . $IL_{Q\Delta}$.

The next step in the method 300 is calculating a predicted overall system performance $P_e$ and the predicted link performance i.e. the component probability of error $P_e^X$, $P_e^Y$, . . . $P_e^Q$ (Step 335). Using Fano's equality, cumulative information loss, which may be, for example 1-I(H;Q) and/or $IL_Q$, is correlated with the total amount of entropy associated with system uncertainties as determined in Step 320, with this correlation being characterized as at least one overall probability of error $P_e$ for the nonlinear system i.e. the overall system performance. Using Fano's equality and the Data Processing Inequality together, $P_e$ may be used to estimate a component-level probability of error $P_e^X$, $P_e^Y$, . . . $P_e^Q$ for each component in the system. In Step 337, $P_e^X$, $P_e^Y$, . . . $P_e^Q$ may then be correlated to $IL_X$, $IL_{Y\Delta}$, . . . $IL_{Q\Delta}$.

Steps 310 to Step 335 may be repeated until the number of instances of the statistically distributed of uncertainty parameters calculated in Step 310 are realized. In one embodiment, this iterative sampling process may comprise a Monte Carlo method in which L draws are taken from the distribution of modeled uncertainty parameters (Step 310).

Once a sufficient number of samples (L) have been obtained, the method 300 continues with determining the statistical distribution of each component probability of error due to the various sources of parameter uncertainty (Step 340). The variance and mean of the cumulative component information loss $IL_X$, $IL_Y$, . . . $IL_Q$ calculated in Step 330 are used to determine the variance on the predicted performance at each link or component. A distribution is created for each source of uncertainty, providing the random mapping to the performance estimate $P_e$ at each component $P_e^X$, $P_e^Y$, . . . $P_e^Q$.

The statistical distribution of the component probability of error is then used to compute the reliability of the component probability of error (Step 345), followed by termination of the method. The standard deviation $\sigma_{P_e}{}^X$, $\sigma_{P_e}{}^Y$, ... $\sigma_{P_e}{}^Q$ of the respective predicted component performance functions $P_e{}^X$, $P_e{}^Y$, ... $P_e{}^Q$ is used as a measure of reliability. In this manner, the presently disclosed method 300 may be used to estimate the reliability (or confidence) of a component-level probability of error for each component in the system, and this component-level probability of error and associated reliability may then be correlated to the component-level information loss. The presumption is that for a fixed H(H), maximizing I(H,Q) will minimize the equivocation H(H/Q) and thus minimize the probability of error $P_e$. Unknown parameters can affect performance estimates thus knowledge of this reliability is needed to effectively minimize $P_e$ in design.

In addition, the presently disclosed method allows the determination of the relative contribution of each system uncertainty parameter to the component-level performance reliability, as well as a comparison of the performance reliability estimates determined in Step 345 to real world uncertainty sources. This determination can be very helpful in the traceability of the effects of uncertainty on the reliability of performance. The disclosed method of decomposition will allow for designers to identify where the uncertainty is having the most detrimental effect on performance reliability. The ability to perform this traceability at the component level will further allow component designers to design for the minimum effects of uncertainty.

In one embodiment, a method for computing component-level performance reliability and attributing the contribution of each system uncertainty parameter to the component-level performance reliability may begin with determining a real world statistical variation of the system uncertainty parameters. In this context, "real world" refers to information obtained using actual events and/or experiments. For example, continuing with the radar system example, a variety of uncertainties exist, many of which occur due to chance and are hence unknowable. Samples obtained under real world conditions are subject to a variety of these system uncertainty parameters (known and unknown), and the statistical variation of the system uncertainty parameters may be calculated as described above. Following determination of real world statistical variation of the system uncertainty parameters, the method continues with performing Monte-Carlo modeling of a plurality of the statistical uncertainty parameters for a plurality of settings to determine component-level information loss. This step may occur, for example, through many iterations of Steps 310 to 335 in FIG. 3A as described above, followed by calculating a component-level probability of error statistical distribution at each component as in Step 340 and calculating a component-level performance reliability based on a standard deviation of each component-level probability of error statistical distribution as in Step 345.

The contribution of each system uncertainty parameter is then correlated to the component-level performance reliability. This calculation may be performed, for example using Eq. (34) described herein. The independent nature of the individual system uncertainty parameters allows the effects of each parameter to be seen. Using the Data Processing Inequality, a decomposition of reliability may be obtained so that the decomposition of reliability effects may be seen at each component. These calculations may be used to determine how well the information sensing system performs when real world data is used and to determine the acceptability of performance reliability with respect to real world uncertainty sources.

Figure 3B:
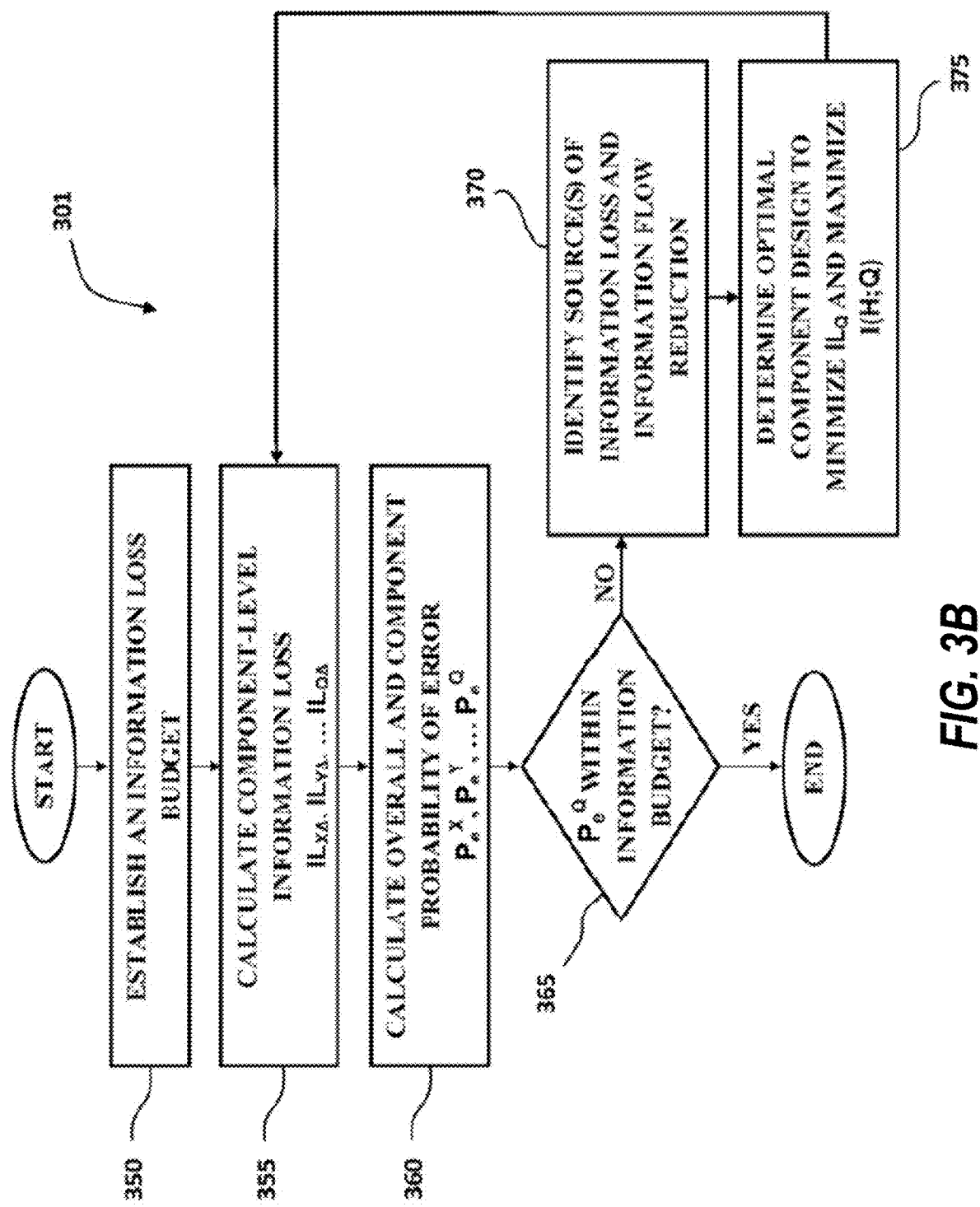
FIG. 3B is a flowchart illustrating an exemplary method according to the present disclosure for determining optimal component design for a nonlinear system comprising two or more components that are subject to one or more sources of uncertainty.

The presently disclosed invention further includes methods for determining the optimal design of components of a nonlinear system in order to minimize information loss, while maximizing information flow and MI. Referring to FIG. 3B, the method begins with establishing an information loss budget for the complete system (Step 350) in terms of a desired performance, such as establishing a desired value for $P_e{}^Q$. The $P_e{}^Q$ for the total system may be related directly to the total system cumulative information loss $IL_Q$. In Step 355, a predicted component/link loss (for example; $IL_{X\Delta}$, $IL_{Y\Delta}$) is calculated, followed by calculation of a component/link performance (for example; $P_e{}^X$, $P_e{}^Y$) (Step 360). Steps 355 and 360 may be accomplished, for example, using the method in FIG. 3A. The next step (Step 365) is to compare the $P_e{}^Q$ calculated in Step 360 with the desired $P_e{}^Q$ value determined in Step 350. If the calculated $P_e{}^Q$ is within the information budget ("Yes"), the method terminates.

However, if the calculated $P_e{}^Q$ exceeds the information loss budget ("No"), the method may continue with identifying one or more sources of information loss and information flow reduction i.e. bottlenecks (Step 370). In some embodiments, there are two or more of information loss and information flow reduction, and the method further includes the step of identifying the dominant source(s) of information loss and information flow reduction i.e. bottlenecks (Step 370). These dominant sources may be identified by ranking the various sources of uncertainty at each link/component (for example; $IL_{X\Delta}$, $IL_{Y\Delta}$) based on their individual impact on cumulative component information loss and performance of the system.

The next step is determining the optimal component design to minimize $P_e{}^Q$ and $IL_Q$, while maximizing I(H;Q) (Step 375) within the information budget via one or more trade-offs between information flow and component design (described in more detail herein). Following determination of the optimal component design in Step 375, the method returns to Step 355 to continue component design iterations guided by relative levels of component information loss within a system component/link loss budget until a component design is determined that keeps the calculated $P_e{}^Q$ within the desired information loss budget established in Step 350.

Fano-Based Information Theoretic Method (FBIT) and Data Processing Inequality: Fano's Inequality and the Data Processing Inequality, both of which are theorems from information theory, may be used in Step 335 of the method in FIG. 3A to quantify the effects of "uncertainty" and the associated alteration to the typical signature subspaces in terms of the flow of information and the impact to system performance. Fano's Inequality relates information theoretic quantities to the $P_e$(probability of error) criterion in for example, an object classification system, while the Data Processing Inequality allows the analysis of information flow from measured object returns through the signature sensing, signal processing architecture and into the decision stage. The Data Processing Inequality may be used to identify where information is lost and quantify the impact on system performance. In this manner, stages in the information processing pipeline where information is lost can be identified, analyzed, and optimized, leading to improvement in overall system performance.

Fano's Inequality provides a mathematical means to relate the MI between H and Q, I(H;Q), to a lower bound on $P_e$. Fano's Inequality may be written as an equality as in Equation (Eq.) (1):

$$H(P_e) = \delta - P_e \cdot \log(N_c - 1) + H(H/Q) \qquad (1)$$

In Eq. (1), $P_e$ is a real random variable between 0 and 0.5 representing the probability of error of the decision algorithm. $N_c$ is the discrete size of the alphabet of H and Q. H(H) is the Shannon entropy of the discrete random variable H. $\delta$ is a bias offset derived from asymmetries in the data and decision algorithm. Typically, $\delta$ is small and to a first approximation, may be neglected.

Theorem I: For $N_c=2$, Fano's equality can be written as $H(P_e)=1-I(H;Q)+I(Q;V)$, where V is the binary discrete random variable representing the probability that the decision rule makes a correct decision. Using $I(H;Q)=H(H)-H(H/Q)$ and Eq. (1), Eq. (2) may be obtained:

$$H(P_e) = \delta - P_e \cdot \log(N_c - 1) + H(H) - I(H;Q) \qquad (2)$$

The asymmetry factor in Eq. (2) may be computed directly from the output of the decision algorithm. Let $\delta = I(Q;V)$ for $N_c=2$; where V is the binary discrete random variable representing the probability that the decision rule makes a correct decision. V=1 when H=Q; otherwise V=0. Eq. (2) can then be written more completely for $N_c=2$ as in Eq. (3):

$$H(P_e) = 1 - I(H;Q) + I(Q;V) \qquad (3)$$

Eq. (3) may be written in terms of the inverse entropy function, F, as shown in Eq. (4):

$$P_e = F(H(H)) - I(H;Q) + I(Q;V) \qquad (4)$$

Figure 4:
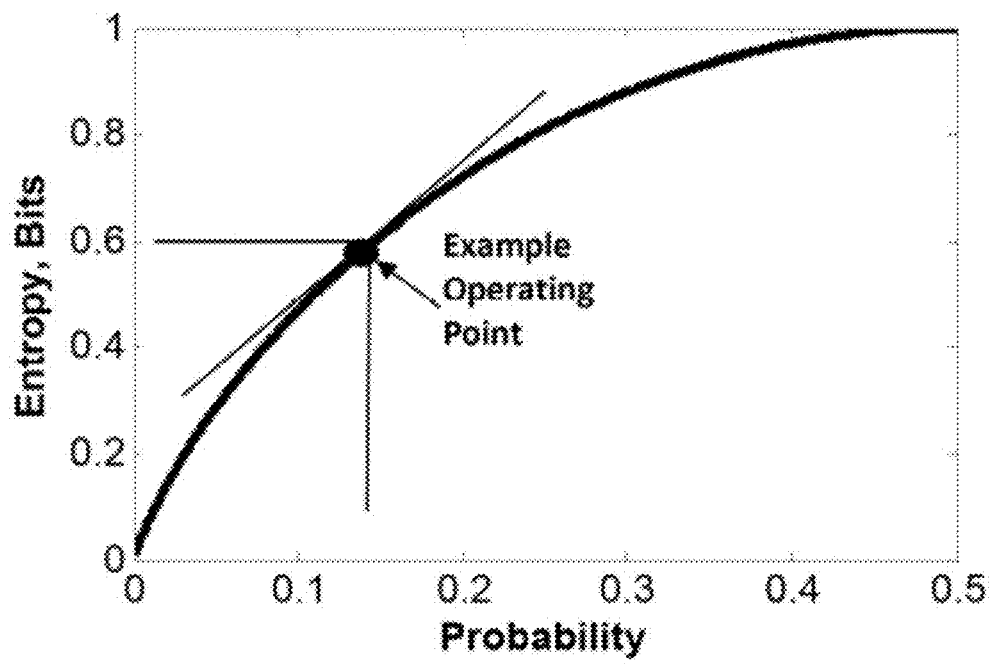
FIG. 4 is a plot illustrating the relationship of $P_e$ to $F(x)$.

In Eq. (4), F is a deterministic, strictly monotonically increasing function that maps information theoretic quantities into the $P_e$ at the corresponding operating point. The relationship of $P_e$ to $F(x)$ where $x \in [0, 0.5]$ is shown in FIG. 4, which illustrates the binary entropy function. The quantity $IL_Q$ in Eq. (5) is the end-to-end information loss for the system that is determined in Step 330 in FIG. 3A:

$$IL_Q = H(H) - I(H;Q) + I(Q;V) \qquad (5)$$

In general, minimizing the information loss minimizes the system $P_e$. The entropic quantity H(H) is determined by the a priori probabilities of the outcomes of the random variable H corresponding to the different target classes. $\delta$ is fixed by architectural considerations. Since F is a known function, the deterministic relation $P_e = F(H(H) - I(H;Q) + I(Q;V))$, for fixed H(H) and $\delta$, determines the MI, I(H;Q), needed to achieve a specified $P_e$. For example, for an equiprobable binary hypothesis scenario, H(H)=1 Bit and $I(Q;V) \approx 0$, an approximation for $P_e$ can be written as Eq. (6):

$$P_e \approx F(1 - I(H;Q)) \qquad (6)$$

Figure 5:
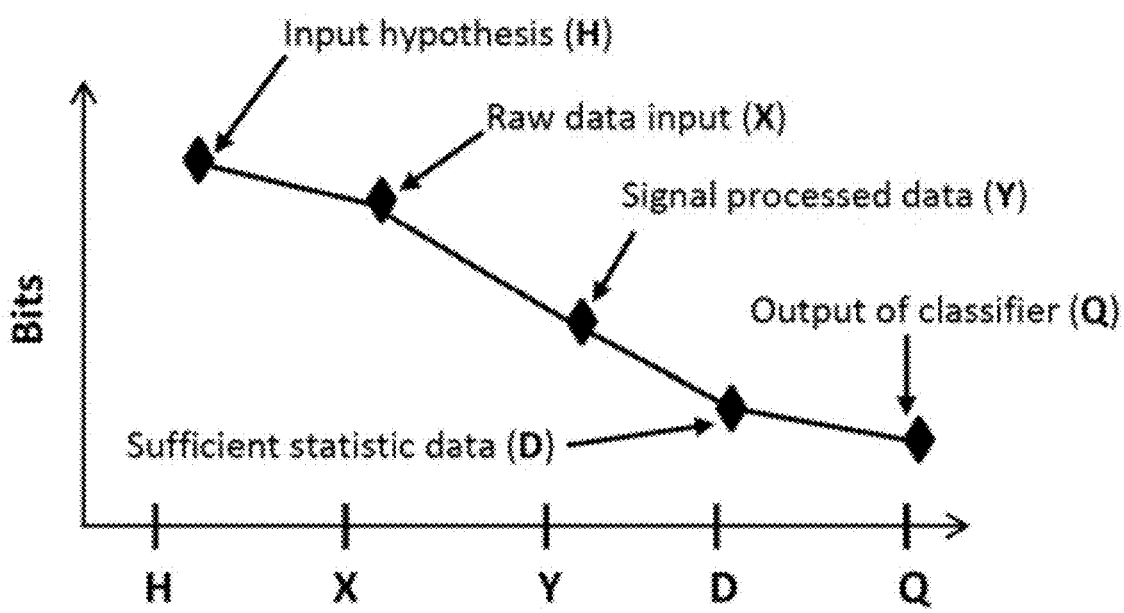
FIG. 5 is an exemplary plot illustrating possible tradeoffs between information vs. component design.

Specifying a desired $P_e$ determines the amount of allowed $IL_Q$. How the $IL_Q$ budget is "spent" as information cascades from the input space at H to the classifier output space at Q can be traded off via component (link) design. FIG. 5 presents an abstract diagram indicating possible tradeoffs between component level design vs. information (Bits). Information losses within the channel can be studied with respect to various sources of uncertainty in Table 1.

The Data Processing Inequality states that information can only be lost in the channel as shown in Eq. (7):

$$I(H;\vec{X}) \geq I(H;\vec{Y}) \geq I(H;Q) \qquad (7)$$

Using the relationship in Eqs. (4) and (5), the loss associated with each link within the channel can be characterized as in Eq. (8):

$$H(H) - I(H;\vec{X}) \leq H(H) - I(H;\vec{Y}) \leq H(H) - I(H;Q) \qquad (8)$$

The approximation to the cumulative information loss at each link in the channel can then be written as below applying Eq. (5):

$$IL_{\vec{X}} \approx H(H) - I(H;\vec{X}); \; \vec{X} \in |\chi| \qquad (9.a)$$

$$IL_{\vec{Y}} \approx H(H) - I(H;\vec{Y}); \; \vec{Y} \in |Y| \qquad (9.b)$$

$$IL_Q \approx H(H) - I(H;Q); \; Q \in |Q| \qquad (9.c)$$

Theorem II: The respective information loss due to each link within a Markov chain $H \to X \to Y \to Q$ can then be approximated using Eqs. (10a-10c):

$$\text{Loss due to Sensing} = IL_{S\Delta} \approx H(H) - I(H;\vec{X}) \qquad (10.a)$$

$$\text{Loss due to Feature Extraction} = IL_{F\Delta} \approx I(H;\vec{X}) - I(H;\vec{Y}) \qquad (10.b)$$

$$\text{Loss due to Decision Rule} = IL_{D\Delta} \approx I(H;\vec{Y}) - I(H;Q) \qquad (10.c)$$

Thus, the probability of error can be estimated at various points in the channel using the approximation in Eq. (6):

$$P_e^X \approx F(H(H) - I(H;\vec{X})) \qquad (11.a)$$

$$P_e^Y \approx F(H(H) - I(H;\vec{Y})) \qquad (11.b)$$

$$P_e^Q \approx F(H(H) - I(H;Q)) \qquad (11.c)$$

Uncertainty In the Information Channel: The feature extraction $f$ and decision rule d in FIG. 2 are designed to maximize I(H;Q), but it can be seen from Eq. (2) that sources of uncertainty introduced in the channel may result in a reduction in I(H;Q) and subsequently an increase in $P_e$. A decrease in I(H;Q) is always accompanied by an increase in $H(P_e)$, resulting in a degradation to the realized $P_e$.

Referring to the radar system example, the loss at $\vec{X}$, $IL_{S\Delta}$, is due solely to the sensing process (source 1 in Table 1). The sensing uncertainty inherently alters the statistical support associated with $\vec{X}_n$, generating statistical independence between $\vec{X}_n$ and $\vec{X}$, thus degrading the performance of the signature sensing process as quantified by $P_e^X$ in Eq. (11a). The loss in information due to sensing uncertainty is then realized at $\vec{X}$ as $IL_{S\Delta}$ in Eq. (10a) and is quantified by the entropy $H(P_e^X)$:

$$H(P_e^X) \approx H(H) - I(H;\vec{X}) \qquad (12)$$

The level of statistical agreement between $\vec{X}$ and $\vec{X}'$ will directly affect the loss in the channel due solely to the decision process (source 2 in Table 2), which is closely tied to the surrogate training process $\vec{X}'$. The sensing uncertainty sources in Table 1 are to some degree reproducible in the decision rule training process $\vec{X}'$. However, sources 1(b) and 1(c) in Table 1 are not fully reproducible in $\vec{X}'$. The dissimilarity between $\vec{X}$ and $\vec{X}'$ results in a decision rule d that is less than optimal. The application of d to the feature process $\vec{Y}$ induces a loss in the channel due to imperfect training. The effects of decision uncertainty within the decision rule subspace are realized at Q as $IL_{D\Delta}$ as illustrated in FIG. 2. The decision uncertainty $IL_{DA}$ can be interpreted in terms of the entropy $H(P_e^Q)$ as in Eq. (13) and quantified as defined in Eq. (11.c).

$$H(P_e^Q) \approx H(H;Q) - H(Q) \tag{13}$$

The resulting $H(P_e^Q)$ provides the best possible performance for a given component design (radar sensor design, feature selection, algorithm design, and decision rule design). As stated above, $\vec{X}$ is often not completely observable and a training surrogate $\vec{X}'$ is used to develop $f$ and $d$. Under conditions such as those listed in uncertainty source 2 in Table 1, the surrogate representation $\vec{X}'$ used in the training of the decision rule results in a non-optimal $d$. This is represented by the altered entropic quantity $H(Q')$ and more importantly $I(H;Q')$. The alternate Markov chain $H \rightarrow \vec{X}' \rightarrow \vec{Y}' \rightarrow Q'$ is shown as the dotted subspace $H(Q')$ in FIG. 1. The corresponding form of Eq. (3) can then be written as:

$$H(P_e') = 1 - I(H;Q') + I(Q';V) \tag{14}$$

Therefore since $H(P_e') \geq H(P_e)$, $I(H;Q') - I(Q';V) \leq I(H;Q) - I(Q;V)$.

Corollary I: Information loss due to imperfect training, $IL_{TA}$, is then mathematically quantified in terms of the increase in entropy $\Delta H(P_e)$ resulting from a non-optimal design of $f$ and $d$:

$$IL_{TA} = \Delta H(P_e) = \tag{15}$$
$$H(P_e') - H(P_e) = -I(H;Q') + I(Q';V) + I(H;Q) - I(Q;V)$$

If it can be shown that $I(Q;V) \cong I(Q';V)$ and that $I(Q;V) \ll H(H) - I(H;Q)$ and $I(Q';V) \ll H(H) - I(H;Q')$, then:

$$\text{Imperfect Training Loss} = IL_{TA} \cong I(H;Q) - I(H;Q') \tag{16}$$

The decrease in information flow due to imperfect training is illustrated in FIG. 1 as the reduction in overlap between the subspaces of H and Q.

Theorem III: The total loss in the channel is equal to the sum of link information loss:

$$IL_{Total} = IL_{SA} + IL_{FA} + IL_{DA} + IL_{TA} \tag{17}$$

Definition 1: Any phenomenon producing an increase in $I(H;Q)$ and a subsequent reduction in $H(P_e)$ can be defined as a "system information gain" within the information channel. Any phenomenon producing a decrease in $I(H;Q)$ resulting in an increase in $H(P_e)$ is defined as a "system information loss."

Figure 6:
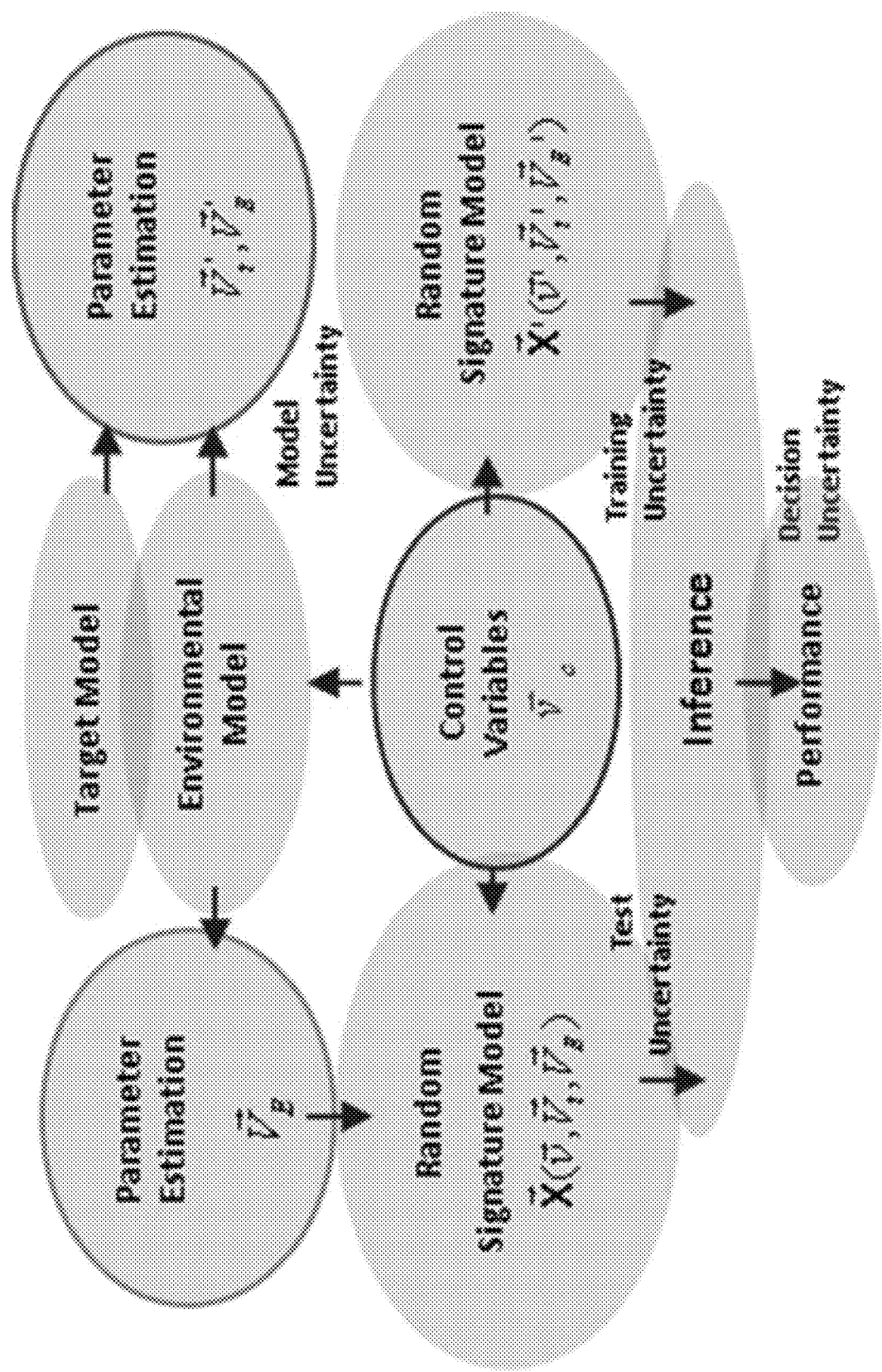
FIG. 6 is a flowchart illustrating a modeling and analysis approach to uncertainty propagation within the sensitivity analysis and modeling of an information sensing system.

Propagating Effects of Uncertainty: Uncertainty propagation is the study of how uncertainty in the output of a model (numerical or otherwise) can be allocated to different sources of uncertainty in the model inputs, which are used in Step 310 of FIG. 3A to model the effects of a variety of system uncertainty parameters on various components of the system and the system as a whole. FIG. 6 provides an illustration of a modeling and analysis approach to uncertainty propagation within the sensitivity analysis and modeling of an information sensing system. The careful definition of variables plays a central role in case-controlled studies of the effects of uncertainty on system performance. The vector $\vec{v}_c$ represents the control parameters of interest within computer-generated experiments. Continuing to use the HRR sensor system example, absent the uncertainties identified in Table 1, the effects of selected values for $\vec{v}_c$ on the deterministic mapping function $P_e^X(\vec{v}_c)$ in Eq. (11.a) are certain. Further experimentation involving the unknowable random environmental and position estimation effects in sensing are best studied statistically. Thus, the respective estimated random input parameters of $\vec{V}_E$ and $\vec{V}_t$ are introduced, resulting in the mapping to the random signature process $\vec{X}(\vec{v}_c, \vec{V}_E, \vec{V}_t)$. The sensing uncertainty is then subsequently propagated into the random feature process $\vec{Y}(\vec{v}_c, \vec{V}_E, \vec{V}_t)$ and ultimately to the decision process $Q(\vec{v}_c, \vec{V}_E, \vec{V}_t)$. For brevity, $\vec{Y}(\vec{v}_c, \vec{V}_E, \vec{V}_t)$ is written as $\vec{Y}$ and $Q(\vec{v}_c, \vec{V}_E, \vec{V}_t)$ is written as Q.

The distributions associated with the input parameters in $\vec{V}_E$ and $\vec{V}_t$ are estimated from experimental data. The estimated parameters become factors within a Monte Carlo simulation. The cumulative link information loss as quantified within Eq. (5) and approximated in Eqs. (9.a), (9.b), (9.c) then become random variables as shown:

$$IL_{\vec{X}} \approx H(H) - I(H; \vec{X}(\vec{v}_c, \vec{V}_E, \vec{V}_t)); \tag{18.a}$$

$$IL_{\vec{Y}} \approx H(H) - I(H; \vec{Y}(\vec{v}_c, \vec{V}_E, \vec{V}_t)); \tag{18.b}$$

$$IL_Q \approx H(H) - I(H; Q(\vec{v}_c, \vec{V}_E, \vec{V}_t)); \tag{18.c}$$

Similarly, the link information loss $IL_{SA}$, $IL_{FA}$, and $IL_{DA}$ in Eqs. (11.a), (11.b), and (11.c) also become random variables.

The unknowable characteristics of the observed signature process $\vec{X}$ are realized within the input variables to the modeled training process $\vec{X}'(\vec{v}_c', \vec{V}_E', \vec{V}_t')$. If it is assumed that $\vec{v}_c' \neq \vec{v}_c$, $\vec{V}_E' \neq \vec{V}_E$, $\vec{V}_t' \neq \vec{V}_t$, then the mapping to the non-optimal decision rule will be $d(\vec{v}_c', \vec{V}_E', \vec{V}_t')$, which will be written as d for brevity. The decision rule d is applied to $\vec{Y}(\vec{v}_c, \vec{V}_E, \vec{V}_t)$ generating $Q'(\vec{v}_c', \vec{V}_E', \vec{V}_t')$, written as Q', while the optimal decision rule $d_{opt}$ generates $Q(\vec{v}_c, \vec{V}_E, \vec{V}_t)$. Each realization of d and $d_{opt}$ resulting from each ensemble $\vec{X}'(\vec{v}_c', \vec{V}_E', \vec{V}_t')$ and $\vec{X}(\vec{v}_c, \vec{V}_E, \vec{V}_t)$, respectively, in the Monte Carlo simulation will result in the randomization of the imperfect training loss function in Eq. (19) and the randomization of the cumulative loss function in Eq. (20):

$$IL_{TA} \cong I(H;Q) - I(H;Q') \tag{19}$$

$$IL_{Q'} \approx H(H) - I(H;Q') \tag{20}$$

In Eq. (19), the special case of $\vec{V}_E' = \vec{V}_E$ and $\vec{V}_t' = \vec{V}_t$, the loss due to the optimal training of $d = d_{opt}$ yields $IL_{TA} = 0$ and $IL_{Q'} = IL_Q$. To narrow the focus of analysis, the training space $(\vec{v}_c', \vec{V}_E', \vec{V}_t')$ will be considered fixed and thus will become a component of the system control parameter $\vec{v}_c$. Therefore, d becomes fixed by design as d.

Independent Sources of Uncertainty Loss: Loss due to isolated sources of uncertainty within the channel can be computed to provide a means to characterize the relative impacts to information flow at various points in the channel. The various sources of sensing uncertainty induce information loss in the channel as characterized by the random link loss functions $IL_{SA}$, $IL_{FA}$, $IL_{DA}$, and $IL_{TA}$. The prior distributions on the random parameters within $\vec{V}_E$ and $\vec{V}_t$ are propagated to the respective loss functions using Monte Carlo simulation.

Definition 2: The expected value of the link information loss can be written as the expected values of the individual random loss components as in Eqs. (21.a)-(21.d):

$$\mu_{IL_{S_\Delta}} = E\{IL_{S\Delta}\} \quad (21.a)$$

$$\mu_{IL_{F_\Delta}} = E\{IL_{F\Delta}\} \quad (21.b)$$

$$\mu_{IL_{D_\Delta}} = E\{IL_{D\Delta}\} \quad (21.c)$$

$$\mu_{IL_{T_\Delta}} = E\{IL_{T\Delta}\} \quad (21.d)$$

The sensing uncertainty factors within $\vec{V}_E$ and $\vec{V}_t$ are assumed to be independent. Given that the total loss function $IL_{Total}$ can account for multiple independent sources of uncertainty within the parameter space of $(\vec{v}_c, \vec{V}_E, \vec{V}_t)$, the variance on $IL_{Total}$ is the sum of the individual variances within the components of $IL_{Total}$.

Corollary II: Assuming $n_e$ factors within $\vec{V}_E$ and $n_t$ factors within $\vec{V}_t$, the link loss variance can be decomposed as given in Eqs. (22.a)-(22.d):

$$\sigma^2_{IL_{S_\Delta}} = \sigma^2_{IL_{S_\Delta(V_{E1})}} + \ldots + \sigma^2_{IL_{S_\Delta(V_{n_e})}} + \sigma^2_{IL_{S_\Delta(V_{t1})}} + \ldots + \sigma^2_{IL_{S_\Delta(V_{n_t})}} \quad (22.a)$$

$$\sigma^2_{IL_{F_\Delta}} = \sigma^2_{IL_{F_\Delta(V_{E1})}} + \ldots + \sigma^2_{IL_{F_\Delta(V_{n_e})}} + \sigma^2_{IL_{F_\Delta(V_{t1})}} + \ldots + \sigma^2_{IL_{F_\Delta(V_{n_t})}} \quad (22.b)$$

$$\sigma^2_{IL_{D_\Delta}} = \sigma^2_{IL_{D_\Delta(V_{E1})}} + \ldots + \sigma^2_{IL_{D_\Delta(V_{n_e})}} + \sigma^2_{IL_{D_\Delta(V_{t1})}} + \ldots + \sigma^2_{IL_{D_\Delta(V_{n_t})}} \quad (22.c)$$

$$\sigma^2_{IL_{T_\Delta}} = \sigma^2_{IL_{T_\Delta(V_{E1})}} + \ldots + \sigma^2_{IL_{T_\Delta(V_{n_e})}} + \sigma^2_{IL_{T_\Delta(V_{t1})}} + \ldots + \sigma^2_{IL_{T_\Delta(V_{n_t})}} \quad (22.d)$$

Definition 3: The expected value of the cumulative link information loss can then be written as the expected values of the individual random cumulative loss components as in Eqs. (23.a)-(23.d), which may be used to obtain the cumulative component information loss as in Step 330 in FIG. 3A:

$$\mu_{IL_{\vec{X}}} = E\{IL_{\vec{X}}\} \quad (23.a)$$

$$\mu_{IL_{\vec{Y}}} = E\{IL_{\vec{Y}}\} \quad (23.b)$$

$$\mu_{IL_Q} = E\{IL_Q\} \quad (23.c)$$

$$\mu_{IL_{Q'}} = E\{IL_{Q'}\} \quad (23.d)$$

Corollary III: Assuming $n_e$ factors within $\vec{V}_E$ and $n_t$ factors within $\vec{V}_t$, the cumulative link loss variance can be decomposed as given in Eqs. (24.a)-(24.d):

$$\sigma^2_{IL_{\vec{X}}} = \sigma^2_{IL_{\vec{X}(V_{E1})}} + \ldots + \sigma^2_{IL_{\vec{X}(V_{n_e})}} + \sigma^2_{IL_{\vec{X}(V_{t1})}} + \ldots + \sigma^2_{IL_{\vec{X}(V_{n_t})}} \quad (24.a)$$

$$\sigma^2_{IL_{\vec{Y}_\Delta}} = \sigma^2_{IL_{\vec{Y}(V_{E1})}} + \ldots + \sigma^2_{IL_{\vec{Y}(V_{n_e})}} + \sigma^2_{IL_{\vec{Y}(V_{t1})}} + \ldots + \sigma^2_{IL_{\vec{Y}(V_{n_t})}} \quad (24.b)$$

$$\sigma^2_{IL_Q} = \sigma^2_{IL_{Q(V_{E1})}} + \ldots + \sigma^2_{IL_{Q(V_{n_e})}} + \sigma^2_{IL_{Q(V_{t1})}} + \ldots + \sigma^2_{IL_{Q(V_{n_t})}} \quad (24.c)$$

$$\sigma^2_{IL_{Q'}} = \sigma^2_{IL_{Q'(V_{E1})}} + \ldots + \sigma^2_{IL_{Q'(V_{n_e})}} + \sigma^2_{IL_{Q'(V_{t1})}} + \ldots + \sigma^2_{IL_{Q'(V_{n_t})}} \quad (24.d)$$

Propagating Link Loss to Link Performance: The variance and mean of the random cumulative loss components $IL_{\vec{X}}$, $IL_{\vec{Y}}$, $IL_Q$ and $IL_{Q'}$ are used directly to determine the variance on the performance at the random link performance components $P_e^{\vec{X}}$, $P_e^{\vec{Y}}$, $P_e^Q$, and $P_e^{Q'}$. The Maximum Likelihood Estimate (MLE) of $P_e$ is inferred at each realization of the sufficient statistical support about $(\vec{v}_c, \vec{V}_E, \vec{V}_t)$, providing the random mapping to performance $P_e$ at each link as in Step 335 in FIG. 3A.

Corollary IV: Given sufficient sampling of the space of $\vec{V}_E$ and $\vec{V}_t$ within the finite alphabet $|\chi|$ and $|Y|$, the environmental and position estimate uncertainty factors result in the respective random performance at $\vec{X}$ and $\vec{Y}$ given by functions $P_e^X(\vec{v}_c, \vec{V}_E, \vec{V}_t)$ and $P_e^Y(\vec{v}_c, \vec{V}_E, \vec{V}_t)$ as in Eqs. (25) and (26):

$$P_e^{\vec{X}} \equiv P_e^X(\vec{v}_c, \vec{V}_E, \vec{V}_t) \approx F(IL_{\vec{X}}) \quad (25)$$

$$P_e^{\vec{Y}} \equiv P_e^Y(\vec{v}_c, \vec{V}_E, \vec{V}_t) \approx F(IL_{\vec{Y}}) \quad (26)$$

If the conditions of Corollary IV hold and perfect training conditions are assumed where $\vec{v}_c' = \vec{v}_c$, $\vec{V}_E' = \vec{V}_E$, $\vec{V}_t' = \vec{V}_t$, then the mapping to the decision rule $d_{opt}$ will be optimal.

Corollary V: The output of the discrete random variable Q (from the finite alphabet $|Q|$) is driven by the inferred decision out of the application of each realization of $\vec{Y}$ to $d_{opt}$. The random performance function $P_e^Q(\vec{v}_c, \vec{V}_E, \vec{V}_t)$ can be expressed as random realization of the information loss in the channel, $IL_Q$ in Eq. (18.c). Using the approximation form of Eq. (13) (assume $I(Q;V) \approx 0$), the random performance function $P_e^Q$ is given by Eq. (27).

$$P_e^Q \equiv P_e^Q(\vec{v}_c, \vec{V}_E, \vec{V}_t) \approx F\{IL_Q\} \quad (27)$$

The approximation in Eq. (27) can be replaced by an equality using the full representation in Eq. (4):

$$P_e^Q = F\{IL_Q + I(Q;V)\} \quad (28)$$

In Eqs. (27) and (28), the relaxation of the constraint $\vec{V}_E' = \vec{V}_E$ and $\vec{V}_t' = \vec{V}_t$ expands the study of the effects of uncertainty to the loss due to the non-optimal training of d.

Corollary VI: The output of the discrete random variable Q' (from the finite alphabet) is driven by the inferred decision out of the application of each realization of $\vec{Y}$ to d. The random performance function $P_e^{Q'}(\vec{v}_c, \vec{V}_E, \vec{V}_t)$ can be expressed as random realization of the information loss in the channel, $H(H)-I(H;Q')$. Fixing the suboptimal decision rule $d(\vec{v}_c' = \beta_c, \vec{V}_E' = \beta_E, \vec{V}_t' = \beta_t)$ and using the approximation form of Eq. (4) (assume $I(Q;V') \approx 0$), the random performance function $P_e^{Q'}$ is given by Eq. (29):

$$P_e^{Q'} \equiv P_e^{Q'}(\vec{v}_c, \vec{V}_E, \vec{V}_t) \approx F\{IL_{Q'}\} = F\{H(H)-I(H;Q')\} \quad (29)$$

The approximation in Eq. (29) is replaced by an equality using the full representation in Eq. (4):

$$P_e^{Q'} \equiv P_e^{Q'}(\vec{v}_c, \vec{V}_E, \vec{V}_t) = F\{H(H)-I(H;Q')+I(Q';V)\} \quad (30)$$

Definition 4: The expected link performance under control parameters $\vec{v}_c$ and in the presence of sensing uncertainty $(\vec{V}_E, \vec{V}_t)$ is defined as the expectation of the random link performance components $P_e^{\vec{X}}$, $P_e^{\vec{Y}}$, $P_e^Q$, and $P_e^{Q'}$.

$$\mu_{P_{e_{\vec{X}}}} = E\{P_e^{\vec{X}}\} \quad (31.a)$$

$$\mu_{P_{e_{\vec{Y}}}} = E\{P_e^{\vec{Y}}\} \quad (31.b)$$

-continued $$\mu_{P_{e_Q}} = E\{P_e^Q\} \tag{31.c}$$

$$\mu_{P_{e_{Q'}}} = E\{P_e^{Q'}\} \tag{31.d}$$

Given a sufficient number of Monte Carlo samples over the random parameters in $\vec{V}_E$ and $\vec{V}_t$, the standard deviation of the random link component performance function is used as a measure of reliability. Reliability is interpreted as 95% confidence that any estimate would fall within the bounds of one standard deviation.

Definition 5: Reliability in predicted link performance is defined as the standard deviation ($\sigma_{P_e\vec{x}}$, $\sigma_{P_e\vec{y}}$, $\sigma_{P_eQ}$, and $\sigma_{P_eQ'}$) of the respective random cumulative link performance associated with $P_e^{\vec{x}}$, $P_e^{\vec{y}}$, $P_e^Q$, and $P_e^{Q'}$. The variability in link performance is defined as the square of the reliability; $\sigma_{P_e\vec{x}}^2$, $\sigma_{P_e\vec{y}}^2$, $\sigma_{P_eQ}^2$, and $\sigma_{P_eQ'}^2$.

Uncertainty in Performance: The independent sources of uncertainty contributing to $\sigma_{IL\vec{x}}^2$ in Eq. (24.a) are individually functionally mapped to the variance on the random performance function $P_e^{\vec{x}}$ to determine the respective effects on the reliability of the predicted link performance estimate as in Step 340 in FIG. 3A. The uncertainty is passing through the transcendental relationship between $IL_{\vec{x}}$ and $P_e^{\vec{x}}$. The nature of the nonlinear relationship makes it difficult to commute the independent loss variance sources analytically. It is important to relate the independent sources of uncertainty underlying $$\sigma_{IL_{\vec{x}}}^2$$

to the corresponding set of variances that combine to equal the variance on $P_e^{\vec{x}}$.

It is possible to approximate the inverse entropy function (F) by a linear relationship about the mean of $IL_{\vec{x}}$: $F(IL_{\vec{x}}) = a + b \cdot (IL_{\vec{x}})$. The mean and variance of the approximation are then $$E[F(IL_{\vec{x}})] = a + b(\mu_{IL_{\vec{x}}}) \text{ and } \text{Var}[F(IL_{\vec{x}})] = b^2 \cdot (\sigma_{IL_{\vec{x}}}^2).$$

Using established approximation techniques, the first order Taylor expansion of F around the mean $\mu_{IL_{\vec{x}}}$ of $IL_{\vec{x}}$ is equal to:

$$F(IL_{\vec{x}}) \approx F(\mu_{IL_{\vec{x}}}) + F'(\mu_{IL_{\vec{x}}}) \cdot (IL_{\vec{x}} - \mu_{IL_{\vec{x}}}) \tag{32}$$

Using the Taylor Series expansion in Eq. (32), the approximation for $E[F(IL_{\vec{x}})]$ and $\text{Var}[F(IL_{\vec{x}})]$ are:

$$E[F(IL_{\vec{x}})] = E[P_e^{\vec{x}}] \approx F(\mu_{IL_{\vec{x}}}) = H^{-1}(\mu_{IL_{\vec{x}}}) \tag{33}$$

$$\text{Var}[F(IL_{\vec{x}})] = \sigma_{P_e^{\vec{x}}}^2 \approx \{F'(\mu_{IL_{\vec{x}}})\}^2 \cdot (\sigma_{IL_{\vec{x}}}^2) \tag{34}$$

and $F'(\mu_{IL_{\vec{x}}})$ can be shown to equal:

$$F'(\mu_{IL_{\vec{x}}}) = \log\left[\frac{1}{\left[\frac{H^{-1}(\mu_{IL_{\vec{x}}})}{1 - H^{-1}(\mu_{IL_{\vec{x}}})}\right]}\right]$$

Assuming $n_e$ factors within $\vec{V}_E$ and $n_t$ factors within $\vec{V}_t$, the cumulative link loss variance components given in Eq. (24.a) are applied to Eq. (34):

$$\sigma_{P_e^{\vec{x}}}^2 \approx \tag{35}$$

$$\{F'(\mu_{IL_{\vec{x}}})\}^2 \cdot \{\sigma_{IL\vec{x}(V_{E1})}^2 + \ldots \sigma_{IL\vec{x}(V_{n_e})}^2 + \sigma_{IL\vec{x}(V_{t1})}^2 + \ldots \sigma_{IL\vec{x}(V_{n_t})}^2\}$$

The variance on the performance estimate $P_e^{\vec{x}}$ is then decomposed into the individual sources of sensing uncertainty being propagated through the decision space at $\vec{X}$.

$$\sigma_{P_e^{\vec{x}}}^2 \approx \sigma_{P_{e_E}^{\vec{x}}}^2 + \ldots \sigma_{P_{e_{n_e}}^{\vec{x}}}^2 + \sigma_{P_{e_t}^{\vec{x}}}^2 + \ldots \sigma_{P_{e_{n_t}}^{\vec{x}}}^2 \tag{36}$$

Similar methods are applied to the independent contributions to the sensing uncertainty of $\vec{V}_E$ and $\vec{V}_t$ comprising the variances $$\sigma_{IL_{\vec{Y}_\Delta}}^2,$$

$\sigma_{IL_Q}^2$, and $\sigma_{IL_{Q'}}^2$, at $\vec{Y}$, Q, and Q' respectively.

Figure 7:
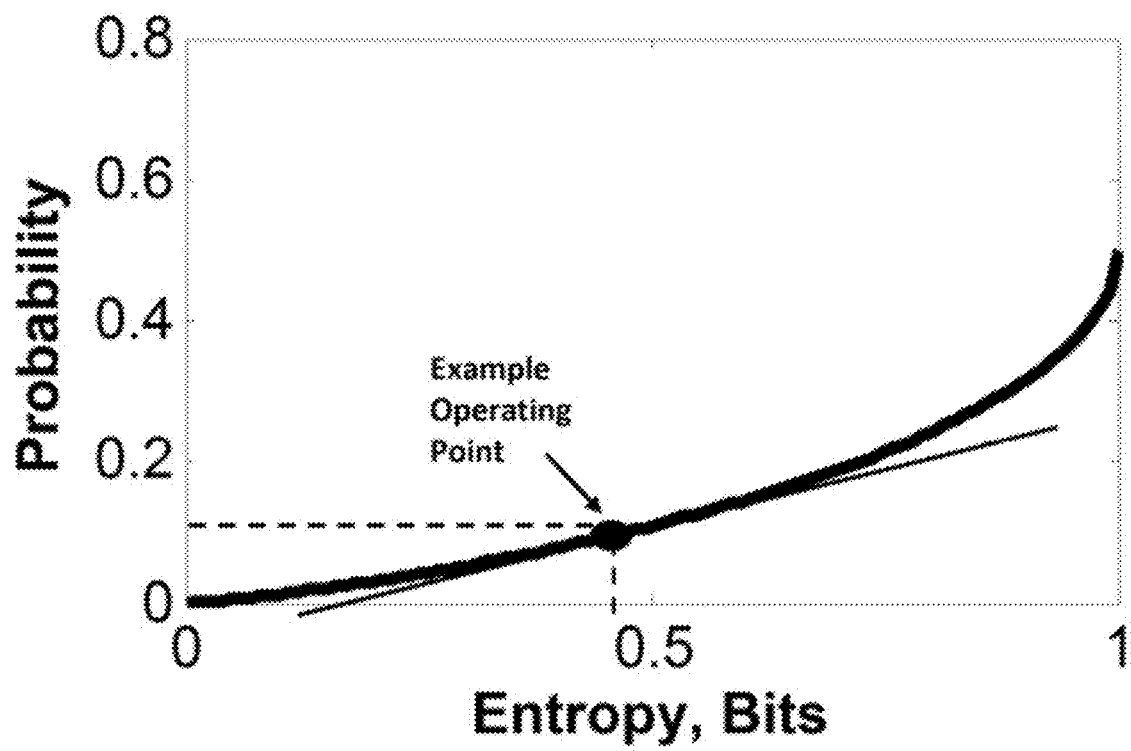
FIG. 7 is a plot illustrating the inverse entropy function.
Figure 8:
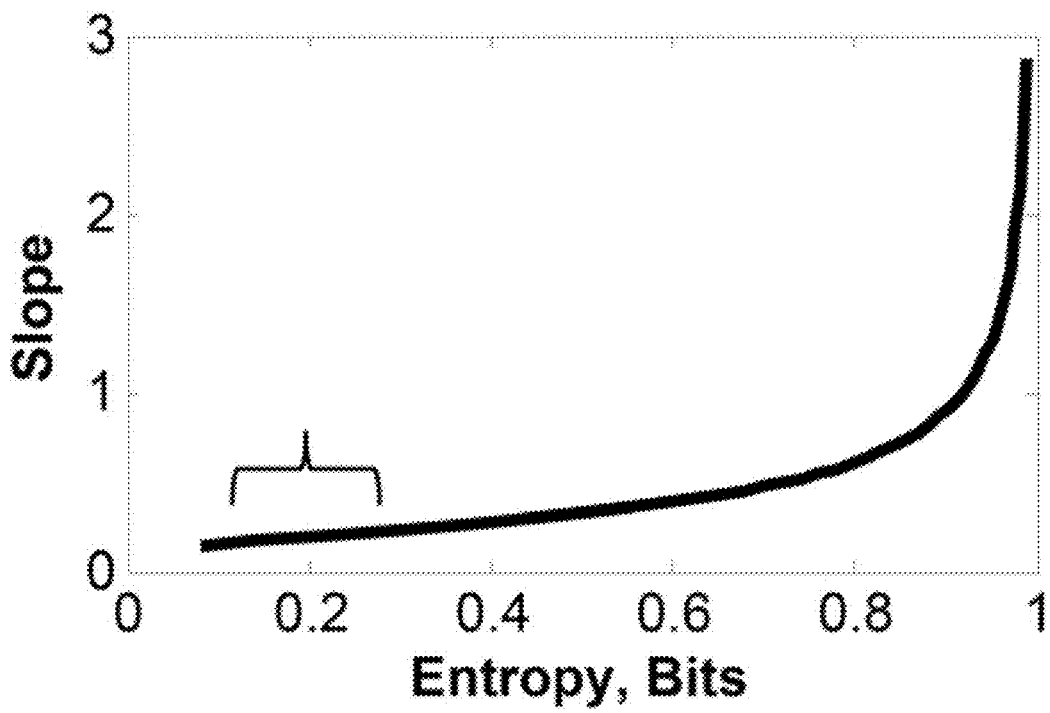
FIG. 8 is a plot of the slope at an example operating point identified in FIG. 7.

Stability of the Linear Approximation: The validity of the linear approximation in Eq. (34) requires $\sigma_{IL_{\vec{x}}}^2$ be small. Thus, the contributing sources of sensing uncertainty within $\sigma_{IL_{\vec{x}}}^2$ must be individually small. Given that the regime of interest is one where $\mu_{IL_{\vec{x}}}$ and thus $E[P_e^{\vec{x}}]$ are small, the derivative (slope) evaluated at $\mu_{IL_{\vec{x}}}$ is relatively small. The slope within this regime is illustrated in FIG. 7 for an arbitrary operating point (the inverse Entropy Function; $f(z) = H^{-1}(w)$). The slope $$\frac{dH^{-1}(w)}{dw}$$

is plotted in FIG. 8 for $w \in [0, 1]$.

Dimensionality and Computing: The computation of the entropy of $\vec{X}$ involves the joint probability mass function (PMF) of the random multivariate $\vec{X}$ and is complicated by the large dimensional nature of the observation mapping $H \rightarrow \vec{X}$. It is desired to compute the discrete entropy for $\vec{X}$ absent any assumption regarding dependence between the respective dimensions of $\vec{X}$. If the $\vec{X}$ space consists of K random variables (dependent or independent) and the random variable $X_k$; $k \in \{1, K\}$ has $n_b$ distinct bins (statistical divisions), then the size of the alphabet of $\vec{X}$, $|\vec{\chi}|$, is given in Eq. (37):

$$|\vec{\chi}| = \prod_{k=1}^{k=K} n_k \qquad (37)$$

For example, if $K=3$ and $n_k=2=n_b$ for all k, $|\vec{\chi}|=2\cdot 2\cdot 2=8$.

The joint PMF of $\vec{X}$, $p(x_{k_N}^{\ j})$; $k\in\{1,K\}$, $j\in\{1,n_b\}$ is generated from a finite N sample ensemble and discretely binned with $n_b$ statistical divisions within each of the K elements of $\vec{X}$. Stable entropic estimates require the statistics of the multivariate PMF be sampled sufficiently. A reasonable example in the context of the HRR example with $K=10$ and $n_b=5$ for all k would present a theoretical typical set of $5^{10}=9,765,625$. The typical set represents the set of most probable events and contains almost all of the probability as the number of samples increases. In the case of the radar example developed here, this would be the set of most probable signature amplitude combinations for all K dimensions of $\vec{X}$. To generate a meaningful sample size for a PMF of this size, at least 10 times the typical set would need to be produced, which equals approximately 100 million samples. Thus K and $n_b$ drive the dimensionality of $\vec{X}$ and subsequently the sampling requirements for each ensemble within the Monte Carlo simulation.

A high dimensional problem is one where the alphabet of $\vec{X}$, $|\vec{\chi}|$, underlying the random process far exceeds the number of samples observed (N), i.e.; $|\vec{\chi}|>>N$. Sensing systems typically operate within this high dimensional signature data space of $|\vec{\chi}|$. The high dimension arises due to factors within the space $\vec{X}(\vec{v}_c, \vec{V}_E, \vec{V}_t)$. Hypothesis testing and inference within the high dimensional space of $\vec{X}$ in turn leads to large sampling requirements to adequately determine the underlying statistical nature of the phenomenon under study. Without accurate determination of the underlying system statistics, poorly performing hypothesis tests and/or parameter estimation occur (Bias/Variance tradeoff).

The number of statistical bins, $n_b$, within the discrete sampling of the K element joint PMF of $\vec{X}$ also has a significant effect on $|\vec{\chi}|$ as well as the entropy computation of $\vec{X}$. An increase in size of $n_b$ in $\vec{X}$ will result in an increase in the entropy of $\vec{X}$. However, in the limit, the value for $I(H; \vec{X})$ as a function of $n_b$ asymptotes to a constant value after one reaches the full intrinsic dimensionality of the subspace of $I(H; \vec{X})$. This will be true for $I(H; \vec{Y})$, $I(H;Q)$, and $I(H;Q')$ as well. A method for determining the intrinsic dimensionality of $\vec{X}$ is then needed to guide the selection of N.

Sample Size and Minimum Sampling Requirements: The methods used to determine the minimum sampling requirements for entropy estimation and the variance parameters of these entropy estimations (Step 315 in FIG. 3A) are now described. In one embodiment, a method for determining component level ensemble sampling requirements $N_M$ begins with determining a set of test criteria for maximum sampling uncertainty of the component-level information loss relative to the component-level probability of error statistical distributions, followed by determining a sample ensemble size $N_M$ for the component-level information loss using a phase transition method and computing the component-level performance reliability using a numerical simulation method such as Monte Carlo modeling on an ensemble size $N_M$.

The link performance variability estimate at each of the respective links, $$\sigma^2_{P_e^{\vec{X}}}, \sigma^2_{P_e^{\vec{Y}}},$$

$\sigma_{P_eQ}^2$, and $\sigma_{P_eQ'}^2$ are generated though a sufficient number of draws from the respective random link performance functions $P_e^{\vec{X}}$, $P_e^{\vec{Y}}$, $P_e^Q$, and $P_e^{Q'}$. Each draw involves the estimation of an entropic quantity computed from PMF $p(x_{k_N}^{\ j})$ based on the N sample ensemble taken from $\vec{X}$. The estimate of the link performance variability at $\vec{X}$, $$\hat{\sigma}^2_{P_e^{\vec{X}}},$$

is written more precisely as in Eq. (38):

$$\hat{\sigma}^2_{P_e^{\vec{X}}} = \sigma^2_{P_e^{\vec{X}}} + \sigma^2_{\hat{P}_{e_N}^{\vec{X}}} \qquad (38)$$

$$\sigma^2_{\hat{P}_{e_N}^{\vec{X}}}$$

is defined as the N sample estimation variance or "sampling uncertainty" associated with the true variability $$\sigma^2_{P_e^{\vec{X}}}.$$

Eq. (38) can be written as $$\hat{\sigma}^2_{P_e^{\vec{X}}} = \sigma^2_{P_e^{\vec{X}}}\left(1 + \frac{\sigma^2_{\hat{P}_{e_N}^{\vec{X}}}}{\sigma^2_{P_e^{\vec{X}}}}\right).$$

For the high dimensional problem, N must be large enough for:

$$\frac{\sigma^2_{\hat{P}_{e_N}^{\vec{X}}}}{\sigma^2_{P_e^{\vec{X}}}} << 1 \qquad (39)$$

The objective then is to produce link reliability estimates that are within this regime. The choice of N must be selected to ensure the uncertainty of the entropic estimate is much less than the reliability limits realized due to various factors within ($\vec{v}_c$, $\vec{V}_E$, $\vec{V}_t$) under study. That is, the ensemble size N of $\vec{X}$, $\vec{Y}$, Q, and Q' should be sufficiently large to ensure that the variance of the estimate falls within three significant digits of the variability levels $$\left(\sigma^2_{IL_{\vec{\gamma}_\Delta}},\right.$$

$\sigma_{IL_Q}^2$, and $\sigma_{IL_{Q'}}^2$). Thus for the case of variability at $\vec{X}$, it is desired that $$\frac{\sigma^2_{\hat{P}^{\vec{X}}_{e_N}}}{\sigma^2_{\hat{P}^{\vec{X}}_{e}}} < .001.$$

As stated above, $|\vec{\chi}|$ in particular, can grow to large levels and as such the number of samples required will grow as well. Given that the sampling ensemble size N of $\vec{X}$ is likewise imposed on $\vec{Y}$ and Q, the following analysis is focused on the process at $\vec{X}$.

From FIG. 8, it is evident that the slope at an operating point within this regime will be on the order of 0.25, affording reduced sensitivity to effects of the size of $$\sigma^2_{IL_{\vec{X}}}.$$

Phase Transitions and the Typical Set: The entropy computation requires the development of the joint mass function associated with the multi-variate $\vec{X}$, $p(x_k^j)$; $j \in \{1:n_b\}$, $k \in \{1:K\}$. The development of this mass function assumes no independence between the K indices of $\vec{X}$ and is performed using a "linked list" approach to limit the memory requirements during computation. A doubly linked list implementation with a hash table search approach yields a computational complexity of $O(N)$. The Miller-Madow estimate provides a faster convergence over the MLE method for finite sample estimates.

Maximum Likelihood Estimate of $H(\vec{X}_k)$:

$$\hat{H}_{MLE_N}(X_k) = \sum_{j=1}^{n_b} -p(x_{k_N}^j) \log_2\{p(x_{k_N}^j)\} \qquad (40)$$

Miller-Madow Estimate of $H(\vec{X}_k)$ (note: $M_+$=number of statistical bins for which $p(x_{k_N}^j) \neq 0$):

$$\hat{H}_{MM_N}(X_k) = \hat{H}_{MLE_N}(X_k) + \{1/(2N)\}\{M_+ - 1\} \qquad (41)$$

The N sample estimates for $\hat{H}_{MLE_N}(X_k)$ and $\hat{H}_{MM_N}(X_k)$ are generated from the joint mass function, $p(x_k^j)$; $j \in \{1:n_b\}$, $k \in \{1:K\}$.

Figure 9:
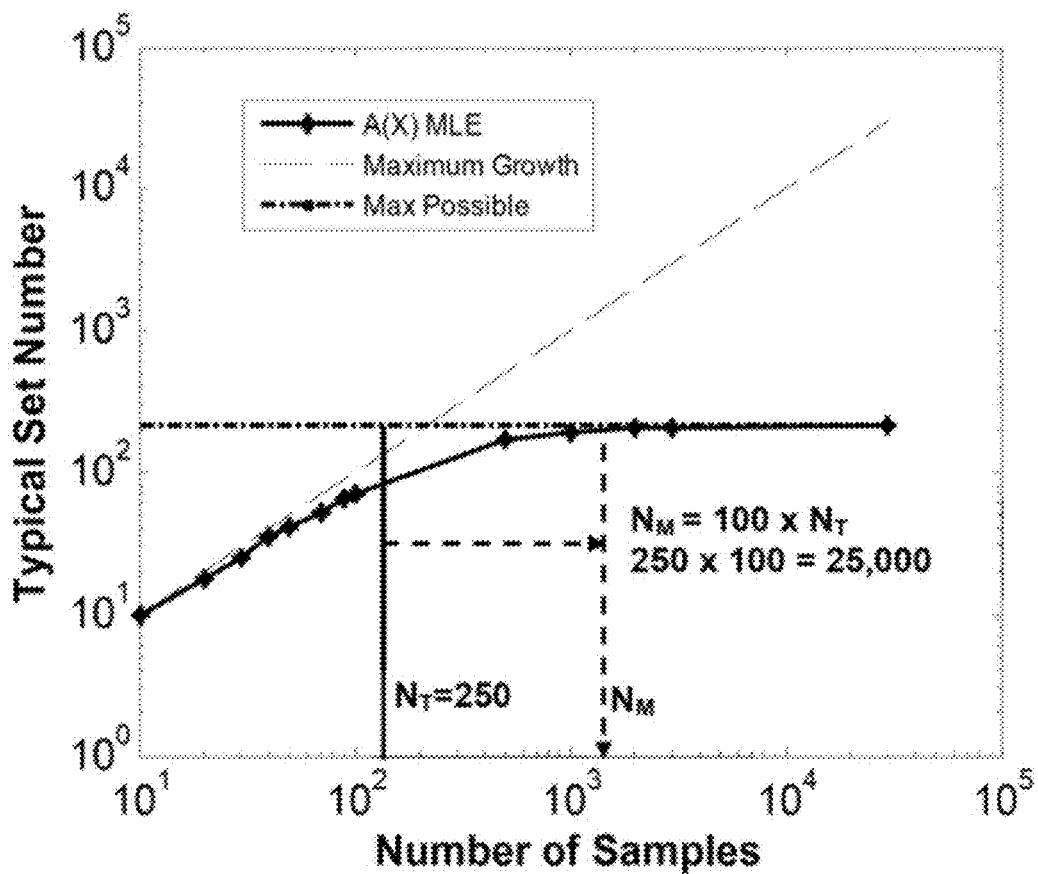
FIG. 9 is a plot illustrating the phase transitions in $\vec{X}$ and computing the minimum sampling $N_M$ using the Maximum Likelihood Estimate (MLE) method.

Phase transitions within the growth trajectory of the estimated entropy with increasing N are useful in defining the alphabet size $|\vec{\chi}|$. The following illustration demonstrates the usefulness of this approach. The signature process under evaluation will be constructed by design such that the actual entropy value is known. The multivariate random signature vector $\vec{X}$ is modeled to be uniformly distributed (standard uniform $\{0,1\}$) with $n_b=6$ (all indices of $\vec{X}$) and K=3. The theoretical maximum value of the entropy of $\vec{X}$ is then $\log_2(n_b^K)$ or $\log_2(6^3)=7.7549$ Bits. In FIG. 9, the estimate of the discrete entropy of $\vec{X}$ is incrementally generated for an increasing number of samples. The typical set of $\vec{X}$ is plotted for each increment. The typical set $A_\varepsilon = 2^{H(\vec{X})}$ is computed from the discrete entropy $H(\vec{X})$. Each of the estimated values for the typical set of $\vec{X}$ asymptote at the maximum dimensionality of $\vec{X}$ where the theoretical values of $H(\vec{X})=7.7549$ Bits and $A_\varepsilon=216$.

Initially, the samples are filling the open high dimensional space of $\vec{X}$ in a uniform fashion. The linear dashed line represents the $\log_2(N)$ growth of the entropy associated with this uniform distribution. Note that the actual achieved entropy computation begins to diverge from a uniform distribution. Only after the samples of $\vec{X}$ begin to accumulate in the bin space of the joint mass function of $\vec{X}$ does this transition occur. This phase transition point represents the point at which the fundamental statistics of $\vec{X}$ change.

The phase transition point is determined from the intersection of the line tangent to the linear portion of the typical set profile and the line tangent to the asymptotic portion of the profile. The number of samples coinciding with this phase transition point is $N_T$. For the example here, $N_T$ is found to be approximately 250 as illustrated in FIG. 9, which illustrates the phase transitions in $\vec{X}$ and computing the minimum sampling $N_M$ using the MLE method. The minimum number of samples, $N_M$, is taken to be 100 times the value of $N_T$. In this example, $N_M$ is found to be 25,000. The Miller-Madow estimate for entropy $\hat{H}_{MM_N}(X_k)$ is used for all entropic computation within the remaining body of this analysis.

Sampling Uncertainty for Probability of Error Estimate: Since the random estimation error variable is essentially the sum of many independently distributed random variables, the estimation error is Gaussian. The standard deviation of the Gaussian distribution of $\hat{I}(H; \vec{X})$, will then scale as a function of 1/N. Thus the variance on the estimate $$\sigma^2_{\hat{I}(H;x)_{2N_T}},$$

can be scaled to a large sample size ($\sigma_{\hat{I}(H;x)_N}^2$). The standard deviation of the estimate $\hat{P}_e^X$ can be determined from the independent contributions of $H(H)$ and $\vec{I}(H; \vec{X})$ shown in Eq. (42).

$$\hat{P}_e^X \approx H^{-1}(H(H) - \hat{I}(H; \vec{X})) \qquad (42)$$

For the equal probable binary hypothesis case, $H(H)$ is equal to 1 Bit. Therefore the sampling uncertainty $$\sigma^2_{\hat{P}^{\vec{X}}_{e_N}}$$

is a function only of $\sigma_{\hat{I}(H;x)_N}^2$.

As previously noted, the inverse entropy function in Eq. (42) is a transcendental function and as such the variance on the estimate $\hat{P}_e^X$, $$\sigma^2_{\hat{P}^{\vec{X}}_{e_N}},$$

can be very difficult to determine analytically. Following a similar line of analysis found in Eqs. (33) and (34), the mean and variance of $\hat{P}_e^X$ can be calculated as:

$$E[\hat{P}_e^X] \approx H^{-1}\left(1 - \mu_{\hat{I}(H;x)_{2N_T}}\right) \quad (43)$$

$$\sigma^2_{\hat{P}_{e_N}^X} \approx \left\{f'(\mu_{\hat{I}(H;x)_{2N_T}})\right\}^2 \cdot \sigma^2_{\hat{I}(H;x)_N} \quad (44)$$

The use of Eq. (44) requires an estimate of the mean of $\hat{I}(H; \vec{X})$, which is taken to be the sample mean $\mu_{\hat{I}(H;x)_N}$. The ultimate goal is to learn the sampling uncertainty for $\hat{P}_e^X$, $$\sigma_{\hat{P}_{e_N}^{\vec{X}}},$$

from a low sample estimate of the mean of $\hat{I}(H; \vec{X})$, $$\mu_{\hat{I}(H;x)_{2N_T}}.$$

Manipulating Eq. (44) above, $\sigma^2_{\hat{I}(H;x)_N}$ can be written in terms of the required variance on the estimate of error, $$\sigma^2_{\hat{P}_{e_{Req}}^X}:$$

$$\sigma^2_{\hat{I}(H;x)_N} \leq \sigma^2_{\hat{P}_{e_{Req}}^X} \cdot \log\left(\frac{H^{-1}\left(1 - \mu_{\hat{I}(H;x)_{2N_T}}\right)}{1 - H^{-1}\left(1 - \mu_{\hat{I}(H;x)_{2N_T}}\right)}\right)^2 \quad (45)$$

To ensure $$\sigma_{\hat{P}_{e_N}} \leq \sigma_{\hat{P}_{e_{Req}}},$$

the relationship in Eq. (45) is essential.

The regime of interest is where $\hat{I}(H; \vec{X})$ is close to 1 and $$H^{-1}\left(1 - \mu_{\hat{I}(H;x)_{2N_T}}\right)$$

and thus $\hat{P}_e^X$ is small. The derivative of the estimate in this regime is on the order of 0.25 as illustrated in FIG. 8. A slope of 0.25 is small relative to the range of values given in FIG. 8, yet large with respect to $$\mu_{\hat{I}(H;x)_{2N_T}}.$$

Therefore, errors in the estimate of $\mu_{\hat{I}(H;x)}$ can have a significant impact on the estimate of the number of samples required to reach a target sampling uncertainty of $$\sigma^2_{\hat{P}_{e_{Req}}^X}.$$

This means that a conservative approach is needed to estimate $E[\hat{I}(H; \vec{X})]$ based on a small number of samples. Instead of using the sample mean $$\mu_{\hat{I}(H;x)_{2N_T}}$$

as an estimate of the expectation $E\{\hat{I}(H; \vec{X})\}$, a value somewhat less than the sample mean should be chosen. Depending on the level of confidence required in the estimate of the number of samples N, a higher confidence estimate can be achieved by replacing $$\mu_{\hat{I}(H;x)_{2N_T}}$$

with $$\mu_{\hat{I}(H;x)_{2N_T}} - \sigma_{\hat{I}(H;x)_{2N_T}}$$

in Eq. (45).

As discussed above, the variance on the estimate $\hat{I}(H; \vec{X})$, $$\sigma^2_{\hat{I}(H;x)_{2N_T}},$$

can be scaled to large sample size ($\sigma_{\hat{I}(H;x)_N}^2$). The mean of the estimate of $\hat{I}(H; \vec{X})$, $$\mu_{\hat{I}(H;x)_{2N_T}},$$

and the standard deviation, $$\sigma_{\hat{I}(H;x)_{2N_T}},$$

can be estimated using the low number of samples ($N=2N_T$).

Sampling Uncertainty versus Variability in Performance: The expression in Eq. (45) provides guidance on the level of sampling uncertainty associated with $\hat{I}(H; \vec{X})$ that is required to achieve the corresponding sampling uncertainty in $\hat{P}_e^X$. A more important question relevant to the study of uncertainty and performance estimation is the relationship introduced in Eq. (44) and written in general form:

$$\frac{\sigma^2_{\hat{P}_{e_N}^{\vec{X}}}}{\sigma^2_{P_e^{\vec{X}}}} < \alpha \quad (46)$$

The variable α may be set to limit the degree of sampling uncertainty to be realized in the performance confidence analysis. Using Eq. (44), Eq. 34 and the fact that $\sigma_{IL\vec{X}}^2 = \sigma_{\hat{I}(H;\vec{X})}^2$, Eq. (46) may be written as in Eq. (47):

$$\frac{\sigma_{\hat{p}_{e_N}^{\vec{X}}}^2}{\sigma_{p_e^{\vec{X}}}^2} \approx \left[\frac{\sigma_{I(H;X)_{2 \cdot N_T}}^2}{\sigma_{I(H;\vec{X})}^2}\right] \cdot \beta(N, N_T) \quad (47)$$

The factor $\beta(N,N_T)$ in Eq. (47) is given as:

$$\beta(N, N_T) = \left[\frac{4 \cdot N_T^2}{N^2}\right] \cdot \left[\frac{\log\left[\frac{H^{-1}(1-\mu_{I(H;\vec{X})})}{1-H^{-1}(1-\mu_{I(H;\vec{X})})}\right]}{\log\left[\frac{H^{-1}(1-\mu_{I(H;X)_{2 \cdot N_T}})}{1-H^{-1}(1-\mu_{I(H;X)_{2 \cdot N_T}})}\right]}\right].$$

Thus, the expression in Eq. (48) may be used to test for conditions specified in Eq. (46):

$$\left[\frac{\sigma_{I(H;X)_{2 \cdot N_T}}^2}{\sigma_{I(H;\vec{X})}^2}\right] \cdot \beta(N, N_T) < \alpha \quad (48)$$

The FBIT model provides a platform for the study and analysis of the relationship of the level of sampling uncertainty to the level of performance uncertainty. Incremental values for the ratio on the left side of Eq. (48) can be computed for increasing N. The point at which the inequality is obeyed is related to the phase transition minimum sample methods previously generated.

The following examples and methods are presented as illustrative of the present disclosure or methods of carrying out the invention, and are not restrictive or limiting of the scope of the invention in any manner.

An Information Flow Numerical Example: The application of the FBIT method to the study of uncertainty propagation is now illustrated within a simple radar sensor example. An information loss budget is constructed for a baseline design. Selected forms of uncertainty in Table 1 are introduced into the system to demonstrate the analysis of the effects of propagating uncertainty through the information sensing channel.

Observed Target Scattering Model: In the high frequency regime used to obtain HRR signatures, the target may be approximated as a collection of scattering centers valid over a limited aspect window and frequency band. These scattering centers may be considered to be localized to a point and may represent a variety of scattering phenomena ranging from specular reflection to diffraction phenomena such as edge and tip diffraction. The fields radiated by these point scatterers depend upon both temporal and spatial frequencies (angular dependence). Because the radar illuminating the target has finite bandwidth and is a one dimensional imaging system, the target is seen as a collection of contiguous swaths of range, with each range swath corresponding to a particular range. The extent of each range swath, range resolution, depends upon the signal bandwidth. For a typical extended target of interest, each range swath contains a number of scattering centers which can be widely spaced in cross-range.

The electromagnetic field obtained as a result of the interference of the scattered fields from the scattering centers appears as the signal corresponding to a particular range bin of the target signature. The target signature may be considered to be a one dimensional image of the reflectivity (or scattering) profile of the target for a given azimuth/elevation aspect angle (θ, φ) and bandwidth. The mathematical definition of the radar signature is developed from the normalized scattered field in Eq. (49), where $\vec{E}^s$ and $\vec{E}^i$ are the scattered field and the incident field, respectively:

$$S(\theta, \phi) = \lim_{R \to \infty} 4\pi R^2 \frac{\vec{E}^s}{|\vec{E}^i|} \quad (49)$$

Using scattering center modeling and the far field approximation, Eq. (49) can be written in terms of the target aspect angle and the transmitted wavelength as shown in Eq. (50):

$$S_E(\theta, \phi, \lambda) = \sum_{m=1}^{M} \sqrt{\sigma_m} \, e^{j\frac{4\pi}{\lambda} R_m(\theta,\phi)} \quad (50)$$

Figure 10:
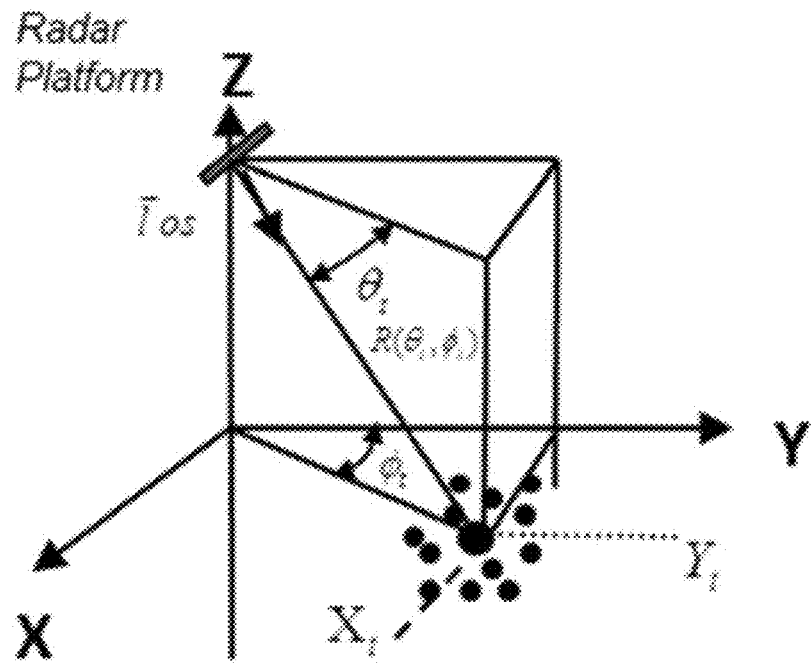
FIG. 10 is an isometric view of a three-dimensional depiction of a target cluster in a radar sensor coordinate system.

In Eq. (50), $S_E$ is the band-limited frequency response of the target comprised of M scattering centers at the respective range $R_m$. Conditioned on the target hypothesis H at a fixed aspect angle $(\theta_i, \phi_i)$, $\vec{S}_E(\theta_i, \phi_i) = S_E(\theta_i, \phi_i, \lambda)$, $\lambda \in \{\lambda_l, \lambda_{l+1}, \ldots \lambda_f\}$ defines the band-limited frequency response of the normalized scattered field measurements given in Eq. (50). Clusters of simple scattering centers are chosen for targets of interest at X-band frequencies (8-12 GHz) in the following development. The targets are electrically large with dimensions in range and cross-range of many wavelengths. The target cluster of M isotropic scatters occupies the target volume within the radar sensor coordinate system illustrated in FIG. 10.

The three-dimensional target scattering center configuration for the two targets examined in the following example occupy an approximate cubic volume of {x=2, y=3, z=2.5} meters and are positioned at a line-of-site, $\vec{T}_{OS}$, of for $(\theta_t, \phi_t)=10°$, $7.5°$. Both targets are comprised of 100 scattering centers of unity amplitude and three strong localized scattering clusters of amplitude 5. Target 1 differs from target 2 in that the length of the target 1 is shorter than target 2 in the Y dimension by 0.5 meters. One of the localized scattering clusters is also displaced by (0.2, 0.2, 0) meters.

Radar Sensor Model: Applying matched filter processing and the discrete Fourier transform to the observed signature $\vec{S}_E(\theta_i, \phi_i)$, in additive noise, the measured HRR signature can be modeled for a range of frequencies present in the transmitted waveform. The multidimensional encoded source $\vec{X}_E^i$ is defined here as the vector form of the time delay transformation of the band-limited frequency response $\vec{S}_E(\theta_i, \phi_i)$. The measured random signature process $\vec{X}_n^i$ is then defined as in equation Eq. (51) were $\vec{n}$ is additive white noise:

$$\vec{X}_n^i = \vec{X}_E^i + \vec{n} \quad (51)$$

The process $\vec{X}_n^i$ is modeled at the output of a radar step frequency measurement sensor system for the specified target aspect angle ($\theta_t$, $\phi_t$). The additive noise process $\vec{n}$ is modeled as the sum of thermal white noise and quantization noise components. The quantization error component is thought of as a random process uncorrelated with both the signal and the thermal noise. The complete radar step frequency measurement model system parameters are summarized in Table 3.

The sensing of $\vec{X}_n^i$ in a dynamic, real world environment is subject to the uncertainties listed in area 1 of Table 1 leading to the random signature process $\vec{X}$ as previously outlined and as summarized in Table 2. Given the dynamic nature of the phenomenon underlying these uncertainties, the statistics associated with the dimensions of $\vec{X}$ are often time varying. The target statistics are assumed to be stationary (constant with time), thus, the sample signatures associated with this random vector correspond to a stationary random process. Given the short measurement times associated with radar measurements of the nature under study, this assumption is appropriate.

TABLE 3

SENSOR SUMMARY

| | |
|---|---|
| Center frequency | 9.6 GHz |
| Transmit Bandwidth | 800 MHz |
| Number Bits in A/D Conversion | 8 Bits |
| Number of Pulses Integrated | 1024 |
| Signal-to-Noise Ratio (time delay domain) | 20 dB (variable) |

Modeling Pose Angle Estimation Uncertainty: The observed object aspect angle estimate can be viewed as lying within a solid cone angle centered on the observed object aspect angle ($\theta_t$, $\phi_t$). The parameter $\sigma_t$ is defined as the uncertainty associated with the sensor estimate of ($\theta_t$, $\phi_t$). The parameter $\sigma_t$ and $\mu_t$ are elements of $\vec{V}_t$ and are the standard deviation and bias of the object aspect angle estimate, respectively.

The variation in measured signature phenomenology due to the uncertainties in target aspect angle are generated in the signal model in Eq. (50) through the introduction of distributions on $\theta$ and $\phi$. The parameters $\theta$ and $\phi$ are both modeled as Gaussian random variables each with variance $\sigma_t^2$ and mean $\mu_t + \theta_t$, $\mu_t + \phi_t$. The bias parameter $\mu_t$ is assumed to be unknown and is modeled uniformly distributed between the interval [−1, 1] degrees.

Modeling Leading Edge Position Estimation Uncertainty: The leading edge location estimation will vary under real world sensing conditions. Thus, the range alignment (along $\vec{1}_{OS}$) of the measured signature process $\vec{X}$ to the decision rule training process $\vec{X}'$ is imperfect and can be modeled as an uncertainty source. The process $\vec{X}$ alignment to $\vec{X}'$ is modeled through a positive bias applied to the phase center of the scattering cluster underlying $\vec{X}$. The bias parameter $\mu_r$ is assumed to be unknown and is modeled uniformly distributed between [0, 0.2] meters. Note that $\mu_r$ is another element of $\vec{V}_t$.

Modeling Imperfect Training: The training process component $\vec{X}'$ in FIG. 2 represents the best achievable statistical characterization of the observed signature process $\vec{X}$. Signature training processes must represent the radar measured signature process across a wide range of measurement uncertainties and target configurations, as well as under many uncertain operating conditions including clutter, obscuration, and other sources of radio frequency (RF) interference. Construction of a signature training database derived entirely from measurements is expensive and can be an impractical proposition. It is possible to construct a signature database using electromagnetic scattering codes. However, given the complexity of typical targets and the challenge of modeling a variety of electromagnetic scattering phenomena ranging from specular reflection to edge diffraction, smooth surface diffraction, etc., computation of signatures with sufficient accuracy is a challenging task. Within this analysis, the dissimilarity between $\vec{X}$ with $\vec{X}'$ will be generated using a matched scattering center model configuration with $\vec{X}$. The uncertain parameters of $\vec{V}_t$ and $\vec{V}_E$ modeled within $\vec{X}$ are not modeled in $\vec{X}'$. $\vec{X}'=\vec{X}$ only when $\vec{X}$ is used directly for the training of the decision rule d.

Feature Discriminate and Decision Rule Design: The function $f$ used to compute the feature discriminate $\vec{Y}$ in FIG. 2 is developed from the squared error of the distance from the mean templates $\vec{\mu}_{\vec{X}_1}$ and $\vec{\mu}_{\vec{X}_2}$ derived from the marginal training processes $\vec{X}'_1$ and $\vec{X}'_2$ as defined below. The operator $|\vec{\tau}|$ is defined as the element-wise magnitude of each complex element of the random vector $\vec{\tau}$.

$$\vec{\mu}_{\vec{X}'_1} = E\{|\vec{X}'_1|\}, \vec{\mu}_{\vec{X}'_2} = E\{|\vec{X}'_2|\}, \vec{\mu}_{\vec{X}'_{12}} = \vec{\mu}_{\vec{X}'_1} - \vec{\mu}_{\vec{X}'_2}$$

$$\vec{Y}_1 = \left[|\vec{X}_1| - \vec{\mu}_{\vec{X}'_{12}}\right] \cdot \left[|\vec{X}_1| - \vec{\mu}_{\vec{X}'_{12}}\right]^T$$

$$\vec{Y}_2 = \left[|\vec{X}_2| - \vec{\mu}_{\vec{X}'_{12}}\right] \cdot \left[|\vec{X}_2| - \vec{\mu}_{\vec{X}'_{12}}\right]^T$$

$$\vec{Y} = [\vec{Y}_1, \vec{Y}_2]$$

The Maximum Likelihood estimator is used to determine the optimal decision rule d:

$$d = E\left\{\frac{E\{\vec{Y}_1\} - E\{\vec{Y}_2\}}{2}\right\}$$

Assuming equally likely priors on each of the binary hypotheses $H_1$ and $H_2$ in $\vec{X}$ and $\vec{Y}$, the samples ($\vec{Y}$) from $\vec{Y}$ are applied to the decision rule d. $\vec{Y}<d$ are declared from $H_1$ (denoted $Q_1$) and $\vec{Y}>d$ are declared from $H_2$ (denoted $Q_2$). The in-class and out-of-class scoring system is given by the conditional probabilities within $\alpha$, $\beta$, $\gamma$, and $\kappa$ as provided below:

$$\alpha = p(\vec{X}_1) \cdot p(Q_1/\vec{X}_1), \beta = p(\vec{X}_1) \cdot p(Q_2/\vec{X}_1)$$

$$\gamma = p(\vec{X}_2) \cdot p(Q_1/\vec{X}_2), \kappa = p(\vec{X}_2) \cdot p(Q_2/\vec{X}_2)$$

The output of the decision algorithm Q as formed from the scoring system above can be summarized by the confusion matrix for the binary classifier given in Table 4:

TABLE 4

CONFUSION MATRIX FOR Q

| Test Class/Train Class | $\vec{x}'_1$ | $\vec{x}'_2$ |
|---|---|---|
| $\vec{x}_1$ | α | β |
| $\vec{x}_2$ | γ | κ |

Certainty States: The most certain state achievable for the example HRR radar example presented here is the case of the observed deterministic multivariate signal in noise ($\vec{X}_n^i$) when accompanied by perfect training ($\vec{X}' = \vec{X}_n^i$). Table 5 relates selected combinations of measurement and training uncertainty sources from Table 1. The cases 1-6 identified in Table 5 represent the certainty states of interest within the system. Unknown parameters are shown in bold.

TABLE 5

MEASUREMENT AND TRAINING CERTAINTY CASES

| Case No. | Training Level | Measurement Level |
|---|---|---|
| Case 1 | $\vec{X}' = \vec{X}_n$<br>$\sigma_t = 0°, \mu_t = 0°$<br>$\sigma_r = 0$ m, $\sigma_r = 0°$ SNR = 20 dB<br>$(\theta_t, \phi_t) = 10°, 7.5°$ | $\vec{X}_n$<br>$\sigma_t = 0°, \mu_t = 0°$<br>$\sigma_r = 0$ m, $\sigma_r = 0°$ SNR = 20 dB<br>$(\theta_t, \phi_t) = 10°, 7.5°$ |
| Case 2 | $\vec{X}' = \vec{X}$<br>$\sigma_t = .75°, \pmb{\mu_t}$<br>$\sigma_r = 0$ m, $\sigma_r = 0°$ SNR = 20 dB<br>$(\theta_t, \phi_t) = 10°, 7.5°$ | $\vec{X}$<br>$\sigma_t = .75°, \pmb{\mu_t}$<br>$\sigma_r = 0$ m, $\sigma_r = 0°$ SNR = 20 dB<br>$(\theta_t, \phi_t) = 10°, 7.5°$ |
| Case 3 | $\vec{X}' = \vec{X}$<br>$\sigma_t = .75°, \mu_t = 0°$<br>$\sigma_r = 0$ m, $\pmb{\mu_r}$ SNR = 20 dB<br>$(\theta_t, \phi_t) = 10°, 7.5°$ | $\vec{X}$<br>$\sigma_t = .75°, \mu_t = 0°$<br>$\sigma_r = 0$ m, $\pmb{\mu_r}$ SNR = 20 dB<br>$(\theta_t, \phi_t) = 10°, 7.5°$ |
| Case 4 | $\vec{X}' = \vec{X}$<br>$\sigma_t = .75°, \mu_t = 0°$<br>$\sigma_r = 0$ m, $\mu_r = 0°$ SNR<br>$(\theta_t, \phi_t) = 10°, 7.5°$ | $\vec{X}$<br>$\sigma_t = .75°, \mu_t = 0°$<br>$\sigma_r = 0$ m, $\mu_r = 0°$ SNR<br>$(\theta_t, \phi_t) = 10°, 7.5°$ |
| Case 5 | $\vec{X}' = \vec{X}$<br>$\sigma_t = .75°, \pmb{\mu_t}$<br>$\sigma_r = 0$ m, $\pmb{\mu_r}$ SNR<br>$(\theta_t, \phi_t) = 10°, 7.5°$ | $\vec{X}$<br>$\sigma_t = .75°, \pmb{\mu_t}$<br>$\sigma_r = 0$ m, $\pmb{\mu_r}$ SNR<br>$(\theta_t, \phi_t) = 10°, 7.5°$ |
| Case 6 | $\vec{X}' = \vec{X}$<br>$\sigma_t = .75°, \pmb{\mu_t}$<br>$\sigma_r = 0$ m, $\mu_r = 0°$ SNR = 20 dB<br>$(\theta_t, \phi_t) = 10°, 7.5°$ | $\vec{X}$<br>$\sigma_t = .75°, \pmb{\mu_t}$<br>$\sigma_r = 0$ m, $\pmb{\mu_r}$ SNR<br>$(\theta_t, \phi_t) = 10°, 7.5°$ |

*note:
Parameter $\mu_t$ modeled uniform $[-1°, 1°]$, Parameter $\mu_r$ modeled uniform $[0°, .2°]$, Parameter SNR modeled Gaussian ($\mu = 20$ dB, $\sigma^2 = 4$ dB).

Assuming sufficient sampling to completely determine the probability density function (pdf) associated with the additive noise, the resulting statistical characteristics of the random performance functions will resemble the delta function and thus the reliability in predicted link performance (such as $\sigma_{P_e}$) will be very high as shown in case 1 of Table 5. In a less certain case, the signal under measurement is random in nature ($\vec{X}$). The expected performance of the random performance functions will reflect the loss in information due to the degree of uncertainty present in $\vec{X}$ as well as a decrease in reliability. Given the progressively large number of degrees of freedom associated with the uncertainty parameters associated with $\vec{V}_E$ and $\vec{V}_t$ in $\vec{X}$, the statistical support underlying the statistics of the random link performance functions $P_e^{\vec{X}}$, $P_e^{\vec{Y}}$, $P_e^Q$, and $P_e^{Q'}$ can quickly increase as is shown in case 3-5 in FIG. 11, which illustrates the propagation of uncertainty.

Case 1 of Table 5 represents an observed process $\vec{X}_n$ of a stationary object of known aspect angle with perfect training. Case 1 conditions correspond to the highest certainty state possible. Case 2 corresponds to the observed process $\vec{X}$ of an object that is moving slow enough as to appear stationary during the measurement interval. The aspect estimation is $\sigma_t = 0.75$ degrees with an unknown bias ($\mu_t$), and again the training is perfect. Case 3 conditions are similar with an unknown leading edge position bias $\mu_r$.

The signal-to-noise ratio (SNR) parameter is treated as an unknown parameter in Case 4. Case 5 is a combined condition of the unknown parameters in Cases 2, 3, and 4. In case 6, a form of imperfect training is presented where the measurement parameter uncertainty provided in Case 5 is combined with training level B ($\mu_r = 0$ and $\mu_t = 0$).

Sampling and FBIT Analysis: The amplitude response for the N sample ensemble of HRR signatures for a "baseline" set of conditions defined as Case 2 ($\mu_r = 0$ and $\mu_t = 0$) are provided in FIGS. 12A and 12B (magnitude of $\vec{X}_1$ and $\vec{X}_2$, respectively). The five target features (K=5) at range bins 17-21 are selected for discriminate processing in $\vec{X} \rightarrow \vec{Y}$.

Sampling Uncertainty Example: The sampling uncertainty previously defined is illustrated using the baseline uncertainty conditions and multiple target ensembles similar to those previously discussed. Using the Monte Carlo simulation, the typical set for $\vec{X}_1$, $\vec{X}_2$, and $\vec{X}$, is computed for an increasing value for N. Multiple ensembles of each are simulated at each value of N to generate both the mean and variance of the entropy estimate within the typical set.

Figure 13:
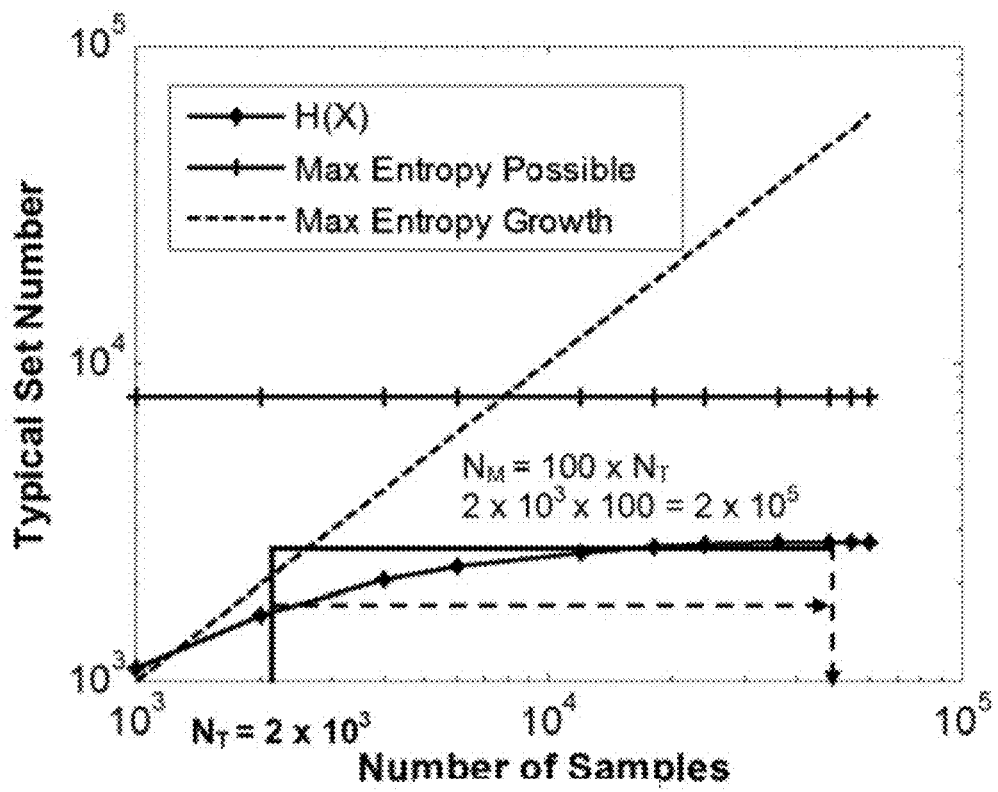
FIG. 13 is a plot illustrating the phase transition within a typical set of $\vec{X}$ vs. N, where $n_b=6$.

FIG. 13 illustrates the phase transition within a typical set of $\vec{X}$ vs. N. The typical set plot in FIG. 13 provides the value for $N_M$ for the entropy estimates for $\vec{X}$ as defined previously where $n_b = 6$. The number of samples required for each ensemble based on the phase transition at $N_T = 2 \times 10^3$ within the typical set profile is $N_M = 2 \times 10^5$.

Figure 14:
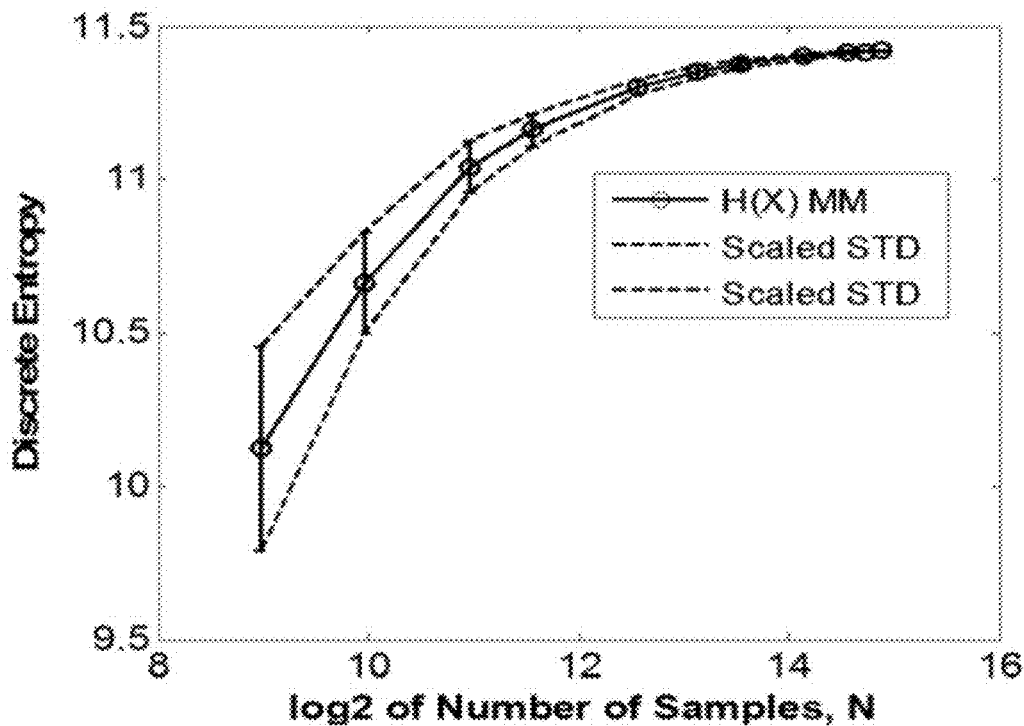
FIG. 14 is a plot illustrating the scaled standard deviation of estimator of entropy of $\vec{X}$ vs. N, where $n_b=6$ and $L=1000$.

FIG. 14 demonstrates the entropy scaling property previously discussed by illustrating the scaled standard deviation of estimator of entropy of $\vec{X}$ vs. N. In the following example, Monte Carlo simulation is used to compute the actual estimation variance (L draws=1000; $n_b = 6$) at each incremental setting of $N_M$. The estimation variance at $N_T = 3 \times 10^3$ is scaled at each setting of $N_M$ to $N_M = 2 \times 10^5$, validating the use of the 1/N scaling factor in Eq. (47).

Figure 15:
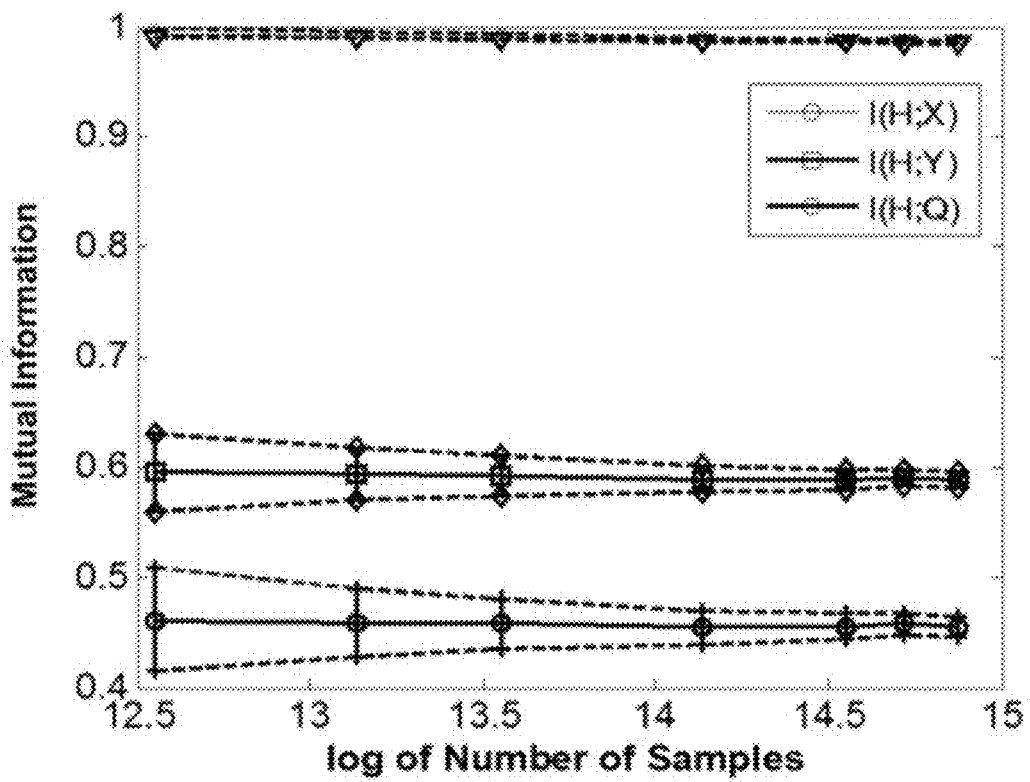
FIG. 15 is a plot illustrating the scaling properties of $\hat{I}(H; \vec{X})$, $\hat{I}(H; \vec{Y})$, and $\hat{I}(H; Q)$ vs. ensemble size N, where $N_T=3\times10^3$, $n_b=6$, and $L=1000$.

The sampling uncertainty associated with entropic estimation at $\vec{X}$ is realized within the estimate $\hat{I}(H; \vec{X})$. FIG. 15 applies the 1/N scaling directly to the MLE estimate of $\hat{I}(H; \vec{X})$, $\hat{I}(H; \vec{Y})$, and $\hat{I}(H; Q)$ beginning at $2 \times N_T = 6 \times 10^3$.

Figure 16:
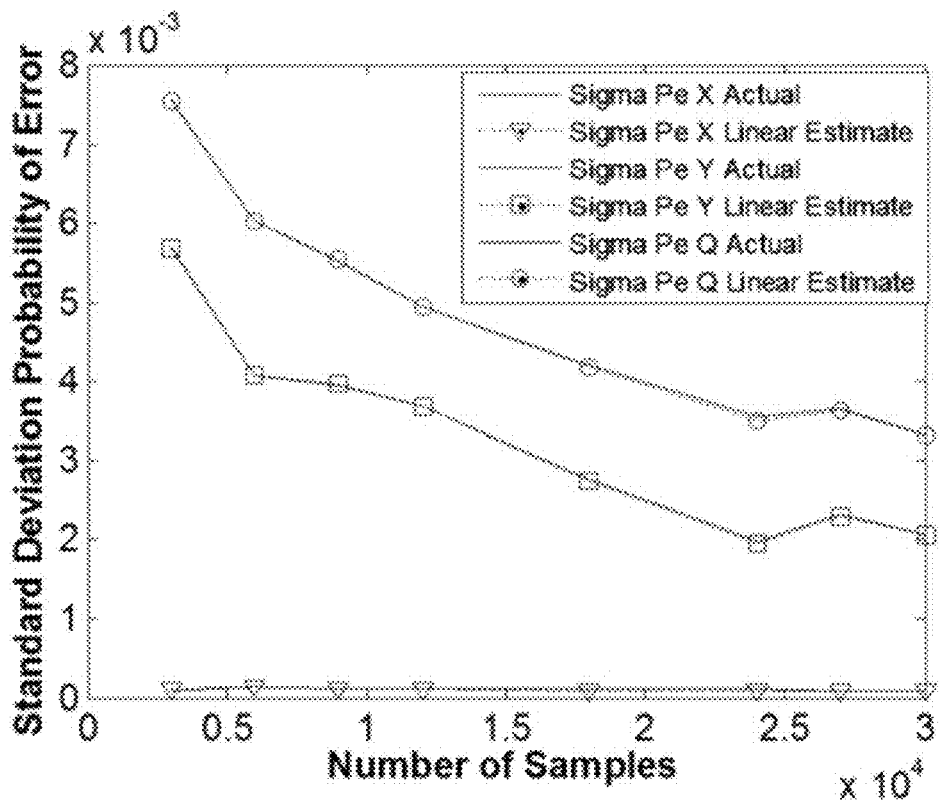
FIG. 16 is a plot comparing the calculated probability of error estimate to the probability of error computed using simulation.

In Eq. (47), Corollary IV and V are used to compute the sampling uncertainty associated with the estimate of the probability of error. The following figures demonstrate the accuracy of Corollary IV and V using Eq. (44), which is applied at each link in the radar channel. Note that each application of Eq. (44) is conducted with the $2 \times N_T = 6 \times 10^3$ as the basis for the scaling. The approximation for the standard deviation of the probability of error is computed for the complete range of ensemble size out to $N = 3 \times 10^4$. FIG. 16 provides a comparison of the probability of error estimate using Eq. (44) to the error computed using simulation where L=1000 and $n_b = 6$. These results show that the estimates compare very nicely to the "actual" results. This agreement indicates that the dispersion of the mean mutual information of the estimate is low enough to support the use of the linear approximation.

Figure 17:
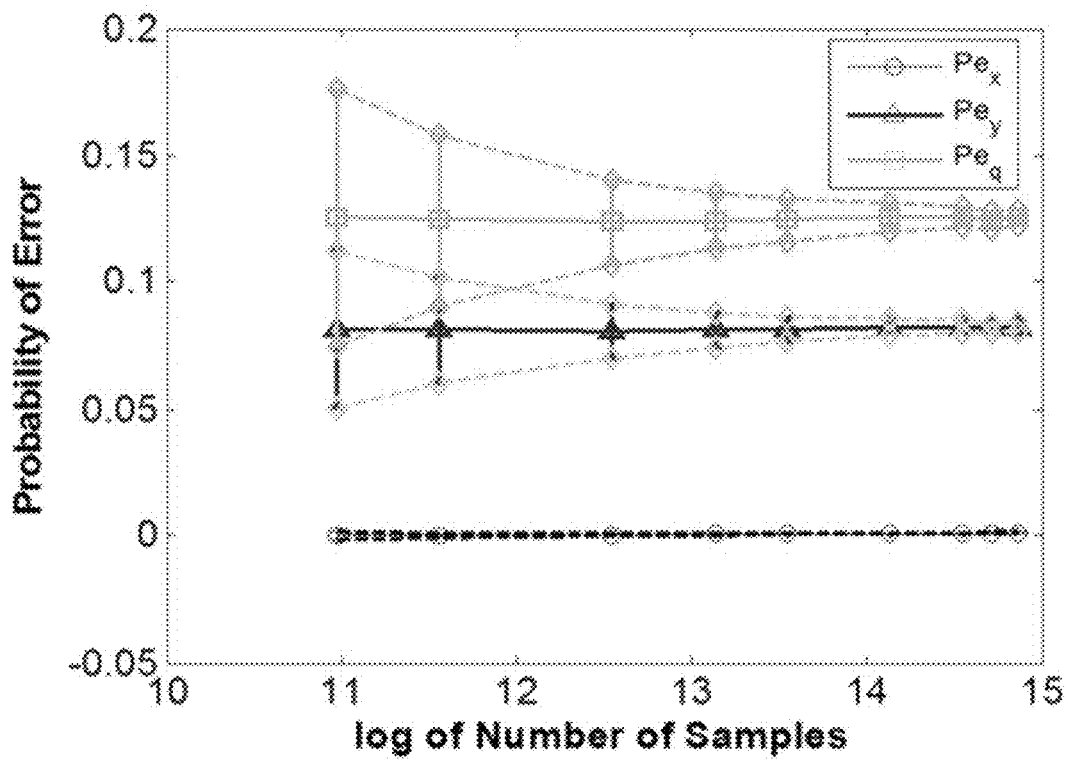
FIG. 17 is a plot illustrating the application of Eq. (44) to the results of FIG. 15.

The application of Eq. (44) at each draw of the Monte Carlo simulation will generate an approximation of the sampling uncertainty within the probability of error estimate. FIG. 17 illustrates the application of Eq. (44) to the results in FIG. 15.

Figure 18:
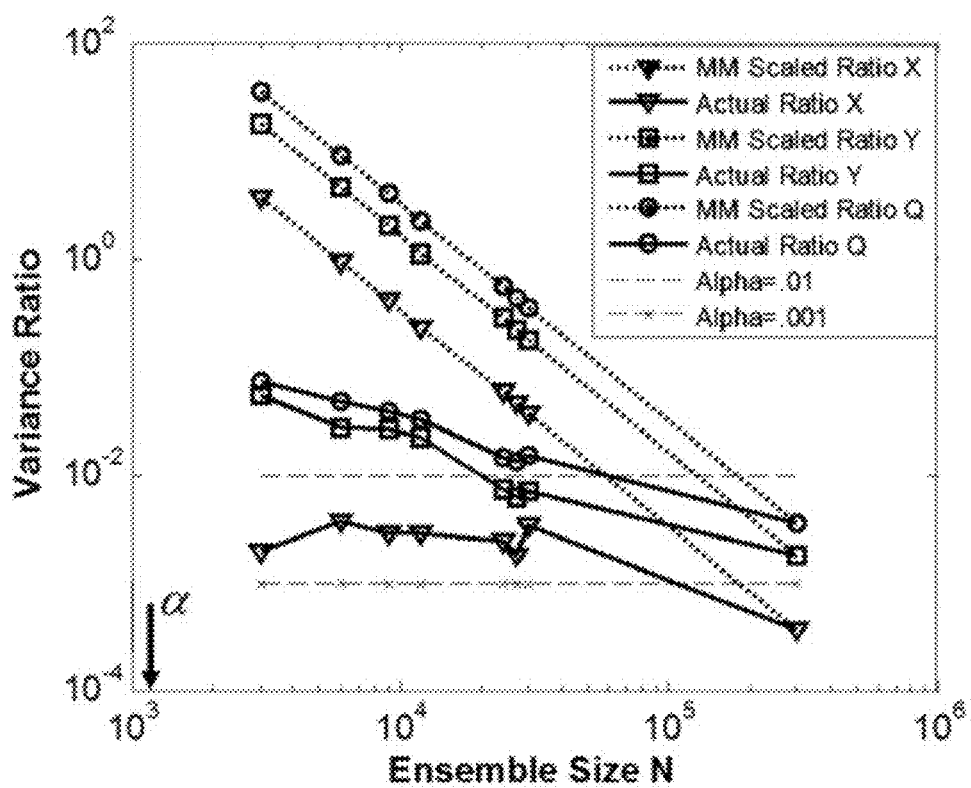
FIG. 18 is a plot illustrating application of Eq. (48) to the radar example at the three link positions $\vec{X}$, $\vec{Y}$ and Q.

Eq. (48) provides the test for minimum sampling based on low sample ensemble sizes. In FIG. 18, Eq. (48) is applied to the radar example at the three link positions $\vec{X}$, $\vec{Y}$ and Q. The test results in FIG. 18 show that the true ratio of sampling variance to the variability in predicted link performance is given as a function of ensemble size N. This is indicated by the solid lines. The dashed lines represent the ratio as given by the 1/N scaling as discussed above. The required ratio $\alpha$ is given by the dashed black line at two different levels. The results of the test given in Eq. (48) are given at each increment for $N_T=3\times10^3$. The interesting observation in FIG. 18 is that the point at which the test falls below the threshold $\alpha$ is consistent with the ensemble size $N_M$ as derived from the phase transition point $N_T$ as previously outlined. This is a significant validation of the phase transition method for estimating minimum ensemble size within Monte Carlo simulation. The results of the three tests above provide insight into the relationship of the required ensemble size N to the reliability in link performance estimates within sensitivity analysis simulations.

Figure 19:
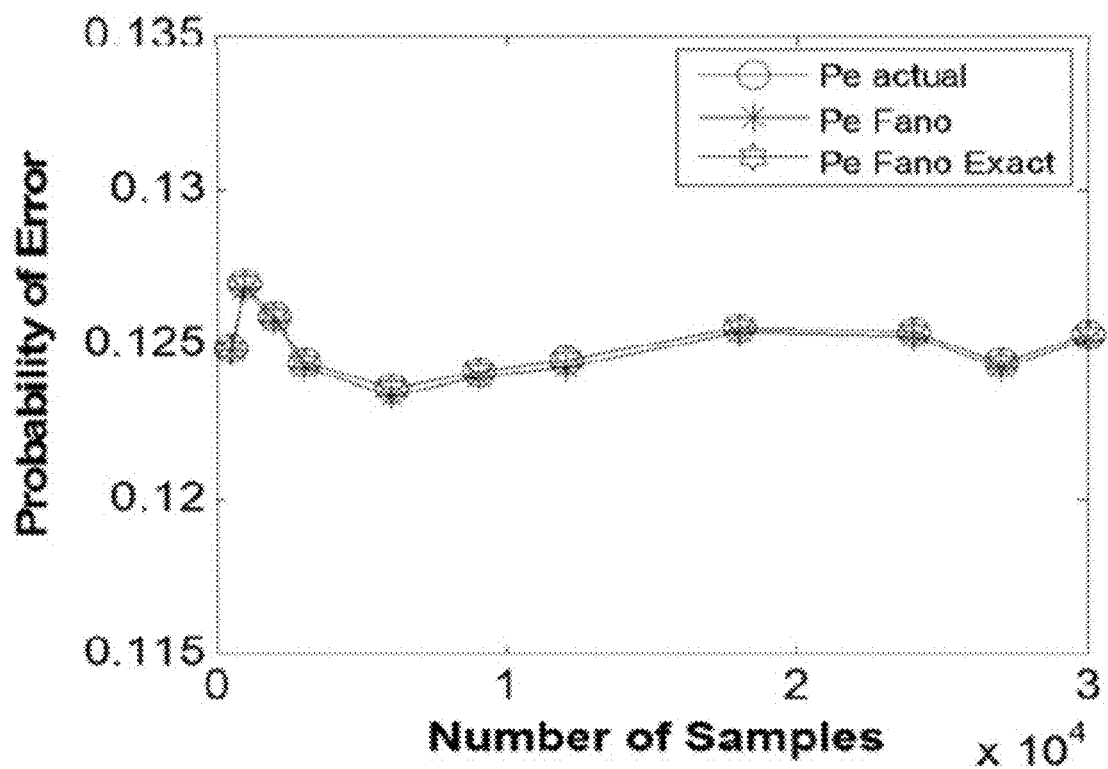
FIG. 19 is a plot comparing the performance given by the Fano approximation using Case 2 ($\mu_r=0$ and $\mu_i=0$) conditions, the simulated "true" performance, and the performance using the equality form of Fano in Theorem I.

The Fano Equality: It is important to demonstrate the validity of Theorem I as written in Eq. (3). Using the radar example, FIG. 19 illustrates that the addition of I(Q;V) brings the approximation form of Fano into agreement with the "true" probability of error as simulated using Monte Carlo within the radar example outlined above. Again using Case 2 ($\mu_r=0$ and $\mu_t=0$) conditions for the binary classification, the performance given by the Fano approximation is given by the line with asterisks ($P_e$ Fano). The simulated "true" performance is given by the line with circles ($P_e$ actual). The line with stars ($P_e$ Fano Exact) represents the performance using the equality form of Fano in Theorem I. The equality form of Fano agrees with the "true" performance which validates Theorem I.

Experiments: The experiments conducted are given in Table 6:

TABLE 6

LIST OF EXPERIMENTS AND APPLICABLE CASES

| Experiment | Case | Hypothesis |
|---|---|---|
| 1. Information Flow | 2 | 1 |
| 2. System Trades | 2 | 2 |
| 3 System Uncertainty and Information Flow | 1, 2, 3, 4, 5, 6 | 3, 4, 5 |

Information Flow and Design Trades within the Radar Channel: The value of the Data Processing Inequality is readily seen from FIGS. 20-22 where the individual loss at each link in the channel can be quantified. In each of the figures, the MI and probability of error is computed for a changing design parameter within $v_c$. Three design parameters are traded: system thermal noise, system dynamic range, and system bandwidth.

Figure 20:
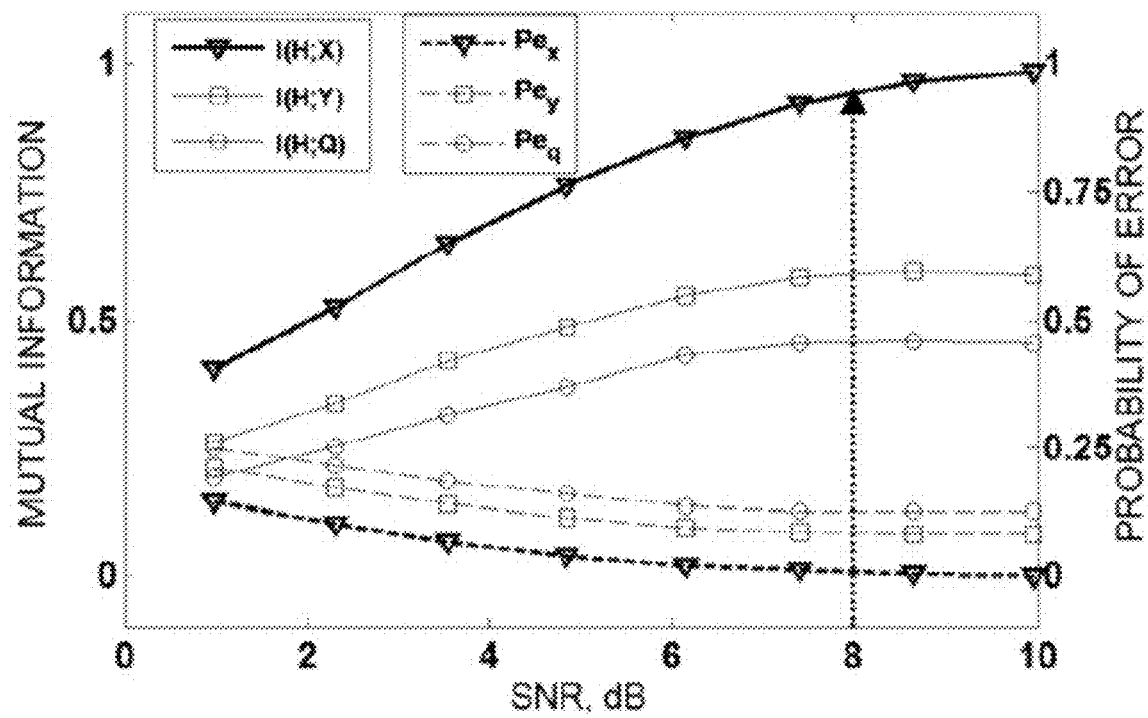
FIG. 20 is a plot illustrating an exemplary system trade between mutual information and thermal noise.

The signal-to-noise ratio of the signatures resulting from sensor measurements depends in part on the noise figure of the system. In FIG. 20, thermal noise is scaled by varying the noise figure across a range that affects a SNR range of 1 dB to 10 dB (SNR is given in frequency domain prior to inverse Fourier Transform gain). The results of the SNR trade indicate that an SNR of 8 dB in the frequency domain (19 dB in the time-delay domain after transform gain) will generate maximum information flow.

It is also of interest how the dynamic range of the sensor affects the information flow through the channel. Specifically, the sensitivity of I(H;Q) and ultimately $P_e$ to the dynamic range in the sensor is of interest. The A/D conversion of the radar intermediate frequency (IF) signal to a digital representation must preserve the amplitude and phase information contained in the radar return with minimum error. The effects of quantization at each measurement point (quantization event) due to the twos-complement rounding error are assumed to be zero mean white noise processes. The A/D conversion and associated quantization noise are modeled as an additive noise component $\vec{e}$ and added to the measured signature process.

$$\vec{X}_n^i = \vec{X}_E^i + \vec{n} + \vec{e} \quad (52)$$

The maximum dynamic range supportable by a "B-bit" quantizer is the ratio of the largest representable magnitude to the smallest nonzero representable magnitude. The dynamic range for twos compliment and magnitude encoding for a "B-bit" quantizer is $$\text{Dynamic Range (dB)} = 20 \cdot \log_{10}\left(\frac{2^{(B-1)}-1}{1}\right).$$

Figure 21:
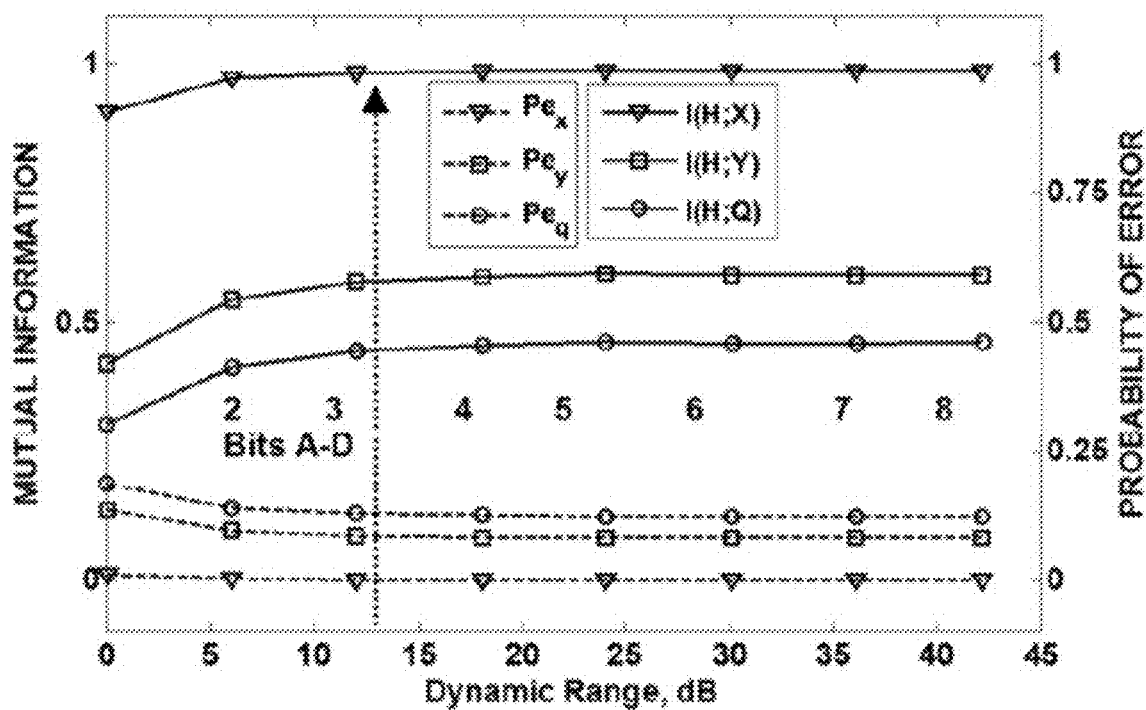
FIG. 21 is a plot illustrating an exemplary system trade between mutual information and dynamic range.

The dynamic range trade in FIG. 21 indicates that a 3 or 4 Bit A/D converter is needed to maximize information flow in the channel given the binary target set under evaluation.

Figure 22:
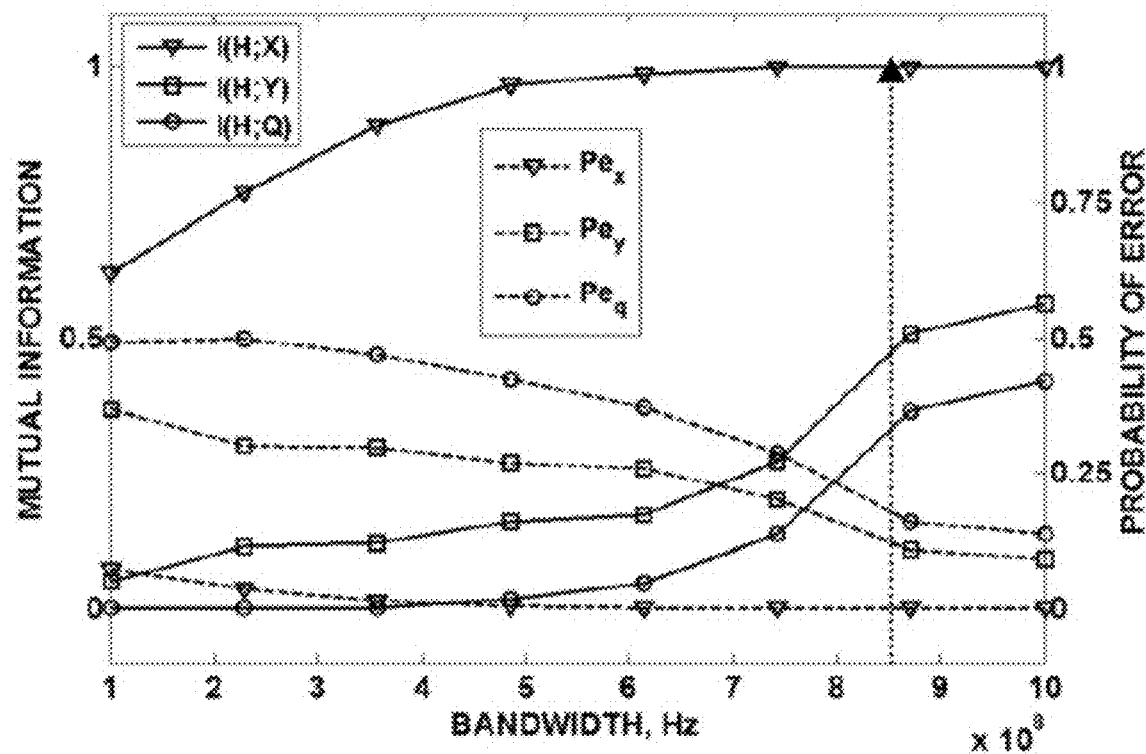
FIG. 22 is a plot illustrating an exemplary system trade between mutual information and bandwidth.

The analysis of the bandwidth trade in FIG. 22 can be nicely linked to the physical scattering configurations of target 1 and target 2. As mentioned earlier port, the locations for the non-collocated dominant scatterer differ by 0.2 meters or 0.65 feet.

One would then expect that there should be a 'bump' in information flow when the bandwidth reaches levels that support the resolution necessary to resolve the peaks associated with these two scatterers. The theoretical resolution to achieve this feature separation would be approximately 800 MHz using the fundamental bandwidth relationship;

$$\frac{c \cdot \tau}{2} = .6 \text{ feet} = \frac{c}{2 \cdot BW}.$$

In FIG. 22, the bump in performance is centered at 800 MHz where the mutual information at $\vec{Y}$ and Q is rapidly increasing and where the probability of error is greatly reduced.

In each figure, it can be seen that the MI decreases as links move further down the channel. With one Bit going into the channel (binary classification problem), Table 7 tabulates the information loss budget for each trade study at the selected baseline operating point.

The study of Table 7 reveals several key points. First, in this particular example problem, the targets appear to be separating very well at $\vec{X}$, and much of the loss occurs within the feature extraction and at the application of the decision rule. The loss at link $\vec{Y}$ appears to be the dominant information limiting component in the system. There is a loss of 0.3-0.4 Bits at the feature extraction function at $\vec{Y}$. The information loss associated with signature measurement and signature processing results in only 0.1 Bits of loss. This is very important information in the effective optimization of system design for information sensing. Little gain can be expected through the expansion of sensing degrees of freedom (DOF) in improving the overall performance of the system.

TABLE 7

INFORMATION LOSS BUDGET FOR VARIOUS TRADES

| System Component | Information Loss, Bits | | |
| --- | --- | --- | --- |
|  | Trade 1 (SNR) | Trade 2 (DR) | Trade 3 (BW) |
| Source-to-Measurement ($\vec{X}$) | 0.1 | 0.1 | 0.05 |
| Measurement-to-Feature ($\vec{Y}$) | 0.4 | 0.3 | 0.4 |
| Decision Rule Application (Q) | 0.1 | 0.2 | 0.1 |
| Total Channel Loss* | 0.6 | 0.6 | 0.55 |

*Baseline Conditions; SNR = 20 dB, BW = 800 MHz, DR = 20 dB

Also, the loss due to the decision component of the system is in the range of 0.1-0.2 Bits. Depending on the performance requirements of the system, improvements to the decision stage of the system may or may not be warranted. At the decision stage of the system, 0.4-0.5 bits of loss have been sustained resulting in an "upper bound" in performance of something in the area of $P_e=0.1$. No improvements to the classifier design within the decision component of the system can improve upon this performance level. Improvements appear to be best directed toward the feature extraction stage.

An optimal design operating point may for example include the following component selections: (i) A/D converter with B=4 Bits; (ii) receiver design that achieves 20 dB SNR under tactically significant conditions; and (iii) transmit waveform with BW>800 MHz.

Information Flow and System Uncertainty: The study of the effects of sources of uncertainty on system performance confidence while under control parameters $\vec{v}_c$ and in the presence of sensing uncertainty ($\vec{V}_E$, $\vec{V}_t$) is of particular interest. For a fully sampled signature process with negligible sampling uncertainty per Eq. (46), the FBIT method can be applied to study the independent sources of uncertainty. The effects of each independent source of uncertainty can be studied at each link in the channel. Eq. (36) is demonstrated for links $\vec{X}$, $\vec{Y}$, and Q under case 5 conditions defined in Table 5. Under these conditions, three independent sources of uncertainty are introduced in the system under perfect training conditions. An unknown bias in target aspect estimation and an unknown bias in leading edge range bias estimation are assumed. The target range is also unknown and as such a third uncertainty in introduced in the SNR of the measured signature. All assumed statistics associated with the uncertainties are as defined under case 5 of Table 5 and as described previously.

Figure 23:
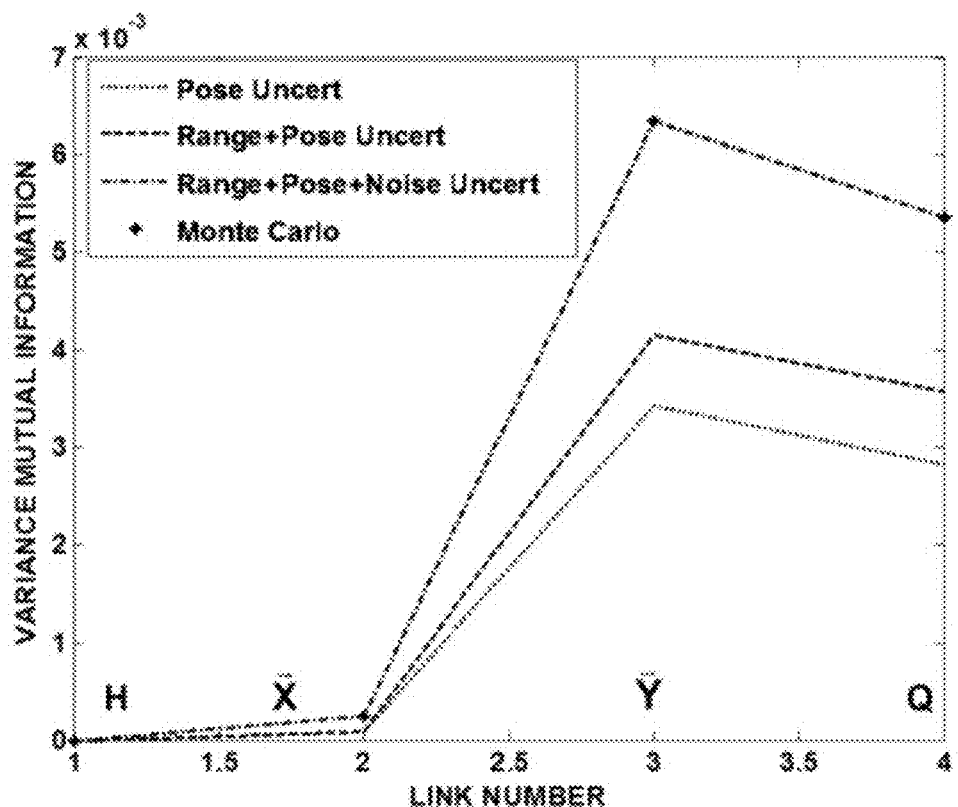
FIG. 23 is a plot illustrating the individual contributions to the cumulative link loss variance in an incremental fashion.

Using Monte Carlo simulation, L independent draws of an $N_M$ sample ensemble from $\vec{X}$ are generated. The FBIT method is applied at each draw to generate the decomposition of the performance estimate reliability in Eq. (36) at $\vec{X}$, $\vec{Y}$, and Q. In FIG. 23, the cumulative link loss standard deviation defined in Eqs. (24.a), (24.b), and (24.c) resulting from the sum of the independent three uncertainty sources is computed about the expected link information loss defined in Eqs. (23.a), (23.b), and (23.c). To clearly illustrate the level of agreement of the independent link loss contributions to the total produced by the joint simulation, the individual contributions to the cumulative link loss variance are individually plotted in an incremental fashion in FIG. 23. FIG. 23 shows that the sum of the independent uncertainty sources yields the same results as the Monte Carlo simulation involving all three factors in a joint process.

Figure 24:
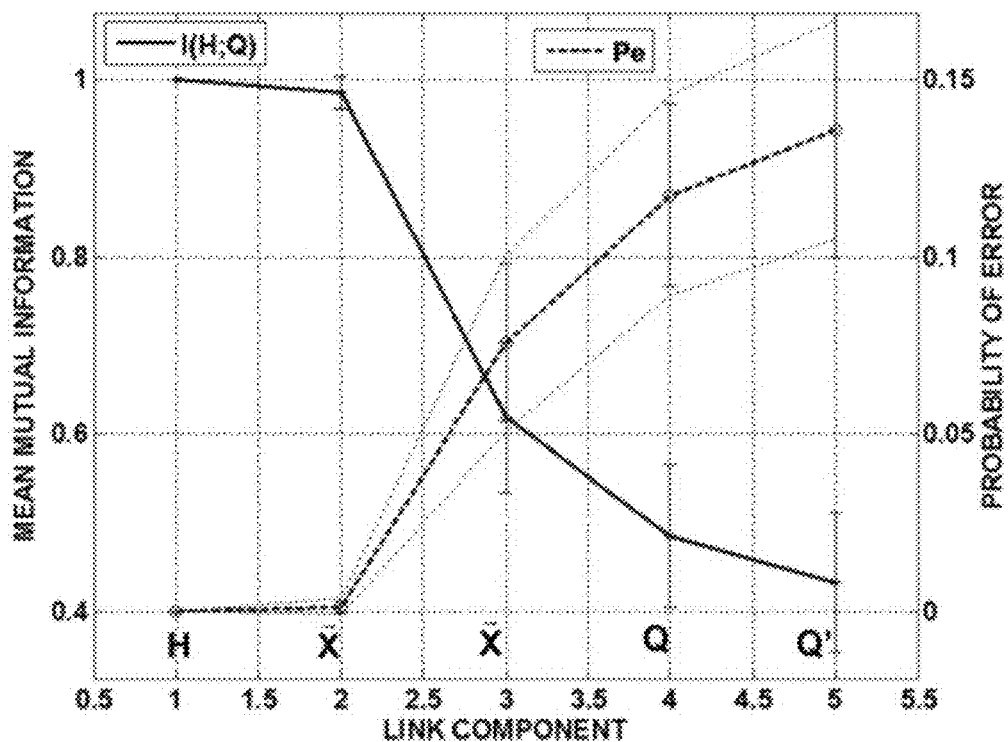
FIG. 24 is a plot illustrating the relationships between the channel mutual information, the predicted link performance, and the reliability of the predicted link performance.

The corresponding impacts to the reliability in link performance can be generated through the application of Corollary IV and V. In FIG. 24, the reliability in predicted link performance as quantified by Definition 5 resulting from the sum of the independent three uncertainty sources is presented in the error bars about the expected link performance defined in Eqs. (31.a), (31.b), and (31.c). The dashed line represents the results of the joint Monte Carlo simulation where all three independent uncertainty factors are simulated simultaneously. The results in FIG. 24 show clearly that the sum of the independent events equals the joint event, thus validating the assumption of independence in the three sources of uncertainty acting on the predicted performance risk.

Figure 25:
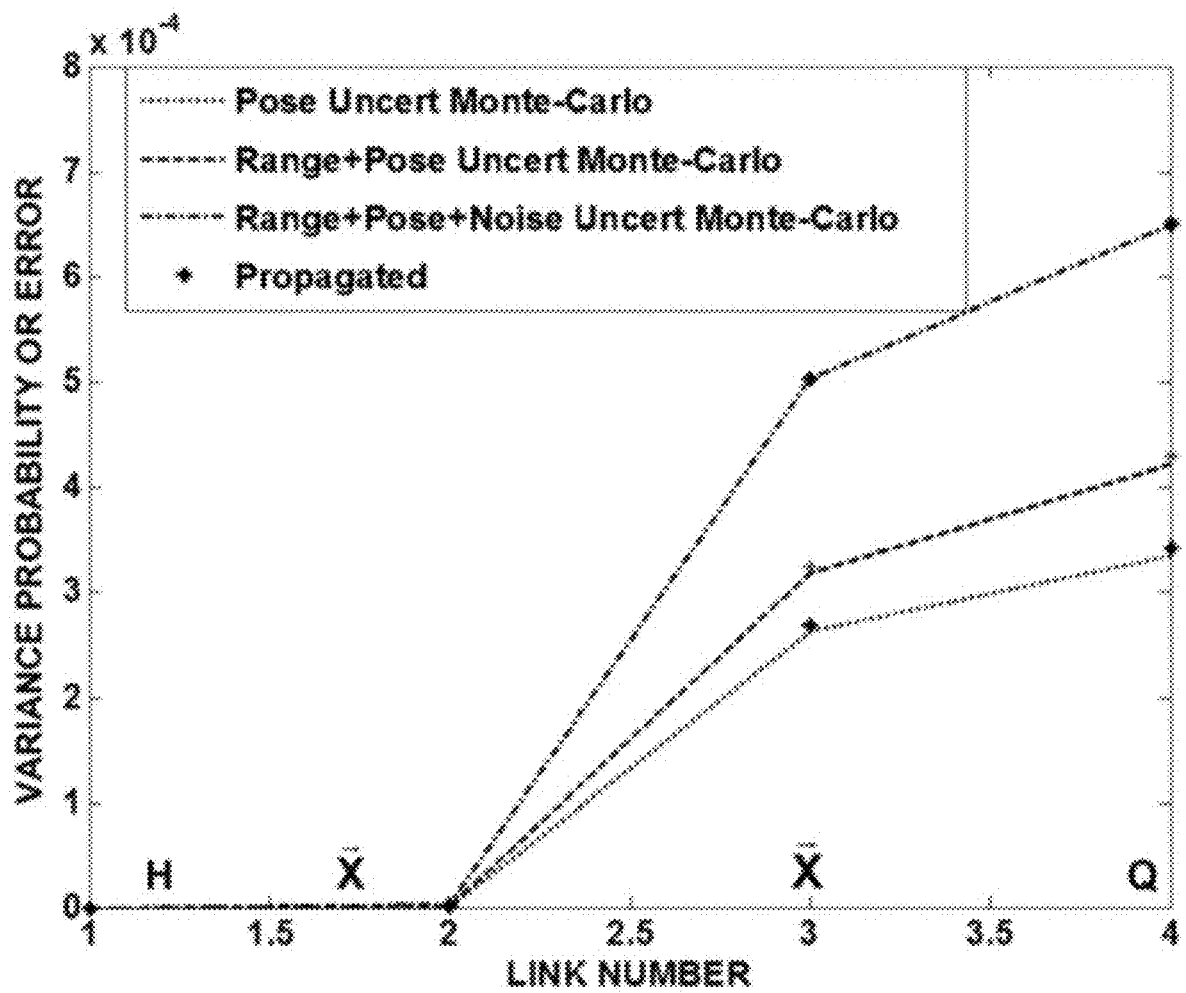
FIG. 25 is a plot illustrating the reliability of the predicted link performance as a variance.

In FIG. 25, a similar validation of the propagation of independent uncertainty sources is given for the reliability in predicted performance. The example demonstrates that the use of Corollary IV and V to approximate the reliability on the performance estimate using the link loss variance is a very effective means to address the transcendental relationship underlying this method. The data points marked with the asterisks represent the sum of the independent contributions to the reliability in performance prediction. The respective plotted lines represent the results of direct simulation at the specified link.

The implications of imperfect training are realized in the final stage of the channel at Q' as shown in FIG. 24. At Q', case 6 conditions in Table 5 are used to present a naïve training approach as previously developed.

A summary of the expected link loss, expected link performance, reliability in link performance, and results of respective sampling uncertainty tests in FIG. 18 are given in Table 8. The reliability in predicted performance decreases as information propagates down the sensing channel. The expected link performance also decreases in accordance with the principles of mutual information and the Data Processing Inequality. Much of the decrease in reliability and loss in predicted performance and loss in performance comes at the feature extraction stage in the system. The reduced reliability in performance prediction is most sensitive to the uncertainty factor of SNR. The effects of the factors associated with target range bias and pose estimate bias are of less significance relative to the total reliability in predicted performance.

TABLE 8

INFORMATION CONFIDENCE & LOSS BUDGET FOR VARIOUS CONDITIONS

| Link | Link Loss, Bits | Link Information Measure | | |
|---|---|---|---|---|
| | | Expected Link Performance | Reliability in Link Performance | Sampling Uncertainty Test |
| H | 0.0 | — | — | — |
| $\vec{X}$ | $\mu_{IL_{S\Delta}} = 0.05$ | $\mu_{P_{e_{\vec{X}}}} = 0.013$ | $\sigma_{P_e^{\vec{X}}} = 0.003$ | $\left(\dfrac{\sigma^2_{P_{e_N}^{\vec{X}}}}{\sigma^2_{P_{e_N}^{\vec{X}}}}\right) < .001$ |
| $\vec{Y}$ | $\mu_{IL_{F\Delta}} = 0.35$ | $\mu_{P_{e_{\vec{Y}}}} = 0.073$ | $\sigma_{P_e^{\vec{Y}}} = 0.0228$ | $\left(\dfrac{\sigma^2_{P_{e_N}^{\vec{Y}}}}{\sigma^2_{P_{e_N}^{\vec{Y}}}}\right) < .003$ |
| Q | $\mu_{IL_{D\Delta}} = 0.16$ | $\mu_{P_{e_Q}} = 0.12$ | $\sigma_{P_e Q} = 0.0255$ | $\left(\dfrac{\sigma^2_{P_{e_N}^Q}}{\sigma^2_{P_{e_N}^Q}}\right) < .006$ |
| Q' | $\mu_{IL_{T\Delta}} = 0.04$ | $\mu_{P_{e_{Q'}}} = 0.125$ | $\sigma_{P_e Q'} = 0.0266$ | — |

From Table 8 it can be seen that gains in performance due to component design trades must also take into account the reliability level associated with predicted performance. In this example problem, changes within two significant digits of the expected performance should be studied in the context of the reliability of the performance estimates based on uncertainty factors introduced in the system.

By virtue of the foregoing, a method is provided for identifying and characterizing component-level information loss in a nonlinear system comprising a plurality of components, wherein at least one of the components of the nonlinear system is subject to at least one source of uncertainty, each source of uncertainty comprising a plurality of system uncertainty parameters, the method comprising the steps of: (a) determining discrete decision states for the nonlinear system, wherein the discrete decisions states comprise a true object state H and a decision state Q, the discrete decision states being characterized in a Markovian channel model comprising a plurality of links, wherein each link corresponds to one component of the nonlinear system; (b) modeling the system uncertainty parameters to create a plurality of distributions, wherein each distribution comprises a plurality of values ranging from a theoretical maximum entropy to a theoretical minimum entropy for one system uncertainty parameter, wherein at least one of the system uncertainty parameters is unknown; (c) calculating an entropy at each component, H(H), H(X), H(Y), ... H(Q), wherein the entropy is directly related to an amount of uncertainty at each component; (d) computing an amount of mutual information between H and Q, I(H;Q), wherein I(H;Q) is used to characterize a total system performance and wherein the at least one source of uncertainty increases a total amount of entropy in the nonlinear system, thereby decreasing I(H;Q) and degrading the total system performance; (e) calculating an amount of cumulative component information loss from H to Q, $IL_X$, $IL_Y$, ... $IL_Q$, wherein $IL_Q$ is equal to a sum of the component-level information loss that occurs at each component, $IL_{X\Delta}$, $IL_{Y\Delta}$, ... $IL_{Q\Delta}$, and wherein component-level information loss occurs only within the Markovian channel model; (f) correlating, using Fano's equality, at least one of I(H;Q) and $IL_Q$ to the total amount of entropy to generate at least one overall probability of error $P_e$ for the nonlinear system; (g) estimating, using the Data Processing Inequality together with Fano's equality, a component-level probability of error, $P_e^X, P_e^Y, \ldots P_e^Q$; and (h) correlating the component-level probability of error to the component-level information loss.

In one or more embodiments, the method further comprises computing a component-level performance reliability and attributing a contribution of each system uncertainty parameter to the component-level performance reliability, the method comprising the steps of: (a) determining a real world statistical variation of the system uncertainty parameters; (b) performing a Monte-Carlo simulation of a plurality of the statistical uncertainty parameters for a plurality of settings through iteration of steps 1b) to 1h); (c) calculating a component-level probability of error statistical distribution at each component; (d) determining the component-level performance reliability based on a standard deviation of each component-level probability of error statistical distribution; and (e) correlating the contribution of each system uncertainty parameter to the component-level performance reliability.

In an exemplary embodiment, the step of performing the Monte-Carlo simulation further comprises determining a proper ensemble sample size. In an exemplary embodiment, the method further comprising determining at least one component-level ensemble sampling requirement for the method of claim 1, the method comprising the steps of: (a) determining a set of test criteria for a maximum allowable sampling uncertainty of the component-level information loss relative to the component-level probability of error statistical distributions; (b) determining a sample ensemble size $N_M$ for the component-level information loss using a phase transition method; and (c) computing the component-level performance reliability using a numerical simulation method on the sample ensemble size $N_M$. In a particular embodiment, the numerical simulation method comprises Monte Carlo modeling.

In another aspect of the present disclosure, a method is provided for determining an optimal component design for a nonlinear system comprising a plurality of components, wherein at least one of the components of the nonlinear system is subject to at least one source of uncertainty, each source of uncertainty comprising a plurality of system uncertainty parameters, the method comprising the steps of: (a) establishing an information loss budget comprising a desired $P_e^Q$; (b) calculating component-level information loss, $IL_{X\Delta}$, $IL_{Y\Delta}$, . . . $IL_{Q\Delta}$, according to claim 1; (c) calculating component probability of error, $P_e^X, P_e^Y, \ldots P_e^Q$, according to claim 1 to generate a calculated $P_e^Q$; (d) comparing the calculated $P_e^Q$ with the desired $P_e^Q$; (e) identifying at least one source of information reduction, wherein the at least one source of information reduction comprises at least one of component-level information loss and information flow reduction; (f) determining the optimal component design to minimize the calculated $P_e^Q$, wherein the optimal component design includes at least one tradeoff between information flow and component design, wherein the at least one tradeoff decreases the at least one source of information reduction; and (g) repeating steps 6b) to 6g) until the calculated $P_e^Q$ is equal to or less than the desired $P_e^Q$.

In one or more embodiments, the method further comprising identifying at least two sources of information reduction, wherein the at least two sources of information reduction comprise at least one of component-level information loss and information flow reduction; ranking the at least two sources of information reduction according to impact on the calculated $P_e^Q$, wherein at least one dominant source of information reduction is identified; and determining the optimal component design to minimize the calculated $P_e^Q$, wherein the optimal component design includes at least one tradeoff between information flow and component design, wherein the at least one tradeoff decreases the at least one dominant source of information reduction.

Information Quantification and Isolation Device.

Figure 26:
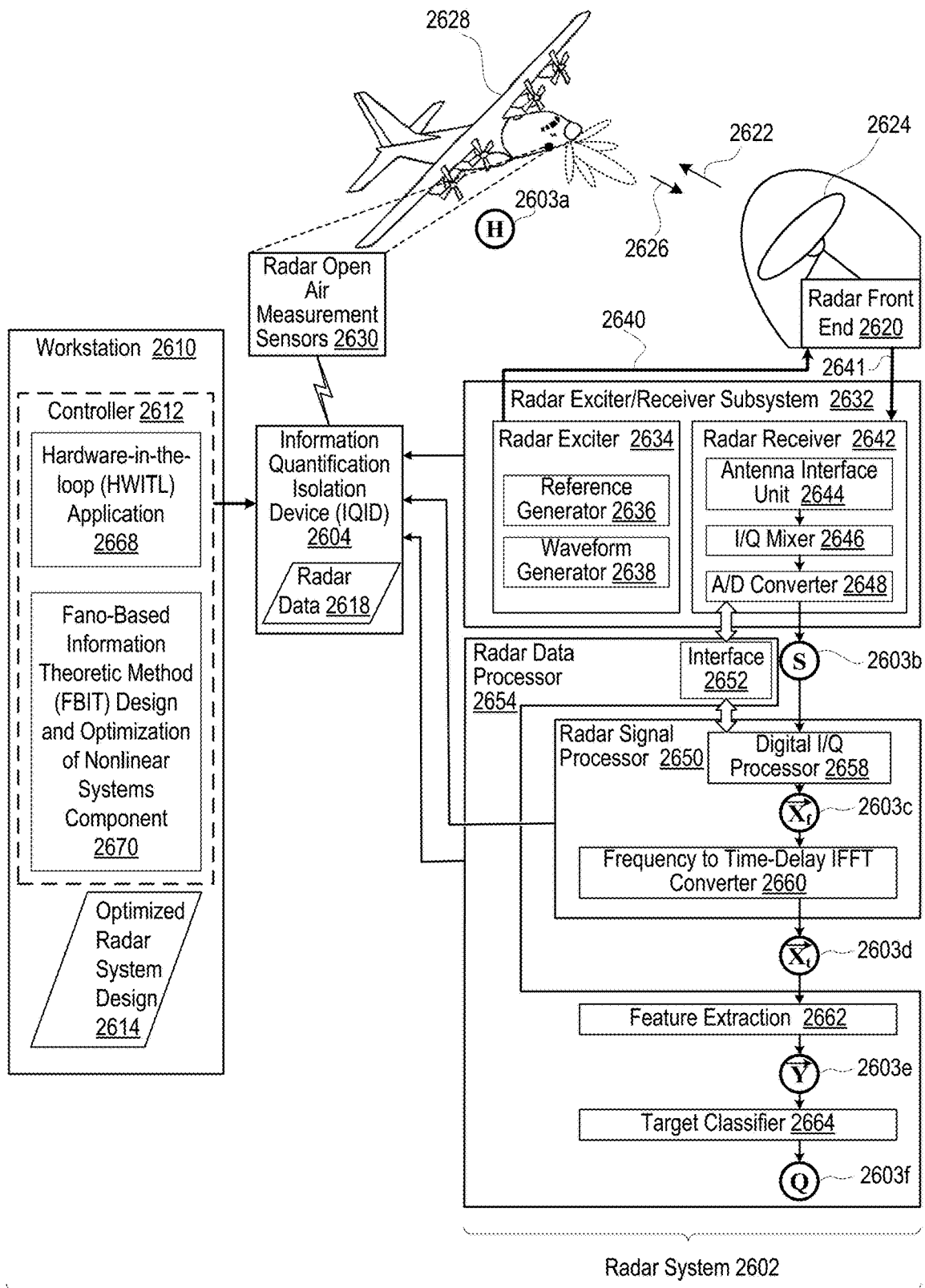
FIG. 26 illustrates a diagram of a radar system hardware-in-the-loop (HWITL) system.
Figure 27:
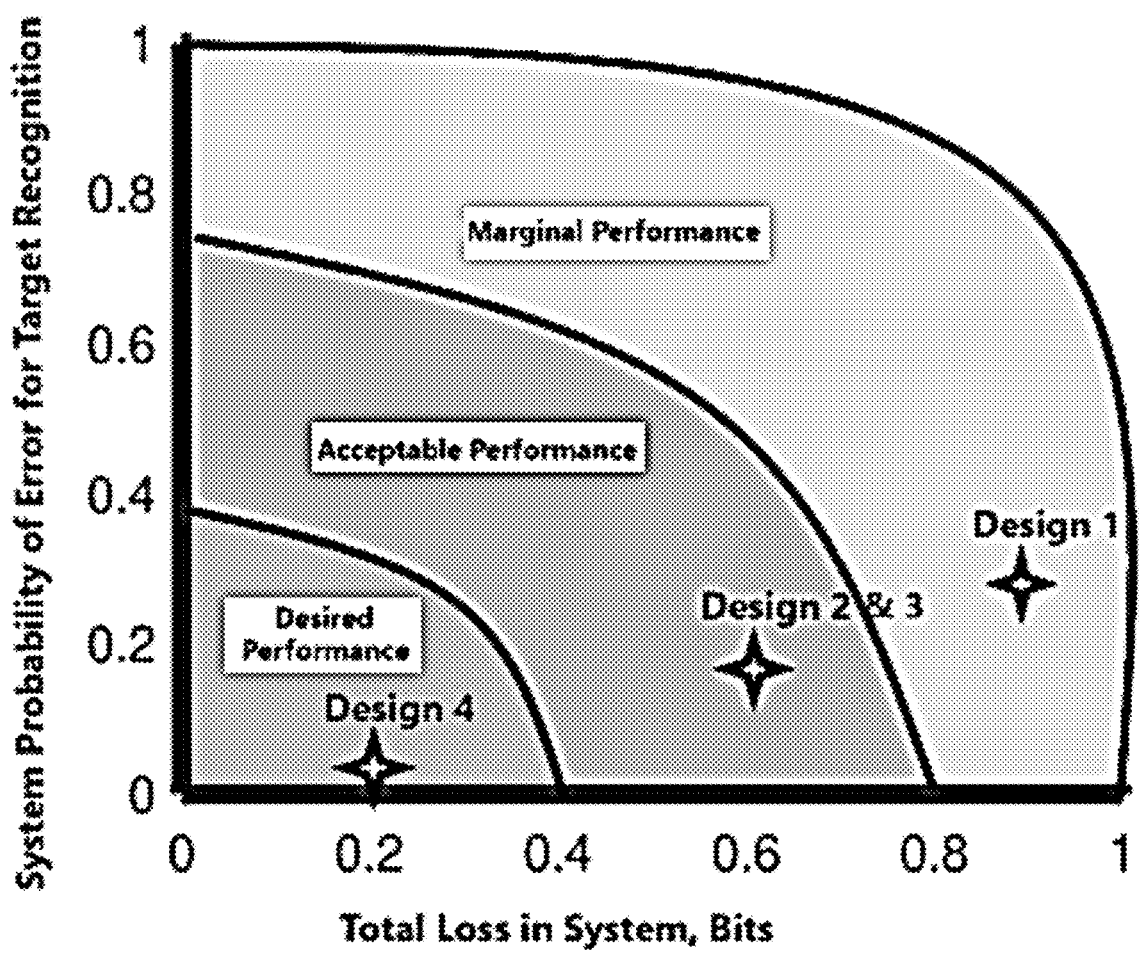
FIG. 27 illustrates a graphical plot of design trade-offs implemented by the radar system HWITL system of FIG. 26.
Figure 29:
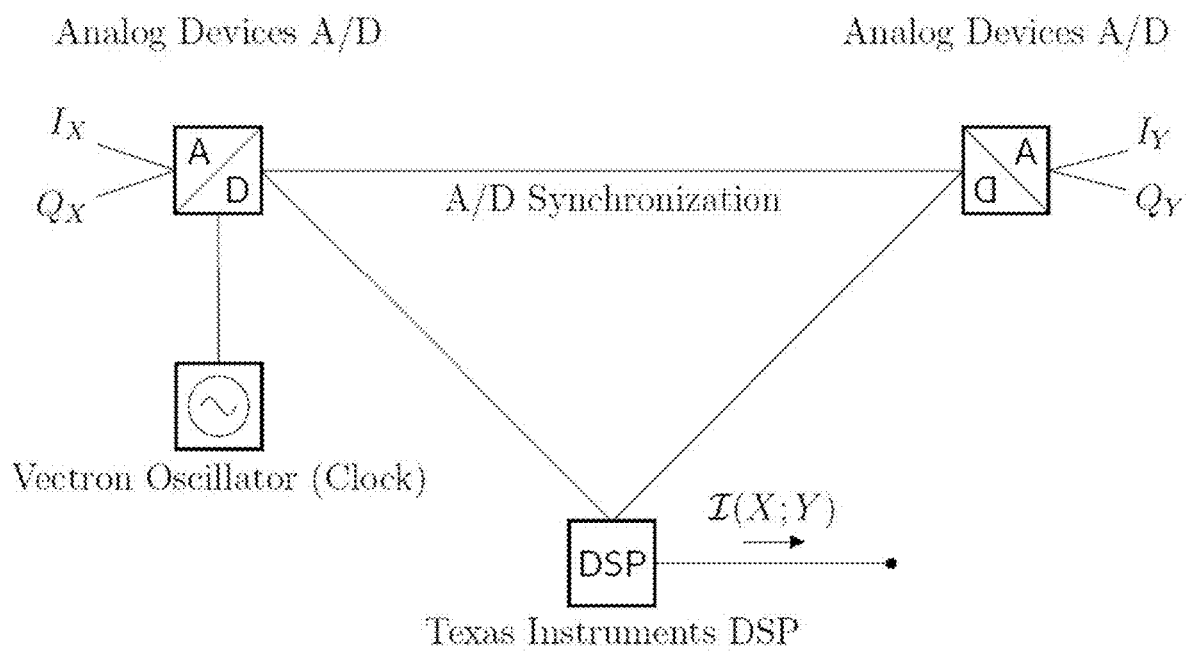
FIG. 29 illustrates a hardware schematic of Fano based information theoretic (FBIT) method.
Figure 30:
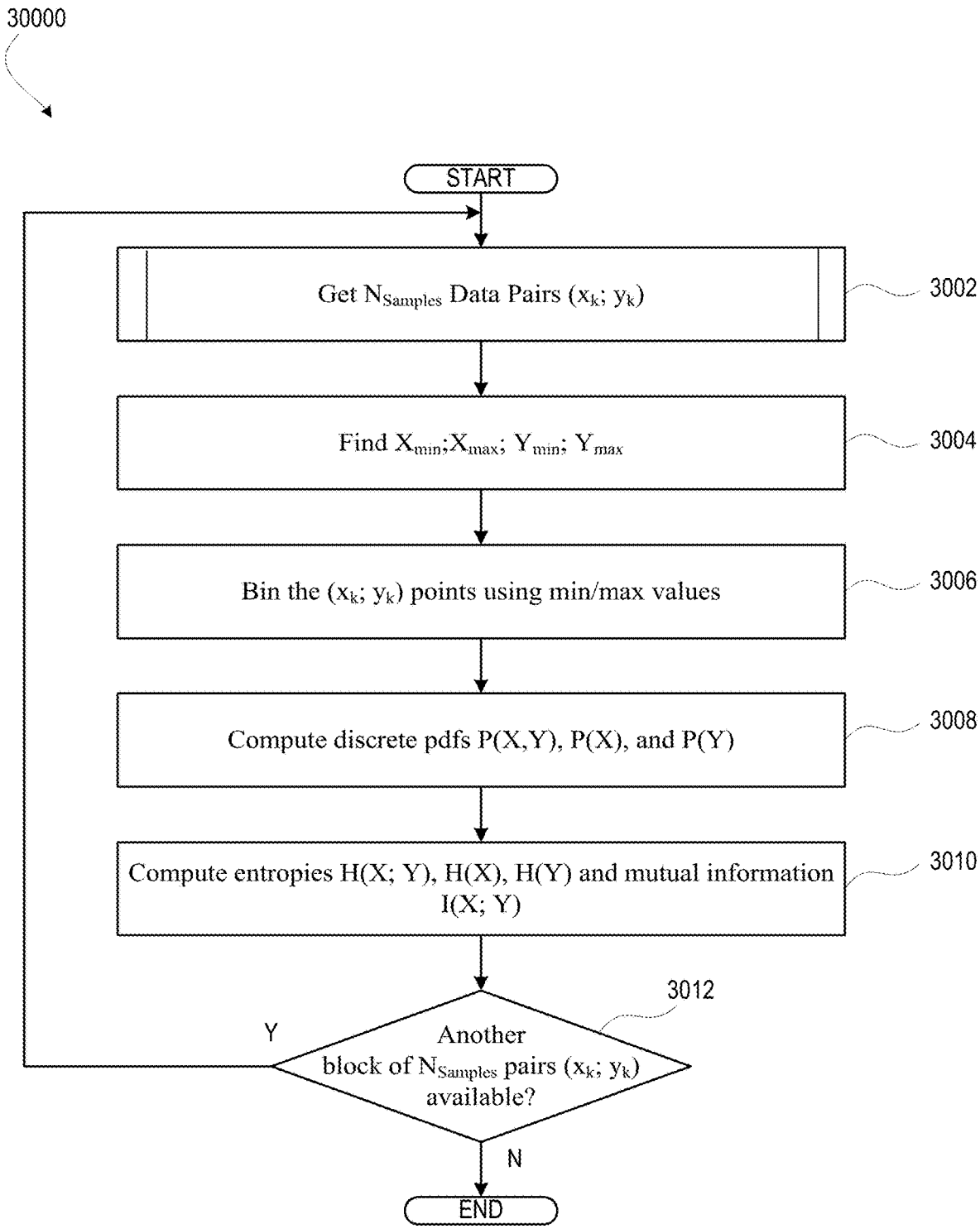
FIG. 30 illustrates a flow diagram of a method for a binning scheme.

FIG. 26 illustrates a diagram of a radar system hardware-in-the-loop (HWITL) system. FIG. 27 illustrates a graphical plot of design trade-offs implemented by the radar system HWITL system of FIG. 26. FIG. 28 illustrates a table of point probability distribution function and marginal probability distribution functions. FIG. 29 illustrates a hardware schematic of Fano based information theoretic (FBIT) method. FIG. 30 illustrates a flow diagram of a method for a binning scheme.

The following portion of the present disclosure makes reference to the following references:
(1) Shannon, Claude E., A Mathematical Theory of Communication, Bell System Technical Journal, Vol. 27, pp. 379-423, 623-656, 1948 (abstract).
(2) Shannon, Claude E., and Weaver, Warren, The Mathematical Theory of Communication, The University of Illinois Press, Urbana, Illinois, 1949. ISBN 0-252-72548-4.
(3) Winograd, S. and Cowan, J. D., Reliable Computation in the Presence of Noise, MIT Press, 1963.
(4) P. M. Woodward, Probability and Information Theory, with Applications to Radar, Pergamon Press, Second Edition, 1964.
(5) Bejan, A., Entropy Generation Minimization, CRC Press, 1996.
(6) Tishby, Naftali, Pereira, Fernando C., and Bialek, William, The Information Bottleneck Method, The 37th annual Allerton Conference on Communication, Control, and Computing, September 1999, pp. 368-377.

1. Background. Information Theory has long been intertwined with statistical signal processing. Claude Shannon devised Information Theory to provide detailed design rules for transmitter/receiver protocols in communication systems, yielding long sought provably optimal communication links [1, 2]. The application of information theory to computation and hypothesis testing has been more elusive. In 1963 Winograd and Cowan examined applying information theoretic concepts to computation [3]. In a similar vein, Woodward in 1964 explored applying information theory to radar signal processing and target identification (hypothesis testing) [4]. Bejan in 1996 explored applying information theoretic ideas, specifically entropy minimization, to the optimization of hardware design [5]. More recently Tishby, in a series of papers which started in 1999, proposed using information theory to advocate an information bottleneck approach to computation and hypothesis testing, whereby information theory is used in a hypothesis testing architecture to identify components which limit overall system performance [6]. The Fano Based Information Theoretic (FBIT) method proposed by Malas et al is the first generic design methodology which utilizes information theory to provide detailed guidance for hypothesis testing systems such as radar signal processing. In many ways the FBIT design process may be considered to be a method which encompasses all of the aforementioned approaches. The FBIT method enables detailed tradeoff analyses among system criteria such as Size, Weight and Power (SWaP), as well as all other metrics of interest, while maintaining an overall system performance level such as probability of error. A detailed understanding of subsystem/component tradeoffs is critical to the efficient and cost-effective construction of hypothesis testing hardware and software for example as used in radar equipment.

Design tradeoffs enabled by the FBIT approach are detailed below for a modern radar system architecture. The FBIT method described above outlines the mathematical concepts behind the generic design and optimization procedure. A numerical example is provided using high fidelity modeling and simulation of a radar system. In what follows below, the results of this numerical example are related to the implementation of the hardware design of the FBIT method: the Information Quantification and Isolation Device (IQID). The IQID is applied to a design, development, and test application that is widely used by radar developers in the industry. The HardWare-In-The-Loop (HWITL) application is the primary platform for hardware component design, test, and fault isolation. The radar system hardware and software components are operated on the ground in a laboratory bench arrangement. Surface-to-air radar measurements are conducted on aircraft targets of opportunity as well as on instrumented target aircraft. The results of the numerical radar system example are shown to be relevant to hardware and functional component design trades to lead to optimally performing hardware.

2. Introduction. The hardware implementation described above is referred to in this section as the Information Quantification Isolation Device (IQID). This Hardware Implementation Prototype section provides a specific application of the IQID to providing a radar hardware-in-the-loop testing system. 3. Summary: A high-fidelity numerical example is described above that demonstrated the application of the IQID (via the FBIT approach) to the design and optimization of the components of a radar system. The numerical radar example is given in the context of a radar designed to perform a target identification function on commercial aircraft. The radar must determine if the aircraft is a large commercial jet airliner or a small propeller plane. In this addition to the original material provided above, this section of the application is further explained in the context of a radar system design, development, and test facility which is known in the art as a hardware-in-the-loop (HWITL) facility. The radar system hardware and software components are operated on the ground in a laboratory bench arrangement. Surface-to-air measurements are conducted on aircraft targets of opportunity as well as on instruments target aircraft. Aircraft target measurements are made using instrumentation over an extended period of time and radar measurements at various stages in the system are stored for later analysis. The results of the numerical radar system example are shown to be relevant to hardware and functional component design trades performed on the HWITL facility using the IQID that lead to optimally performing hardware.

The original numerical example trades given above were designed to demonstrate a significant increase in capability over the current art in applications such as that within the HWITL or any other system component design/development/test operation. In FIG. 26, a physical description is presented of a radar system HWITL facility 2600. The HWITL facility houses a radar system 2602 similar to the system studied above in the numerical example. Specific probe points 2603a-2603f are identified where an IQID 2604 is used to make measurements and generate performance and information loss measures associated with various hardware and functional components in the radar system 2602. The component symbols presented in the numerical example and given in the radar system channel model shown in FIG. 2, are also used in the FIG. 26.

Design and Development Trade Capability: Component design trade capability are described above for optimal design of radar components in system. System performance bottlenecks can be identified and component hardware modified. FIG. 3B depicts the iteration process to optimize component design within the HWITL system components. The following features list the specific capability: (i) Creating a performance versus information loss budget for system components; (ii) Optimizing component design for performance at minimal cost using information loss budget methodology; and (iii) Finding bottlenecks to information flow and removing them in hardware components to reach performance specification.

The significant increase in capability over the current art at each probe point is explained below. In each example below, current art does not enable quantification and isolation of information and performance loss at each probe point. Current art allows for quantifying "signal power loss" relevant to target detection functionality but does not address "target signal information loss" relevant to target identification and statistical inference functionality.

With continued reference to FIG. 26, a workstation 2610 includes a controller 2612 that provides an optimized radar system design 2614 based on real-world radar data 2618 gathered by IQID 2604 from radar system 2602 at probe points 2603a-2603f. The radar system 2602 includes a radar front end 2620 that radiates outgoing pulses 2622 via a steerable antenna 2624. Incoming pulses 2626 that are reflected off of a target, such as an aircraft 2628, are received by the steerable antenna 2624. Probe point H 2603a is provided by radar open air measurement sensors 2630 that are part of the radar front end 2620. In one or more embodiments, radar open air measurement sensors 2630 are carried by the aircraft 2628. A radar exciter/receiver subsystem 2632 has a radar exciter 2634 that includes a reference generator 2636 and a waveform generator 2638 that provide an outgoing signal 2640 for the radar front end 2620. An inbound signal 2641 created by radar front end 2620 in response to incoming pulses 2626 is provided a radar receiver 2642 of the radar exciter/receiver subsystem 2632. The radar receiver 2642 includes an antenna interface unit 2644, phase and quadrature (I/Q) mixer 2646, and an analog-to-digital (A/D) converter 2648. The radar receiver 2642 is indirectly coupled to a radar signal processor 2650 of the radar system 2602 via an interface 2652 of a radar data processor 2654 also of the radar system 2602. The radar receiver 2642 is also directly coupled to the radar signal processor 2650 via probe point S 2603b. The radar signal processor 2650 includes a digital I/Q processor 2658 that is communicatively coupled to a frequency to time-delay inverse fast Fourier Transform (IFFT) converter 2660 via probe point $\vec{x}_f$ 2603c. The frequency to time-delay IFFT converter 2660 is communicatively coupled to a feature extraction component 2662 of the radar data processor 2654 via probe point $\vec{x}_t$ 2603d. The feature extraction component 2662 is communicatively coupled to a target classifier component 2664 of the radar data processor 2654 via probe point $\vec{Y}$ 2603e. The output of the target classifier component 2664 is probe point Q 2603f.

Figure 12A:
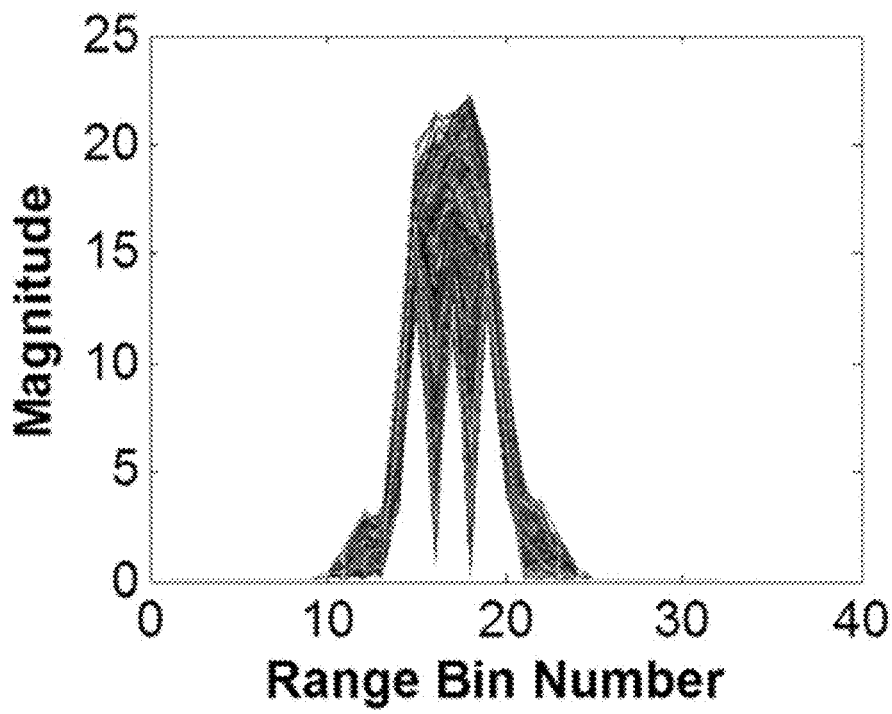
FIGS. 12A and 12B are plots illustrating the amplitude response for the N sample ensemble of high range resolution radar signatures for a baseline set of conditions defined as Case 2 ($\mu_r=0$ and $\mu_i=0$).
Figure 12B:
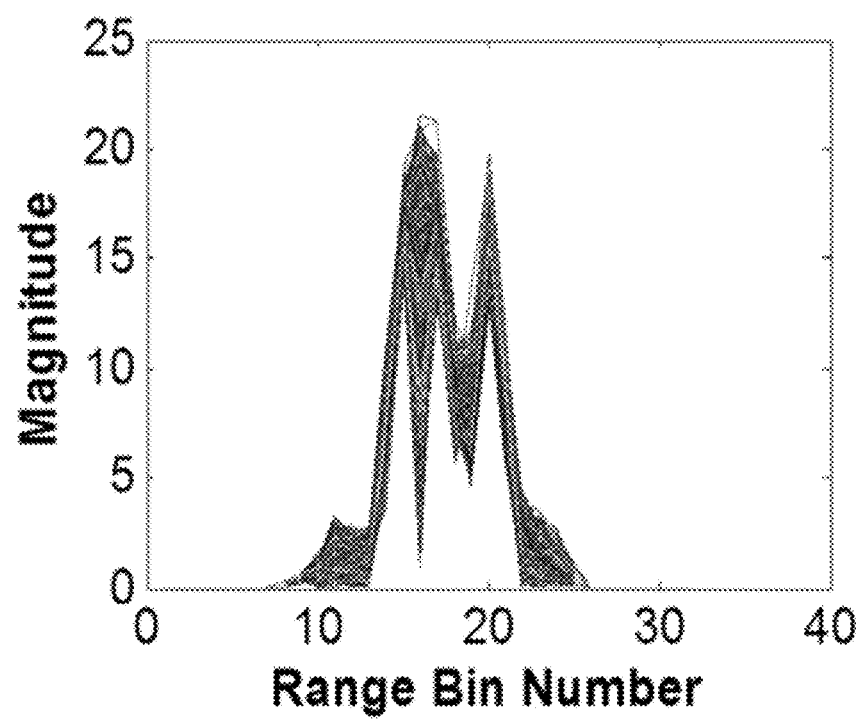

In one or more embodiments, the workstation 2610 includes an HWITL application 2668 that enables the controller 2612 to interface with and supervise the IQID 2604. The controller 2612 manages a Fano-based information theoretic method (FBIT) design and optimization of nonlinear systems component 2670. In one or more embodiments, IQID 2604 is a system of bench instrumentation that is communicatively coupled to probe points 2603a-2603f to obtain radar data 2618. In one or more embodiments, IQID 2604 is a handheld device that is selectively communicatively coupled to the probe points 2603a-2603f. Description of probe points 2603a-2603f:

a. Probe point H 2603a represents the various target aircraft labels that have been measured in the open-air tests. These labels can be entered into the IQID 2604.

b. Probe point S 2603b represents the output of the Analog-to-Digital (A/D) converter. Measurement of component information loss and system performance due to noise insertion and signal clipping are critical here. Significant information loss is possible depending on the A/D converter design and limitations imposed here can impose severe limitations in system performance. An example of the A/D converter trades designed to maximize information flow and system performance at the probe point S are provided in FIGS. 20 and 21.

c. Probe point $\vec{x}_f$ 2603c represents the data coming out of the digital in phase and quadrature (I/Q) processor component. Data conversion function is performed here and frequency sampled signatures are generated. Information loss due to signal conversion techniques are important and can be quantified.

d. Probe point $\vec{x}_t$ 2603d represents the data coming out of the Fast Fourier Transform (FFT) converter component. FIGS. 12A and 12B illustrate an ensemble of radar signatures at this probe point. Significant signal information loss is possible due to hardware implementation methods. Probing performance here quantifies the inherent performance of the system prior to the application of the feature extraction and classifier component operations. A wide variety of feature extraction and classifier approaches are possible. Without knowledge of the performance at this point, no meaningful design strategy can be employed for these two following system components where much cost and effort are expended in these systems. If the performance and associated information loss is insufficient at this point, no component design downstream from here will improve performance and thus hardware changes are needed in the "earlier stage" components of the system. An example of this trade benefit is shown in FIG. 22 where the bandwidth afforded by the FFT converter component provides valuable information about how much bandwidth is needed. System complexity (antenna, receiver, and other functional capability) is highly related to the required signal bandwidth. One should note from FIG. 22 that a 800 megahertz signal bandwidth is needed at $\vec{X}_t$ to meet the notional performance level of 0.2 probability of error at Q.

e. Probe point $\vec{Y}$ 2603e represents the data out of the feature extraction component of the system. A variety of feature design approaches can be applied here and the performance afforded by the associated information loss can be quantified. A great deal of expensive trial and error at the system level can be avoided by probing the system at the feature component $\vec{Y}$. FIGS. 20-22 demonstrate how important this component stage is in limiting the performance of the radar system.

f. Probe point Q 2603f represents the output of the aircraft target identification classifier component. The classifier component accounts for a large portion of the system design complexity and cost.

Radar System Design and Development in Uncertainty Capability: Absent of various sources of system uncertainty, the performance we would expect to see at each component probed in the radar system is given by the expected link performance. In real world operation, the radar system is exposed to various sources of uncertainty that will impact the expected link performance. The variation in the expected performance is quantified by the reliability at each component. Details regarding the performance reliability are given above. The present disclosure provides relating system performance reliability to respective hardware component reliability contributions and isolating major contributors to system reliability. The present disclosure further uses this insight to select specific hardware components for improvement in order to reach the system reliability performance specifications.

Figure 11:
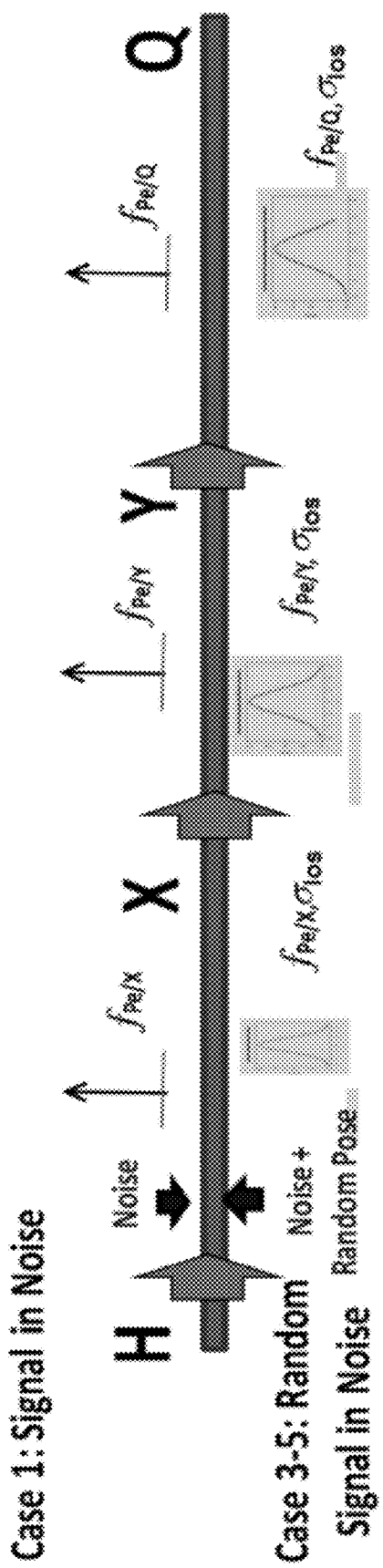
FIG. 11 is an exemplary depiction of propagating uncertainty in a system.

The numerical radar example provides a quantified degree of reliability at various components in the radar system using the process outlined in FIG. 3A. TABLE 1 lists the various sources of uncertainty studied in this numerical example. The sources studied in TABLE 1 can be produced in the HWITL system and studied as outlined in the numerical example. The performance reliability can propagate through the system as illustrated in FIG. 11. The IQID can be used to examine the degree of reliability at each component probed. While an expected performance may be acceptable, the performance must be evaluated to determine if it is reliable as specified. A system that performs under specification with respect to uncertainty at the output Q may well suffer from uncertainty generated at early components of the radar system. The IQIT allows for this uncertainty effect to be quantified and addressed early in the system. Individual contributions to the system reliability can be quantified at selected components as illustrated in the numerical example in FIGS. 23 and 25. A complete characterization of the propagating uncertainty can be viewed in a system format as in FIG. 24 where the additive effects of uncertainty can be quantified at each component probed. This leads to efficient methods to address components contributing large uncertainties.

4.4 System Performance Gains using the IQID: The advantages of using the IQID in the HWITL radar context can best be summarized through the study of several designs where a significant increase in system performance and reduced complexity/cost in hardware are realized. The following four design cases are taken from the numerical examples provided above and are directly applicable to the HWITL radar bench setting which is expanded upon herein. A radar system is designed to perform target identification on airborne aircraft and determine if the aircraft is a commercial passenger jet aircraft or a private small single engine propeller plane. The specifications for the performance of the radar include the important requirement that the probability of error in identification (Pe) be less than 0.05.

In Design Trade 1 the following radar hardware component design parameters are set in an ad hoc manor; system receiver bandwidth=400 MHZ, system signal-to-noise Ratio=20 dB, system dynamic range=20 dB. This results in marginal performance with target identification error=Pe=0.31, and a corresponding total system information loss=0.9 Bits. In this design, information flow is choked off at feature extraction component in the system limiting Pe to greater than 0.35. This ad hoc design provides early choke points in the system flow and as a result marginal system performance is shown in the design tradeoff graphic in FIG. 27.

In Design Trade 2, the engineering designer increases the system receiver bandwidth to 1 GHZ, leaves the system signal-to-noise ratio at 20 dB and increases the complexity of the A/D converter component to achieve a system dynamic range of 40 dB. The target ID Error is now reduced to Pe=0.146=15% and system information loss is also reduced to 0.6 Bits. Acceptable performance is achieved by increasing component capability as shown in FIG. 27. However, the designer is using conventional design methods that result in significant component complexity and cost. In this case component complexity is increased without knowledge of a cost-benefit insight.

In Design Trade 3 the system designer uses the IQID. Key components are probed and the radar information loss budget is generated by the IQID. Using this information the designer sets the system receiver bandwidth equal to 800 MHZ, leaves the system signal-to-noise ratio at 20 dB, and leaves the system dynamic range at 20 dB. The Target ID Error remains at Pe=0.146=15% and the corresponding system information loss also remains at 0.6 Bits. This design results in acceptable performance as in design 2, as shown in FIG. 27. The IQID trade design technology enables a measured component complexity increase providing the same performance as design 2, but without the complexity and cost.

In Design Trade 4 the engineering designer again uses the IQID. Increased performance over the acceptable level achieved in design 3 is desired. Key components are again probed and the radar information loss budget is generated by the IQID. Using this information, the designer leaves all three key design parameters the same as in Design Trade 3

(system receiver bandwidth=800 MHZ, system signal-to-noise ratio=20 dB, system dynamic Range=20 dB). The IQID information loss quantification at each component in the system hardware identifies the feature extraction software in the signal processor as the bottleneck point. Desired Performance is achieved building upon design 3 as shown in FIG. 27. FIG. 27 depicts a graphical plot of comparative design tradeoffs. A targeted design change frees up the flow of information and supports optimal performance. A desired performance is achieved with the Target ID Error reduced to within specification at Pe=0.0311=3% afforded by a reduced system information loss of 0.2 Bits.

5. Hardware Implementation Prototype IQID Device for Application to Radar Hardware in the Loop: The IQID hardware design including a component schematic and hardware chip specification is provided in the following sections.

5.1 Introduction to the Hardware: The mathematical theory of the Fano Based Information Theoretic FBIT method has been described in previously submitted documentation. The material below serves to describe the hardware and associated software that is needed to implement the FBIT method in order to permit optimization of a system such as a radar. The hardware is to be envisioned as having a form factor of a digital multimeter (DMM).

5.2 Functionality of FBIT Hardware: As described in the previously submitted patent documentation, the key to the FBIT optimization process is to determine the mutual information between two nodes of the system under study/optimization. For the sake of illustrating the principles involved, the pertinent electrical parameters may be voltage, current, impedance or other quantity. The type of electrical variable at each node need not be the same. For instance one node parameter may be voltage while the second node parameter may be current. For the sake of illustration the hardware description will use real-time voltages at two nodes. Later in this document variations on the type of nodal inputs (e.g. voltage versus current, impedance, ..., etc) will be discussed. The multidimensional input case will also be addressed later.

Consider two continuous voltages X(t) and Y(t). If X(t) and Y(t) are Nyquist sampled at rates $v_X$ and $v_Y$ respectively, one obtains a series of pairs $\{x_k, y_l\}$ for k, l positive integers. One then fills the joint probability for P(x, y) shown in FIG. 28 of this document with a total of N samples pairs (x,y). One then computes the marginal entropies H(X), H(Y) and the joint entropy H(X, Y). Using these three entropic quantities, one may compute the mutual information between X and Y, denoted (X; Y), as I(X; Y)=H(X)+H(Y)−H(X, Y). For purposes of clarity illustrating the fundamental principles underlying FBIT based hardware, assume $v_X=v_Y=v$. Sampling protocols for Nyquist frequencies $v_X \neq v_Y$ can be found in the literature.

A total of $N_{Samples}$ pairs labeled $\{X(t=t_k) \equiv x_k, Y(t=t_k) \equiv y_k\}$ for k=1, ..., $N_{Samples}$ are binned and populate the two dimensional grid representing the joint probability P(x, y). There are a total of $M_{(X,Y)}$ bins for P(X, Y), $M_X$ bins for P(X) and $M_Y$ bins for P(Y), where $M_{(X,Y)}=M_X \cdot M_Y$. Referring to FIG. 28 of this document, $M_X=M_Y=4$ and $M_{(X,Y)}=16$. The discrete probability P(X, Y) for a frame of data consisting of $N_{Samples}$ points is determined from the relative frequency of sample points, out of $N_{Samples}$ that fall into each bin. Note that P(X) and P(Y) are the marginal probability densities of P(X, Y). The probabilities P(X, Y), P(X) and P(Y) for $M_{(X,Y)}=36$, $M_X=6$, and $M_Y=6$ are shown in FIG. 28 of this document. FIG. 28 is a table of point probability distribution function $P_{(X,Y)}(X; Y)$, and marginal probability distribution functions $P_X(X)$ and $P_Y(Y)$.

The mutual information between X and Y, denoted I(X; Y), is to be computed. The mathematical definition of mutual information that will be used is $$\mathcal{I}(X;Y) = \mathcal{H}(X) + \mathcal{H}(Y) - \mathcal{H}(X,Y).$$

The mutual information I(X; Y) is constructed from the entropic quantities H(X, Y), H(X) and H(Y). The definition of H(X, Y) is shown below.

$$\mathcal{H}(X,Y) = -\sum_{m_x=1}^{m_x=M_X}\sum_{m_y=1}^{m_y=M_Y} P(X_{m_x}, Y_{m_y})\log_2[P(X_{m_x}, Y_{m_y})].$$

The definitions of H(X) and H(Y) are similar.

For example, let $N_{Samples}=10$, where 3 sample pairs fall in one bin, 2 in another, and the remaining 5 in a third bin. The entropies of interest are $$H(X,Y)=H(X)=1.485 \text{ Bits}$$

and $$H(Y)=1.00 \text{ Bits}.$$

Combining H(X, Y), H(X) and H(Y) yields the mutual information I(X; Y).

$$I(X;Y)=1.485+1.000-1.485=1 \text{ Bit}.$$

5.2.1 Computing Information Theoretic Quantities for Inphase and Quadrature Signals: Radar systems typically have complex signals containing magnitude and phase which are mapped to Inphase and Quadrature signals I and Q respectively. (Note that the symbol for the Inphase signal, I, should not be confused with the symbol I for mutual information.) As a result, radar systems have a two dimensional input signal for X, namely $\{I_X, Q_X\}$. and a two dimensional signal for Y, namely $\{I_Y, Q_Y\}$. The tableau representing $P_{(X,Y)}(X, Y)$ shown in FIG. 28 of this document becomes a four dimensional object, while the marginal distributions $P_X(X)$ and $P_Y(Y)$ become two dimensional objects. The idea shown in FIG. 28 of this document remains similar. Nyquist sampling without aliasing is implemented within the A/D chips. The resulting FBIT hardware looks as in FIG. 29. FIG. 29 depicts a diagram of a system hardware schematic.

5.3 Hardware Description: The sampling portion of the computation is implemented using an analog low pass filter with the upper frequency cutoff determined specified by the user or via an adaptive algorithm. This stage determines the Nyquist sampling frequency $f_{Nyquist}$. The total number of samples are determined by specifying the time frame over which the samples should be accumulated. This is specified by the user. The binning operation for the X(t) and Y(t) sampled signals may be specified by the user or implemented by an autoranging A to D chip. (The binning scheme is implemented as autoranging in the software pseudocode shown in FIG. 30 and Algorithm 1 of this document.) The digital signal processing algorithm for the entropic and mutual information computation is straightforward and may be implemented on a DSP chip. The Analog to Digital (A/D) sampling and Digital Signal Processing (DSP) chips are commercially available and consume low power, allowing a hand held device. Low pass filtering to assure The clock oscillator chip is the Vectron Corporation PS-702. The Analog to Digital Converter (ADC) chips are the Analog Devices 9208. The Digital Signal Processing (DSP) chip is the Texas Instruments TMS320C6678. The clock oscillator outputs a One Gigahertz clock signal of a format which can be used as an input by the Analog Devices ADC's for sampling. Multiple Analog Device ADC's can use the same clock to ensure synchrony of sampling. The TI DSP contains an internal Phased Lock Loop (PLL) as a clock for timing. (See the functional block diagram for the TMS320C6678 shown in FIG. 1-1 on page 4 of the TMS320C6678 data sheet.) An estimated power budget is given in TABLE A3.

3012, whether another block of $N_{Samples}$ pairs $(x_k; y_k)$ is available. If another block of $N_{Samples}$ pairs $(x_k; y_k)$ is available, then method 3000 returns to block 3002. If another block of $N_{Samples}$ pairs $(x_k; y_k)$ is not available, then method 3000 ends.

Furthermore, Without Loss of Generality, referring to FIG. 28, the algorithm uses $M_X=M_Y=6$ and $M_{(X,Y)}=M_X*M_Y=36$. Note that the radar case of interest where X and Y are complex signals requires each sum below, e.g. over X or Y, be converted into two sums, e.g. over $\{I_X, Q_X\}$ and $\{I_Y, I_Q\}$ respectively. Sampling is done every $\tau$ seconds stating at t=0. The Texas Instruments DSP chip contains sufficient internal memory to execute the algorithm

TABLE A3

System Power Budget (Watts) (Information taken from data sheets.)

| Chip Class | Typical Power per Chip | Max Power per Chip | Number of chips | Typical Power for system | Max Power for system |
|---|---|---|---|---|---|
| Clock | 0.18 | 0.25 | 1 | 0.18 | 0.25 |
| DAC | 3.3 | 3.3* | 2 | 6.6 | 6.6* |
| DSP | 12* | 48* | 1 | 12* | 48* |
| System Total | 15.5 | ≈50 | 4 | 15.5 | ≈55 |

*denotes an estimate depending on the algorithm and other factors.

5.4 DSP Software: The Texas Instruments DSP is fully programmable. For the sake of simplicity, the pseudocode where X is one dimensional and Y is one dimensional is given in FIG. 30 of this document. FIG. 30 depicts a flowchart of a method 3000 for DSP code computing I(X; Y). Method 3000 includes getting $N_{Samples}$ Data Pairs $(x_k; y_k)$ (block 3002). Method 3000 includes finding $X_{min};X_{max};Y_{min};Y_{max}$ (block 3004). Method 3000 includes binning the $(x_k; y_k)$ points using min/max values (block 3006). Method 3000 includes computing discrete pdfs P(X,Y), P(X), and P(Y) (block 3008). Method 3000 includes computing entropies H(X; Y), H(X), H(Y) and mutual information I(X; Y) (block 3010). A determination is made, in decision block described above. Common system chips implementing power supply and power regulation, as well as other typical board level functionality, are not specifically given here.

The DSP pseudo code uses the following approximation for computing the entropy $\mathcal{H}(X)$=HX of the discrete random variable X. Recall that $M_X$ is the number of discrete bins that the dynamic range of X is partitioned into. In the equations below $N_X(k)$ is the number of samples of X(t) that fall into X bin number k, where k=0, ..., $M_X$. Note that $\Sigma_{k=0}^{k=M_X-1} N_X(k)=N_{Samples}$, The entropies $\mathcal{H}(Y)$=HY and $\mathcal{H}(X, Y)$=HXY are computed in a similar fashion. The mutual information $\mathcal{I}(X; Y)$=IXY=HX+HY-HXY.

---

Algorithm 1 DSP pseudocode for computing $\mathcal{I}(X, Y)$.

---

Require: All variables and array elements are initialized to zero
  $M_X = 6$ {Comment: Initialize variables}
  $M_X = 6$
  $M_{XY} = M_X \cdot M_Y$
  for k = 0 to k = $N_{Samples}$ − 1 do {Comment: Load signal samples into memory}
    $X_{sample[k]} = X_{[t - k\tau]}$
    $Y_{sample[k]} = Y_{[t - k\tau]}$
  end for
  Xmin = MIN[Xsample] {Comment: Adaptively determine sampling endpoints}
  Xmax = MAX[Xsample] {Comment: Find maximum Xsample value}
  Ymin = MIN[Ysample] {Comment: Find minimum Ysample value}
  Ymax = MAX[Ysample] {Comment: Find maximum Ysample value}

$$Xbinsize = \frac{X\max - X\min}{M_X}$$

$$Ybinsize = \frac{Y\max - Y\min}{M_Y}$$

for k = 0 to k = $N_{Samples}$ − 1 do {Comment: Bin signal samples & Create P(X, Y), P(X)&P(Y)}

$$N_X\left[\text{FLOOR}\left[\frac{X_{sample(k)} - X_{min}}{X_{binsize}}\right]\right] = Xbin\left[\text{FLOOR}\left[\frac{X_{sample(k)} - X_{min}}{X_{binsize}}\right]\right] + 1$$

Algorithm 1 DSP pseudocode for computing $\hat{\imath}$(X, Y).

$$N_Y\left[\text{FLOOR}\left[\frac{Y_{sample(k)} - Y_{min}}{Y_{binsize}}\right]\right] = Ybin\left[\text{FLOOR}\left[\frac{Y_{sample(k)} - Y_{min}}{Y_{binsize}}\right]\right] + 1$$

$$N_{XY}\left[M_X * \text{FLOOR}\left[\frac{X_{sample(k)} - X_{min}}{X_{binsize}}\right] + \text{FLOOR}\left[\frac{Y_{sample(k)} - Y_{min}}{Y_{binsize}}\right]\right] =$$
$$N_{XY}\left[M_X * \text{FLOOR}\left[\frac{X_{sample(k)} - X_{min}}{X_{binsize}}\right] + \text{FLOOR}\left[\frac{Y_{sample(k)} - Y_{min}}{Y_{binsize}}\right]\right] + 1$$

end for
for k = 0 to k = $M_X$ − 1 do {Comment: Generate H(X)}
   HX = HX + $N_X$(k) * log 2 [$N_X$(k)]
end for $$HX = N_{Samples} - \frac{HX}{N_{Samples}}$$

for k = 0 to k = $M_Y$ − 1 do {Comment: Generate H(Y)}
   HY = HY + $N_Y$(k) * log 2 [$N_Y$(k)]
end for $$HY = N_{Samples} - \frac{HY}{N_{Samples}}$$

for k = 0 to k = $M_{XY}$ − 1 do {Comment: Generate H(X, Y)}
   HXY = HXY + $N_{XY}$(k) * log 2 [$N_{XY}$(k)]
end for $$HXY = N_{Samples} - \frac{HXY}{N_{Samples}}$$

$\hat{\imath}$XY = HX + HY − HXY {Compute mutual information $\hat{\imath}$(X, Y)}

6. Summary: The computational components implementing the FBIT optimization procedure can be implemented in a hand held device with moderate power requirements. The FBIT hardware construction uses off-the-shelf chips. The resulting FBIT hardware device resembles a digital multimeter (DMM) device, although the FBIT hardware device is implementing different internal functionality.

Figure 31:
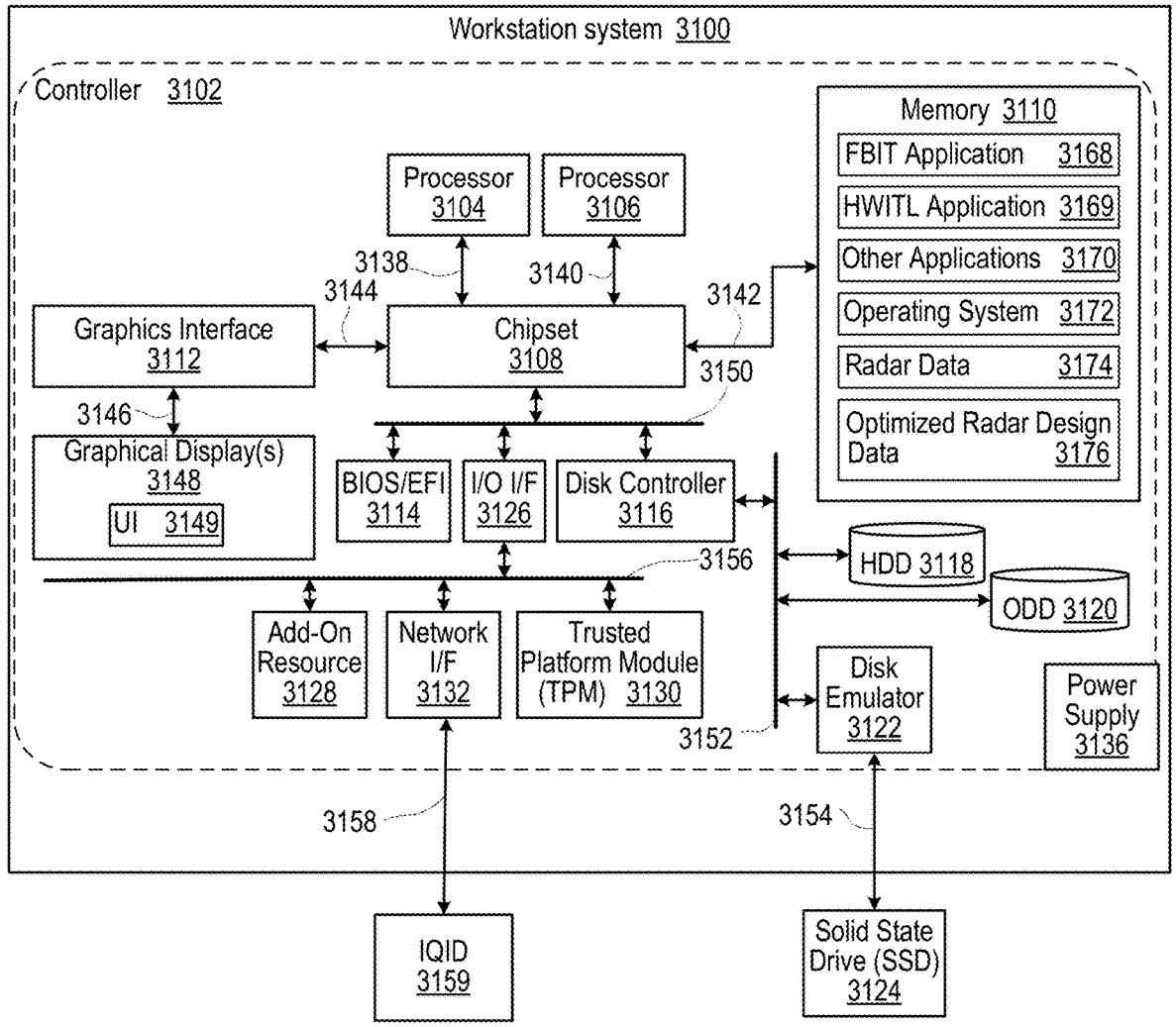
FIG. 31 is a diagrammatic illustration of an exemplary hardware and software environment of a workstation system consistent with embodiments of the innovation.

FIG. 31 is a diagrammatic illustration of an exemplary hardware and software environment of a workstation system 3100, such as the workstation 2600 (FIG. 26), customized to implement a workstation controller 3102 consistent with embodiments of the innovation. Workstation system 3100 is in part a customized information handling system (IHS) 100 that performs at least a part of the methodologies and features as described herein. Workstation system 3100 can include processing resources for executing machine-executable code, such as a central processing unit (CPU), a programmable logic array (PLA), an embedded device such as a System-on-a-Chip (SoC), or other control logic hardware. Workstation system 3100 can also include one or more computer-readable medium for storing machine-executable code, such as software or data. Additional components of workstation system 3100 can include one or more storage devices that can store machine-executable code, one or more communications ports for communicating with external devices, and various input and output (I/O) devices, such as a keyboard, a mouse, and a video display. Workstation system 3100 can also include one or more interconnects or buses operable to transmit information between the various hardware components.

Workstation system 3100 includes processors 3104 and 3106, chipset 3108, memory 3110, graphics interface 3112, a basic input and output system/extensible firmware interface (BIOS/EFI) module 3114, disk controller 3116, hard disk drive (HDD) 3118, optical disk drive (ODD) 3120, disk emulator 3122 connected to an external solid state drive (SSD) 3124, input/output (I/O) interface (I/F) 3126, one or more add-on resources 3128, a trusted platform module (TPM) 3130, network interface 3132, and power supply 3136. Processors 3104 and 3106, chipset 3108, memory 3110, graphics interface 3112, BIOS/EFI module 3114, disk controller 3116, HDD 3118, ODD 3120, disk emulator 3122, SSD 3124, I/O interface 3126, add-on resources 3128, TPM 3130, and network interface 3132 operate together to provide a host environment of workstation system 3100 that operates to provide the data processing functionality of an information handling system. The host environment operates to execute machine-executable code, including platform BIOS/EFI code, device firmware, operating system code, applications, programs, and the like, to perform the data processing tasks associated with workstation system 3100.

In a host environment, processor 3104 is connected to chipset 3108 via processor interface 3138, and processor 3106 is connected to the chipset 3108 via processor interface 3140. Memory 3110 is connected to chipset 3108 via a memory bus 3142. Graphics interface 3112 is connected to chipset 3108 via a graphics bus 3144, and provides a video display output 3146 to graphical display(s) 3148 that presents UI 3149. In a particular embodiment, workstation system 3100 includes separate memories that are dedicated to each of processors 3104 and 3106 via separate memory interfaces. An example of memory 3110 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 3114, disk controller 3116, and I/O interface 3126 are connected to chipset 3108 via an I/O channel 3150. An example of I/O channel 3150 includes a Peripheral Component Interconnect (PCI) interface, a PCI-Extended (PCI-X) interface, a high speed PCI-Express (PCIe) interface, another industry standard or proprietary communication interface, or a combination thereof. Chipset 3108 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 3114 includes BIOS/EFI code operable to detect resources within workstation system 3100, to provide drivers for the resources, initialize the resources, and access the resources. BIOS/EFI module 3114 includes code that operates to detect resources within workstation system 3100, to provide drivers for the resources, to initialize the resources, and to access the resources.

Disk controller 3116 includes a disk interface 3152 that connects the disk controller to HDD 3118, to ODD 3120, and to disk emulator 3122. An example of disk interface 3152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 3122 permits SSD 3124 to be connected to workstation system 3100 via an external interface 3154. An example of external interface 3154 includes a USB interface, an IEEE 1394 (Firewire) interface, a proprietary interface, or a combination thereof. Alternatively, solid-state drive 3124 can be disposed within workstation system 3100.

I/O interface 3126 includes a peripheral interface 3156 that connects the I/O interface to add-on resource 3128, to TPM 3130, and to network interface 3132. Peripheral interface 3156 can be the same type of interface as I/O channel 3142, or can be a different type of interface. As such, I/O interface 3126 extends the capacity of I/O channel 3142 when peripheral interface 3156 and the I/O channel are of the same type, and the I/O interface translates information from a format suitable to the I/O channel to a format suitable to the peripheral channel 3156 when they are of a different type. Add-on resource 3128 can include a data storage system, an additional graphics interface, a network interface card (NIC), a sound/video processing card, another add-on resource, or a combination thereof. Add-on resource 3128 can be on a main circuit board, on separate circuit board or add-in card disposed within workstation system 3100, a device that is external to the information handling system, or a combination thereof.

Network interface 3132 represents a network interface controller (NIC) disposed within workstation system 3100, on a main circuit board of the information handling system, integrated onto another component such as chipset 3108, in another suitable location, or a combination thereof. Network interface 3132 includes network channel(s) 3158 that provide interfaces to devices that are external to workstation system 3100. In a particular embodiment, network channel(s) 3158 are of a different type than peripheral channel 3156 and network interface 3132 translates information from a format suitable to the peripheral channel to a format suitable to external devices. An example of network channel(s) 3158 includes InfiniBand channels, Fibre Channel channels, Gigabit Ethernet channels, proprietary channel architectures, or a combination thereof. Network channel(s) 3158 can be connected to external network resources such as IQID 3159.

Within memory 3110, HDD 3118, ODD 3120, or SSD 3124, one or more software and/or firmware modules and one or more sets of data can be stored that can be utilized during operations of workstation system 3100. These one or more software and/or firmware modules can be loaded into memory 3110 during operation of the workstation system 3100. Specifically, in one embodiment, memory 3110 can include therein a plurality of such modules, including FBIT design and optimization of nonlinear systems component application 3168, one or more other applications 3170, operating system (OS) 3172, radar data 3174, and optimized radar design data 3176 These software and/or firmware modules have varying functionality as disclosed herein when their corresponding program code is executed by processors 3104, 3106.

Although specific embodiments have been described in detail in the foregoing description and illustrated in the drawings, various other embodiments, changes, and modifications to the disclosed embodiment(s) will become apparent to those skilled in the art. All such other embodiments, changes, and modifications are intended to come within the spirit and scope of the appended claims.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A radar design and tuning system comprising:
   a) a computer comprising an input/output controller, a random access memory unit, a hard drive memory unit, a unifying computer bus system and a central processing unit comprising an entropy computation processor, said input/output controller being configured to receive a digital signal from said instrumentation interface unit and transmit said digital signal to said central processing unit comprising said entropy computation processer; said central processing unit programmed to identify and characterize a component-level information loss in a nonlinear system configured to observe a target, the nonlinear system comprising a plurality of components with each component of the plurality having a control parameter, and the plurality of components of the nonlinear system being subject to at least one random input variable, via:
      determining, for the nonlinear system, a true target state and a decision state, the true target and decision states being characterized in a Markovian channel model;
      modeling settings of the at least one random input variable to create a plurality of distributions, wherein each distribution comprises values ranging from a theoretical maximum entropy to a theoretical minimum entropy;
      calculating an entropy at each component of the plurality that is attributable to the respective control parameter wherein the entropy for each component of the plurality is directly related to an amount of uncertainty at each respective component of the plurality;
      computing a mutual information between the true state and the decision state;
      calculating the mutual information for each component of the plurality between the true target state and the respective component;
      deriving, using Fano's inequality, a bound for a component probability of error for each component of the plurality using the mutual information associated with the respective component of the plurality;
      determining the optimal design of components of the nonlinear system that minimize information loss, while maximizing information flow and mutual information; and
      generating a design model for the nonlinear system to guide production;
   b) an instrumentation interface unit, said instrumentation interface unit placing said computer in communication with a radar system; and
   c) a communication device for communicating an output from said central processing unit to a human and/or an information storage device.

2. The radar design and tuning system of claim 1, wherein said central processing unit is further programmed to:
   compute a reliability of the probability of error of each component of the plurality and attributing a contribution of each random input variable to the reliability of the probability of error using real world samples of system uncertainty parameters based on information from a selected one or more of: (i) actual events; and (ii) experiments, the method comprising:
      determine a real world statistical variation of the at least one random input variable based on the real world samples;
      perform a Monte-Carlo simulation of the statistical variations to calculate a statistical distribution of the probability of error for each component of the plurality;
      determine the reliability based on a standard deviation of the statistical distribution of the probability of error for each component of the plurality; and
      correlating the contribution of each random input variable to the reliability.

3. The radar design and tuning system of claim 2, wherein said instrumentation interface unit comprises a hardware-in-the-loop facility.

4. The radar design and tuning system of claim 2, wherein said central processing unit is further programmed to determine a proper ensemble sample size while performing the Monte-Carlo simulation.

5. The radar design and tuning system of claim 2, wherein said central processing unit is further programmed to:
   determine an ensemble sampling requirement for the method of claim 1, the method comprising:
      determine a set of test criteria for a maximum allowable sampling uncertainty of the mutual information relative to the standard deviation of the reliability probability of error;

determine a sample ensemble size for the mutual information using a phase transition method; and compute the reliability using a numerical simulation method on the sample ensemble size.

6. The radar design and tuning system of claim 5, wherein the numerical simulation method comprises Monte Carlo modeling.

7. The radar design and tuning system of claim 2, wherein performing the Monte-Carlo simulation further comprises:

introducing a plurality of random input variables.

8. The radar design and tuning system of claim 7, wherein said central processing unit is further programmed to:

correlate the each random input variable of the plurality to the its respective contribution to the reliability, the standard deviation of the distributions of the probabilities of error at each component, or both.

9. A radar design and tuning system comprising:

a) a computer comprising an input/output controller, a random access memory unit, a hard drive memory unit, a unifying computer bus system and a central processing unit comprising an entropy computation processer, said input/output controller being configured to receive a digital signal from said instrumentation interface unit and transmit said digital signal to said central processing unit comprising said entropy computation processer; said central processing unit programmed to: characterize information in a nonlinear system comprising a component characterized by a design control parameter, and the nonlinear system having a decision state and a true state, said programming comprising:

computing a mutual information between the decision state and the true state of the nonlinear system;

modeling a range for the design control parameter;

calculating an entropy at the component;

calculating an information loss at the component that is attributable to the control parameter;

determining the optimal design of components of the nonlinear system that optimize the design control parameter that minimizes information loss while maximizing information flow and mutual information;

computing a reliability of the system by:

defining a random input variable;

iteratively calculating a statistical distribution of the probability of error by iteratively modeling random input variable settings;

determining a standard deviation for the component-level statistical distribution of the reliability probability of error; and correlating the random input variable setting to the standard deviation;

b) an instrumentation interface unit, said instrumentation interface unit placing said computer in communication with a radar system; and c) a communication device for communicating an output from said central processing unit to a human and/or an information storage device.

10. The radar design and tuning system of claim 9, wherein said programming comprises iteratively calculating a statistical distribution of the probability of error performing the Monte-Carlo simulation further comprises:

introducing a plurality of random input variables.

11. The radar design and tuning system of claim 10, wherein said programming further comprising:

correlating the each random input variable of the plurality to the its respective contribution to the reliability, the standard deviation of the distributions of the probabilities of error at each component, or both.

* * * * *